(12) United States Patent
Viccary et al.

(10) Patent No.: US 11,851,284 B2
(45) Date of Patent: Dec. 26, 2023

(54) CONVEYOR SYSTEM FOR WHEELED STRUCTURES AND IMPROVEMENTS THERETO

(71) Applicant: Stephenson Technologies Inc., Barrie (CA)

(72) Inventors: Shane Patrick Peter Viccary, Barrie (CA); Robert Allen Kuehl, Oro-Medonte (CA); Daniel Thomas James Colvin, Angus (CA); Taylor James Hutton, Barrie (CA)

(73) Assignee: Stephenson Technologies Inc., Barrie (CA)

( * ) Notice: Subject to any disclaimer, the term of this patent is extended or adjusted under 35 U.S.C. 154(b) by 0 days.

(21) Appl. No.: 17/965,023

(22) Filed: Oct. 13, 2022

(65) Prior Publication Data

US 2023/0116490 A1 Apr. 13, 2023

Related U.S. Application Data

(60) Provisional application No. 63/262,480, filed on Oct. 13, 2021.

(51) Int. Cl.
*B65G 15/60* (2006.01)
*B65G 15/62* (2006.01)
(Continued)

(52) U.S. Cl.
CPC ............. *B65G 45/22* (2013.01); *B65G 15/44* (2013.01); *B65G 2201/0294* (2013.01); *B65G 2207/48* (2013.01)

(58) Field of Classification Search
CPC ........ B65G 15/44; B65G 15/60; B65G 15/62; B65G 45/22; B65G 2207/48
(Continued)

(56) References Cited

U.S. PATENT DOCUMENTS 4,226,325 A * 10/1980 Vandas .................. B65G 45/22
198/493
5,601,180 A * 2/1997 Steeber .................. B65G 21/02
198/841

(Continued)

OTHER PUBLICATIONS

US 2010/0206341 A1, Essenburg et al., Aug. 19, 2010.*

*Primary Examiner* — Douglas A Hess
(74) *Attorney, Agent, or Firm* — Laurence A. Greenberg; Werner H. Stemer; Ralph E. Locher

(57) ABSTRACT

A conveyor system has an endless belt with an upper transport portion sized to support a wheeled structure, and a lower return portion. A support deck is positioned to support the upper transport portion of the endless belt, the support deck includes a lower support deck structure, and wear plates that are supported on the lower support deck structure. The support deck includes alignment aperture pairs. Each alignment aperture pair includes a first alignment aperture through the lower support deck structure, and a second alignment aperture through one of the plurality of wear plates. A belt-rinsing system is provided and includes a plurality of rinsing system outlet bodies, wherein each of the plurality of rinsing system outlet bodies extends into one of the first alignment apertures of the lower support deck structure and into one of the second alignment apertures of one of the plurality of wear plates.

20 Claims, 40 Drawing Sheets

(51) Int. Cl.
*B65G 45/22* (2006.01)
*B65G 15/44* (2006.01)

(58) Field of Classification Search
USPC ........................................ 198/495, 698, 841
See application file for complete search history.

(56) References Cited

U.S. PATENT DOCUMENTS

| | | | | |
|---|---|---|---|---|
| 5,779,027 A * | 7/1998 | Ensch | .................... | B65G 21/22 |
| | | | | 198/841 |
| 6,270,305 B1 * | 8/2001 | Orbeck | ................. | B65G 15/62 |
| | | | | 432/239 |
| 7,278,533 B2 * | 10/2007 | Horn | ...................... | B65G 15/22 |
| | | | | 198/817 |
| 7,527,144 B2 * | 5/2009 | Ostman | ................. | B65G 15/62 |
| | | | | 198/841 |
| 7,681,719 B2 * | 3/2010 | Hosch | .................... | B65G 47/66 |
| | | | | 198/841 |
| 7,997,405 B2 * | 8/2011 | Karpy | .................... | B65G 15/62 |
| | | | | 198/860.1 |
| 8,413,669 B2 * | 4/2013 | Barreyre | ................. | H05B 3/02 |
| | | | | 198/339.1 |
| 9,290,324 B2 * | 3/2016 | Haas | ...................... | B65G 15/62 |
| 9,650,218 B1 * | 5/2017 | Stephenson | ............ | B65G 69/20 |
| 9,745,142 B2 * | 8/2017 | Stephenson | ............. | B60S 3/004 |
| 10,414,591 B1 * | 9/2019 | Stephenson | ............ | B65G 15/62 |
| 10,479,607 B2 * | 11/2019 | Stephenson | ............ | B65G 15/62 |
| 10,858,193 B1 * | 12/2020 | Rottier | .................... | B65G 15/62 |
| 10,947,051 B2 * | 3/2021 | Stephenson | ............. | B60S 3/004 |
| 11,560,273 B2 * | 1/2023 | Stephenson | ............. | B65G 21/10 |
| 11,597,602 B2 * | 3/2023 | Hosch | .................... | B65G 21/06 |
| 11,645,851 B2 * | 5/2023 | Zhu | ........................ | G06V 20/58 |
| | | | | 706/25 |

* cited by examiner

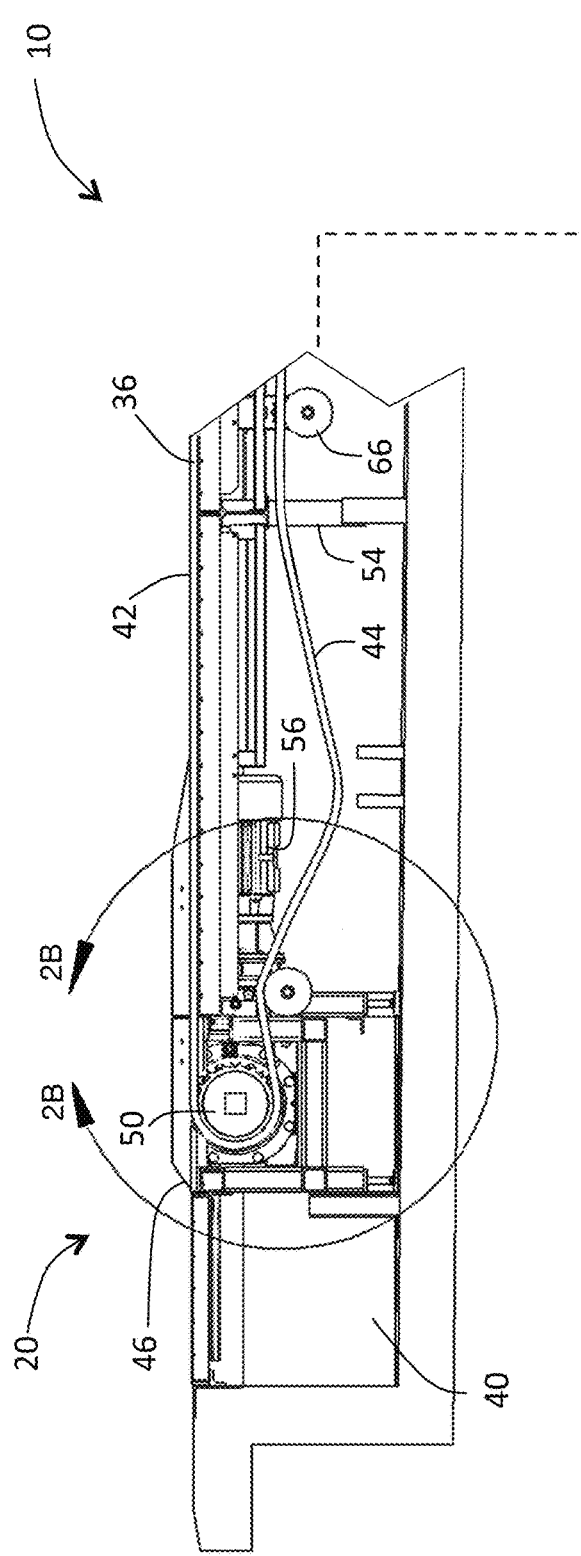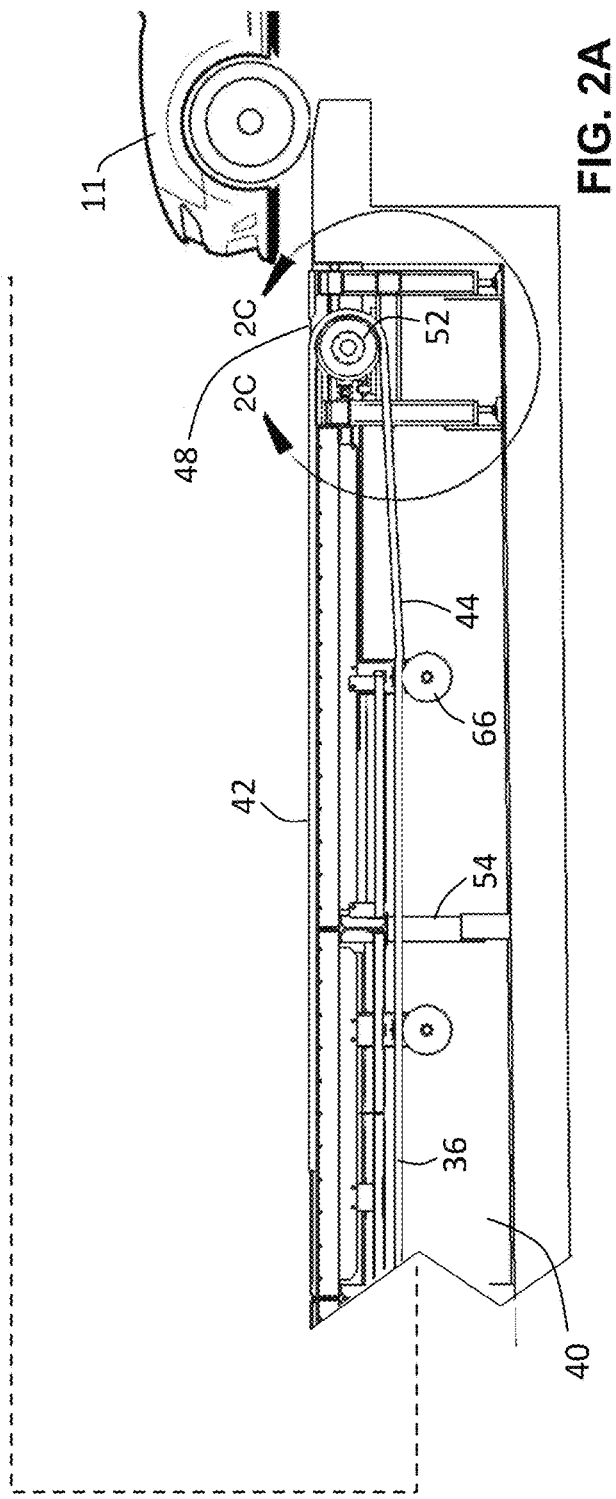
FIG. 2A

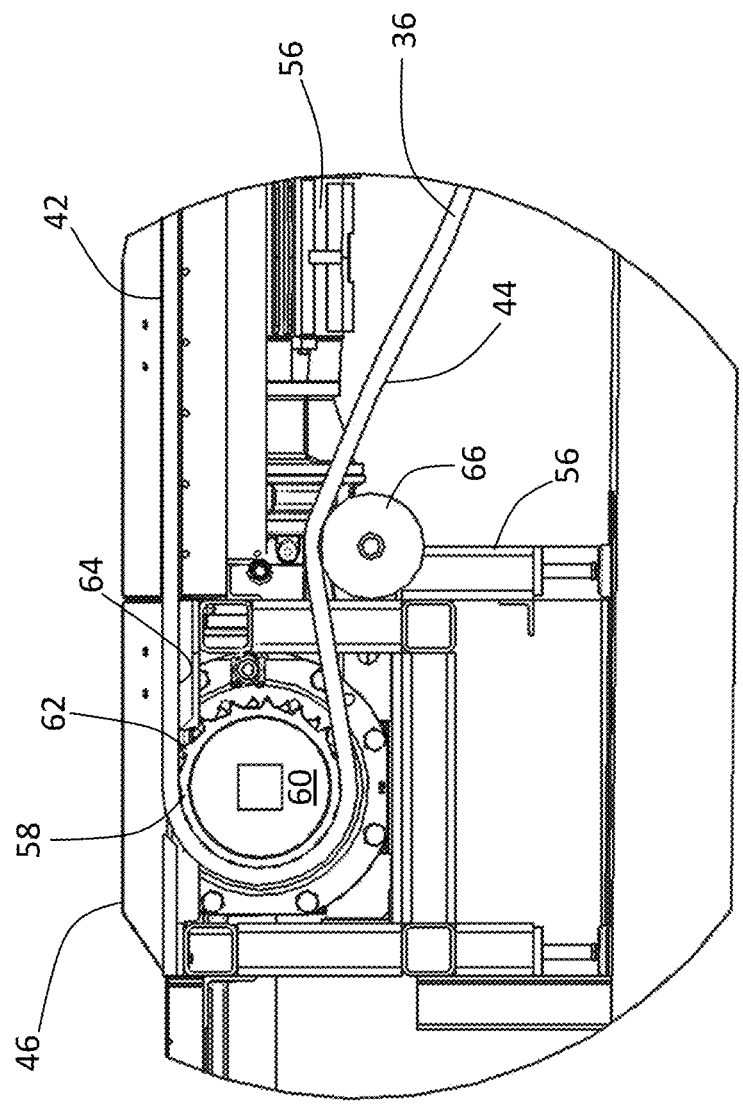

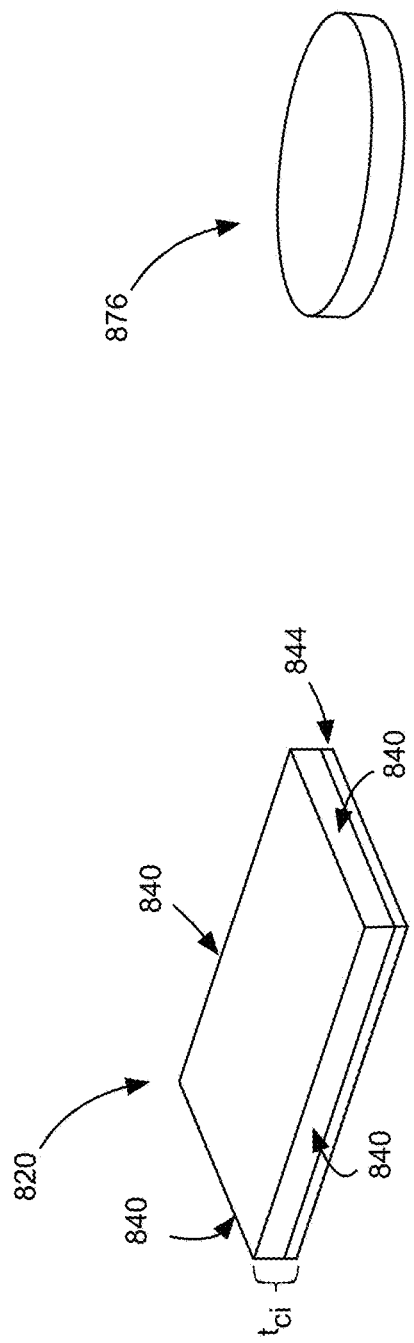
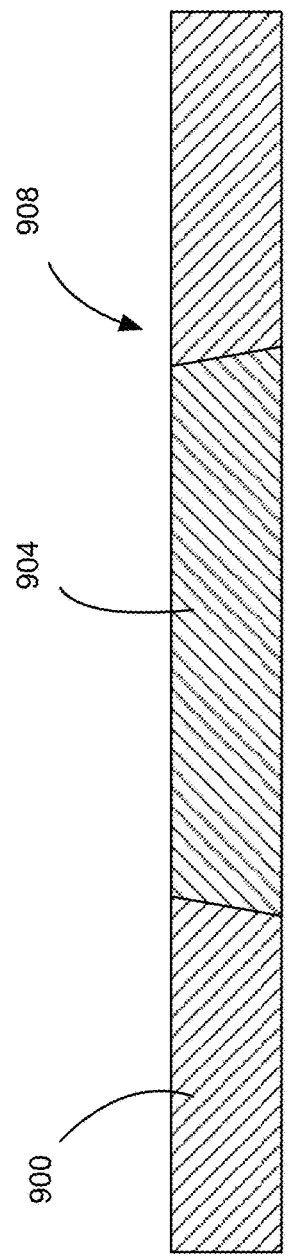

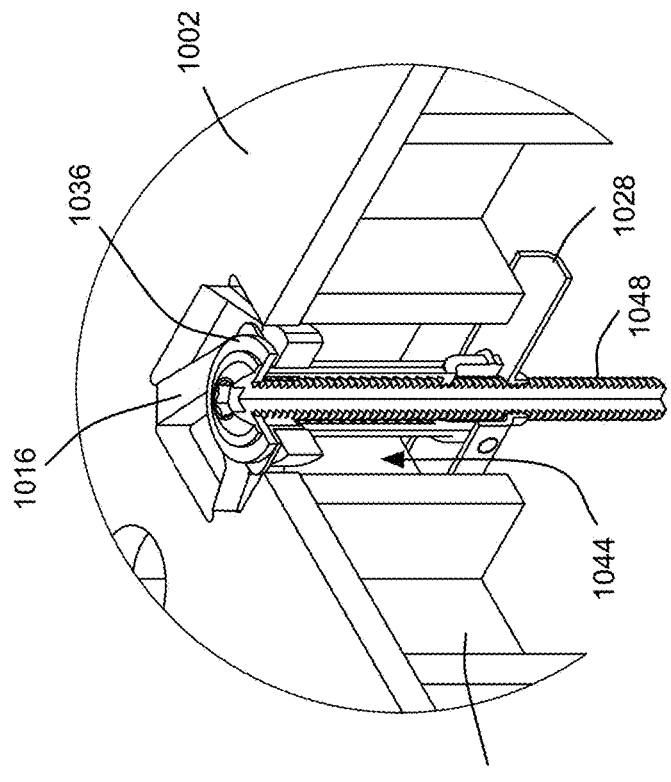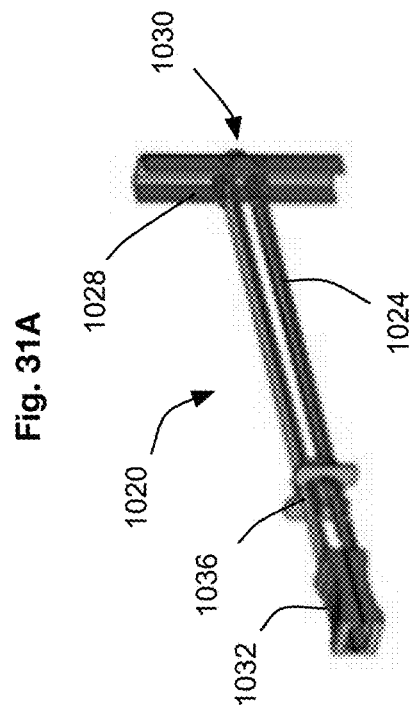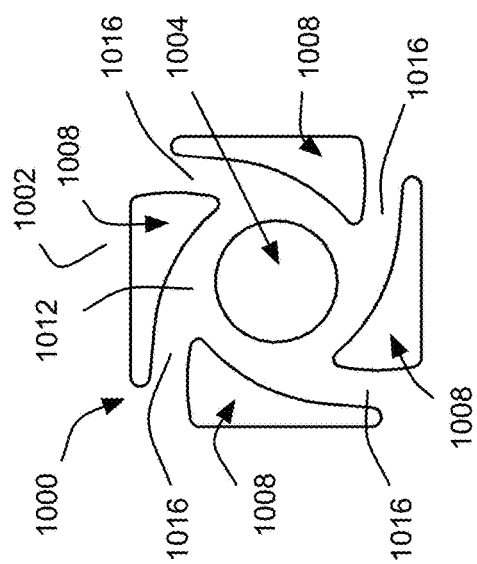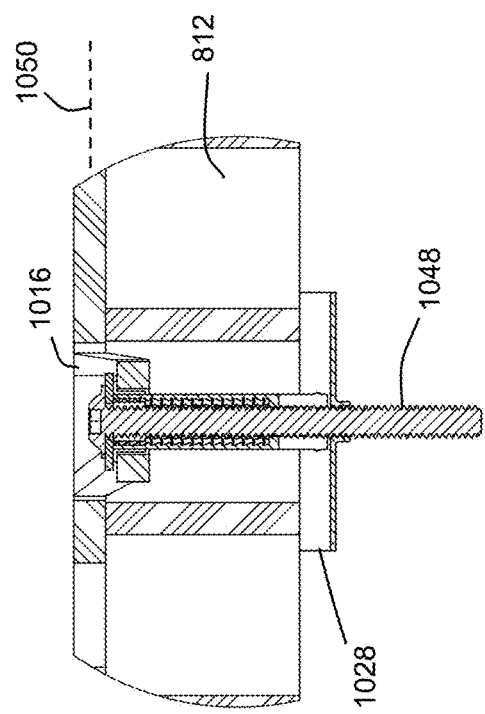

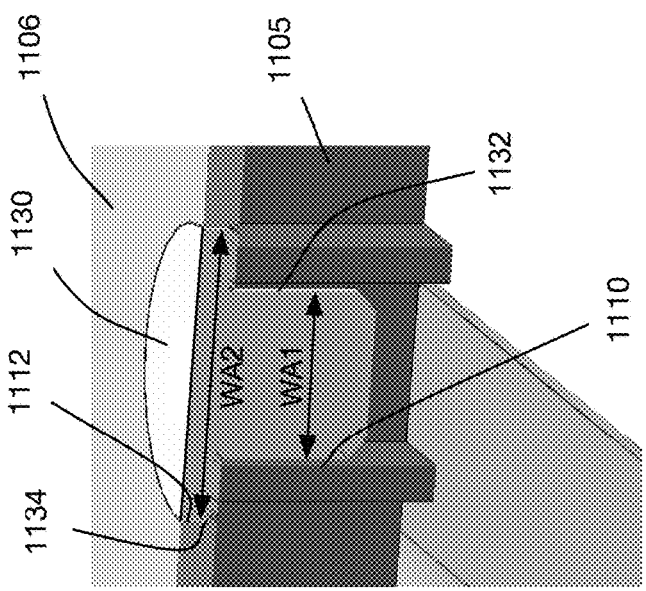
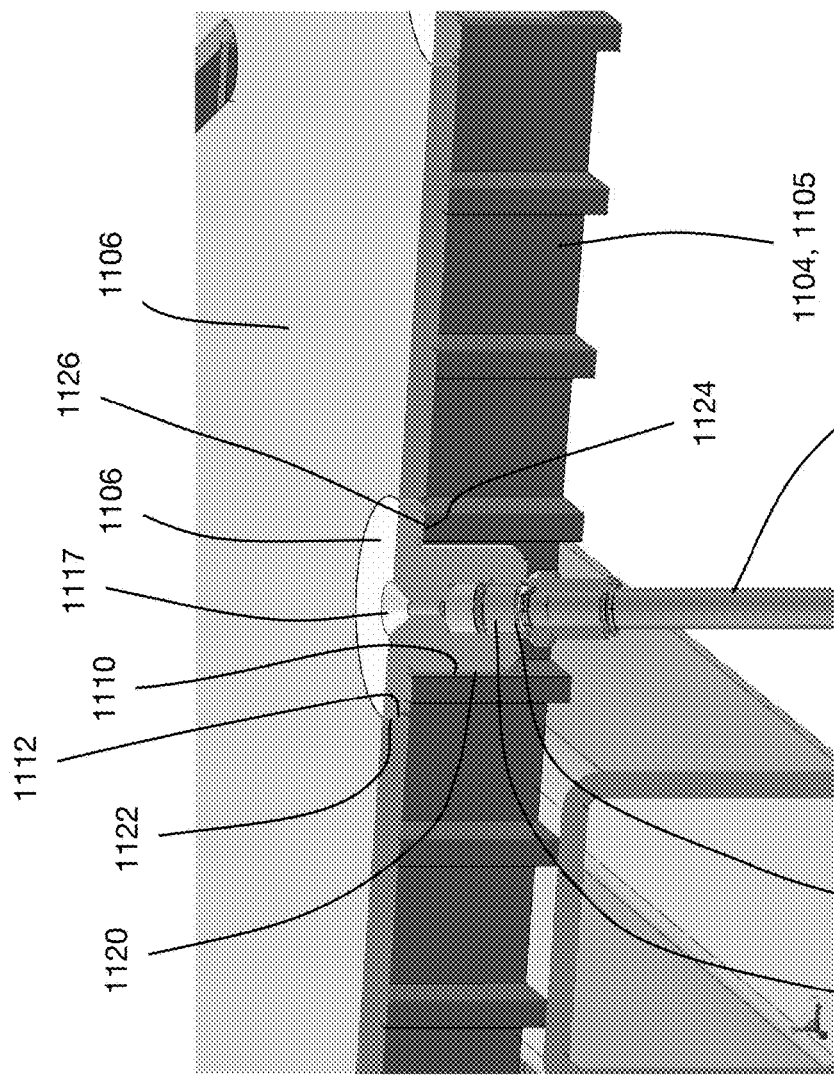
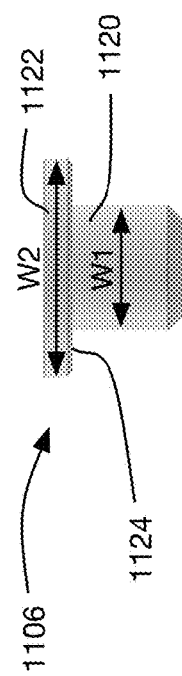

CONVEYOR SYSTEM FOR WHEELED STRUCTURES AND IMPROVEMENTS THERETO

CROSS-REFERENCE TO RELATED APPLICATION

This application claims the priority, under 35 U.S.C. § 119, of U.S. provisional patent application No. 63/262,480, filed Oct. 13, 2021; the prior application is herewith incorporated by reference in its entirety.

FIELD AND BACKGROUND OF THE INVENTION

The present disclosure relates to the field of automotive conveyor systems, and in particular to a belt contact surface for an automotive conveyor with inserts, and a conveyor system using same.

Conveyor systems employing belts are known for use in the transport of vehicles in car washes.

Some car washes employ a wash tunnel through which vehicles are transported. A single belt conveyor system, or a synchronous dual belt conveyor system is used for moving the vehicle through the wash tunnel. The belts are made from plastics and metals as these materials provide a relatively long life, and generally resist stretching and water corrosion.

The conveyor belts are supported by and travel across support decks that are conventionally made of a metal, such as steel or a steel alloy.

Over time, both the conveyor belt and the support deck wear mainly as a result of friction between the conveyor belt (while supporting a vehicle thereon) and the support deck. This wear is exacerbated by the presence of debris that is commonly removed from automotive vehicles and trapped between the conveyor belts and the support decks during the washing process for the vehicle. As the conveyor belts and the support decks wear, they can fatigue and/or rupture, requiring their replacement. The replacement of the conveyor belts can be particularly costly and labor-intensive.

Additionally, it has been found that the friction between the moving conveyor belt and the support deck can generate significant forces on the plates that make up the support deck, urging them in the direction of travel of the conveyor belt. This can lead to problems with other systems that are engaged with the support deck, being moved out of position, which can disrupt their performance. An exam of this is the belt-rinsing system.

Another problem with some vehicle conveyor systems of the prior art is that they are designed for a car wash having a specific width and are not generally usable with car washes having a significantly different width. It can be expensive for a manufacture of car washes to store (and to manufacture) many different sizes of conveyor belts, each sized to be installed on a particular size of support deck.

It would be beneficial to provide at least some form of solution to the problems described above.

SUMMARY OF THE INVENTION

In one aspect, there is provided a conveyor system, that includes an endless belt, a support deck and a belt-rinsing system. The endless belt is mounted in a longitudinal direction through a service line. The endless belt has an upper transport portion which is sized to support a wheeled structure through the service line, and a lower return portion. The support deck is positioned to support the upper transport portion of the endless belt, the support deck including a lower support deck structure, and a plurality of wear plates that are supported on the lower support deck structure and which are engageable with the upper transport portion of the endless belt. The support deck includes a plurality of alignment aperture pairs. Each alignment aperture pair includes a first alignment aperture through the lower support deck structure, and a second alignment aperture through one of the plurality of wear plates. A belt-rinsing system includes a plurality of rinsing system outlet bodies, wherein each of the plurality of rinsing system outlet bodies extends into one of the first alignment apertures of the lower support deck structure and into one of the second alignment apertures of one of the plurality of wear plates, so as to inhibit movement of one of the plurality of wear plates relative to the lower support deck structure. Each of the plurality of rinsing system outlet bodies has an outlet body inlet that is connectable to a source of rinsing system liquid, and an outlet body outlet that faces the upper transport portion of the endless belt so as to eject the rinsing system liquid on the upper transport portion of the endless belt.

In accordance with an added feature of the invention, the lower support deck structure has an outlet body support surface. Each of the plurality of rinsing system outlet bodies has: a first outlet body portion with a first width being sized to fit into the first alignment aperture; a second outlet body portion with a second width that is larger than the first width, and which is sized to fit into the second alignment aperture; and an outlet body shoulder disposed between the first and second outlet body portions that is supported on the outlet body support surface between the first alignment aperture and the second alignment aperture of each of the alignment aperture pairs.

In accordance with another feature of the invention, the outlet body support surface is an upper surface of the lower support deck structure.

In accordance with an additional feature of the invention, the plurality of rinsing system outlet bodies are made from a polymeric material and the plurality of wear plates is made from the polymeric material.

In accordance with a further feature of the invention, the plurality of rinsing system outlet bodies and the plurality of wear plates are made from a thermoplastic material.

In accordance with yet another feature of the invention, the plurality of rinsing system outlet bodies and the plurality of wear plates are made from an ultra-high-molecular-weight (UHMVV) polyethylene.

In accordance with still another feature of the invention, the plurality of wear plates include a plurality of wheel support wear plates, and a plurality of peripheral wear plates. The plurality of wear plates has a plurality of insert apertures and a plurality of wear inserts are positioned in the plurality of insert apertures. The wear plates are made from a wear plate material and the wear inserts are made from a wear insert material and that is different than the wear plate material. The plurality of wheel support wear plates are positioned to directly support regions of the endless belt that directly support wheels of the wheeled structure. The plurality of peripheral wear plates are adjacent the plurality of wheel support wear plates. At least a majority of the plurality of wear inserts are positioned on the wheel support wear plates.

In accordance with still yet another feature of the invention, a drive module is positioned to drive the endless belt.

In accordance with a concomitant feature of the invention, a rinsing system liquid transport conduit is provided. An outlet body inlet is connectable to the source of the rinsing system liquid by means of the rinsing system liquid transport conduit that includes a length of hose that is sufficiently long so as to permit lifting up of the rinsing system outlet body from the alignment aperture pair, and wherein the rinsing system liquid transport conduit is releasably connected to the outlet body inlet.

In another aspect, there is provided a conveyor system, that includes an endless belt, a support deck, and a plurality of alignment bodies. The endless belt is mounted in a longitudinal direction through a service line. The endless belt has an upper transport portion which is sized to support a wheeled structure through the service line, and a lower return portion. The support deck is positioned to support the upper transport portion of the endless belt. The support deck includes a lower support deck structure, and a plurality of wear plates that are supported on the lower support deck structure and which are engageable with the upper transport portion of the endless belt. The support deck includes a plurality of alignment aperture pairs, wherein each alignment aperture pair includes a first alignment aperture through the lower support deck structure, and a second alignment aperture through one of the plurality of wear plates. Each of the plurality of alignment bodies extends into one of the first alignment apertures of the lower support deck structure and into one of the second alignment apertures of one of the plurality of wear plates, so as to inhibit movement of said one of the plurality of wear plates relative to the lower support deck structure. Each of the plurality of alignment bodies has a first alignment body portion having a first width, and which is sized to fit into the first alignment apertures. The second alignment body portion has a second width that is larger than the first width, and which is sized to fit into the second alignment apertures. There is provided an alignment body shoulder between the first and second alignment body portions, which is supported on an alignment body support surface between the first alignment aperture and the second alignment aperture of each of the alignment aperture pairs.

In another aspect, there is provided a conveyor system, that includes an endless belt and a support deck. The endless belt is mounted in a longitudinal direction through a service line, and has an upper transport portion which is sized to support a wheeled structure through the service line, and a lower return portion. The support deck is positioned to support the upper transport portion of the endless belt, the support deck including a lower support deck structure, and a plurality of wear plates that are supported on the lower support deck structure and which are engageable with the upper transport portion of the endless belt. The plurality of wear plates includes a plurality of wheel support wear plates, and a plurality of peripheral wear plates. The plurality of wear plates includes a plurality of insert apertures, and a plurality of wear inserts positioned in the plurality of insert apertures, wherein the wear plates are made from a wear plate material and the wear inserts are made from a wear insert material and that is different than the wear plate material. The plurality of wheel support wear plates is positioned to directly support regions of the endless belt that directly support wheels of the wheeled structure. The plurality of peripheral wear plates are adjacent the plurality of wheel support wear plates. At least a majority of the plurality of wear inserts are positioned on the wheel support wear plates.

For a better understanding of the various embodiments described herein and to show more clearly how they may be carried into effect, reference will now be made, by way of example only, to the accompanying drawings.

BRIEF DESCRIPTIONS OF THE DRAWINGS

FIG. 2A is a partial side sectional view of the conveyor system according to the embodiment of FIG. 1.

FIG. 2B is a partial side sectional view of the conveyor system with reference to line 2B-2B of FIG. 2A.

FIG. 23 is a perspective view of one of the wear inserts of FIG. 22.

FIG. 27 is a perspective view of a round wear insert for use with wear plates similar to those of FIG. 22 in accordance with another embodiment.

FIG. 28 is a cross-sectional elevation view of a wear plate and wear inserts in accordance with a further embodiment.

FIG. 29 shows a top view of a holddown of a wear plate in accordance with another embodiment.

FIG. 30 shows a bolt anchor for use with the wear plate of FIG. 29.

FIGS. 31A and 31B show the wear plate of FIG. 29 after being secured to a modular grid panel using the bolt anchor of FIG. 30.

Figure 33:
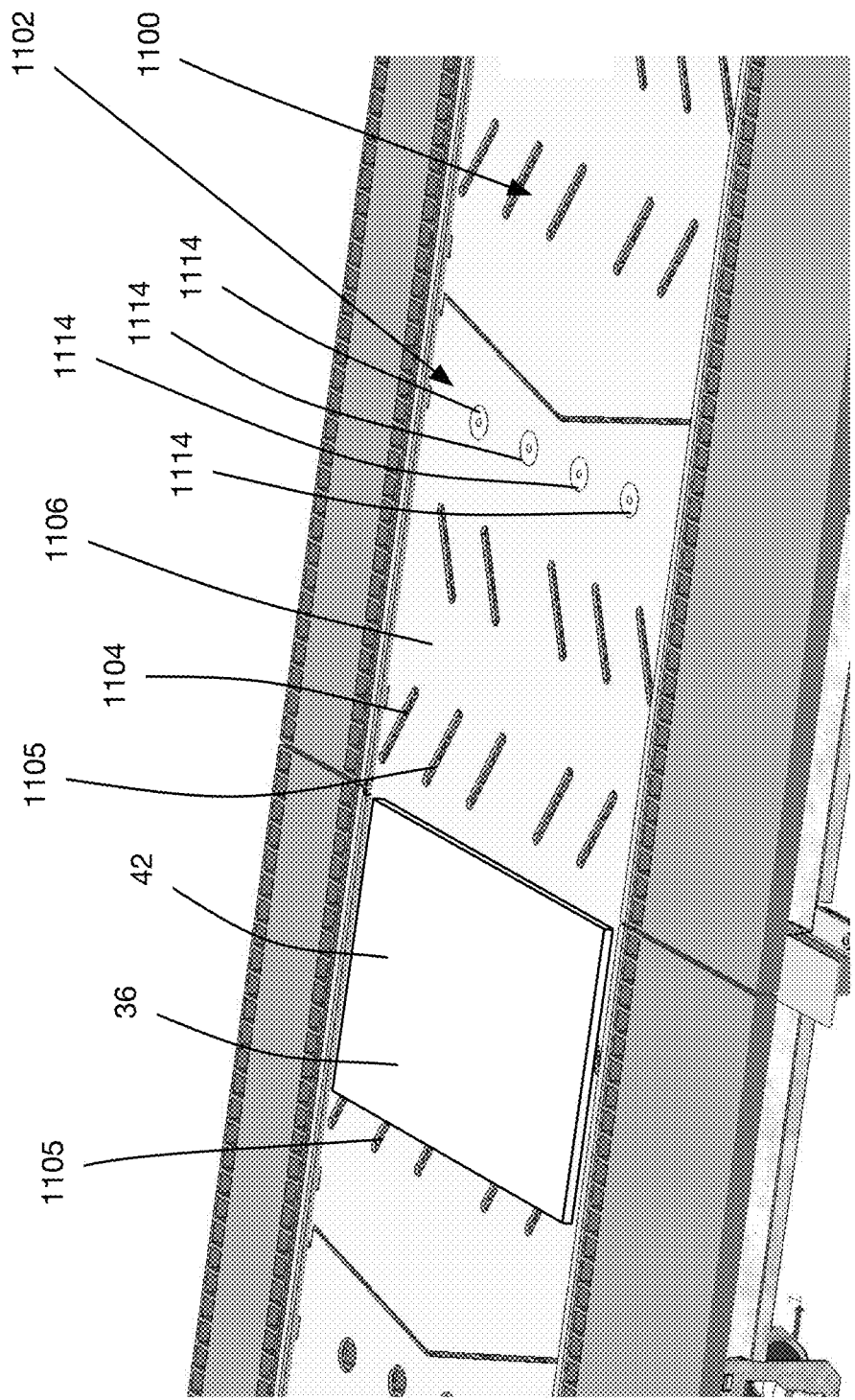
FIG. 33 is a perspective view of another support deck with a rinsing system that assists in locating wear plates.

FIG. 35 a magnified sectional perspective view of the support deck shown in FIG. 33 along with the rinsing system.

FIG. 35A is a magnified elevation view of a rinsing system outlet body that is part of the rinsing system shown in FIG. 33.

FIG. 36 is a magnified elevation view of the support deck shown in FIG. 33 along with an alignment body.

Figure 37:
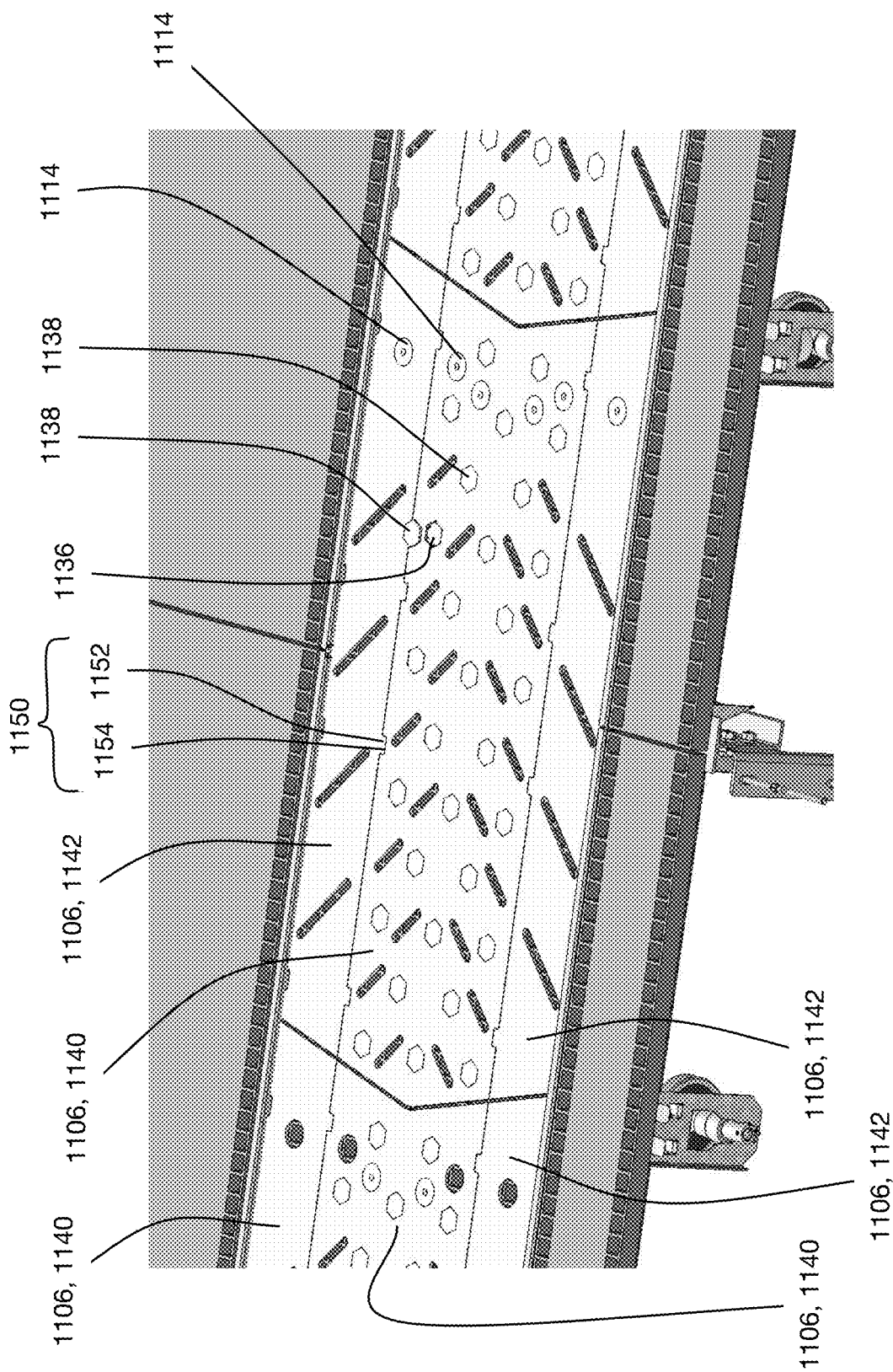

FIG. 37 is a perspective view of another support deck with wear plates that are specialized based on whether they support wheels of a wheeled structure or not.

Figure 38:
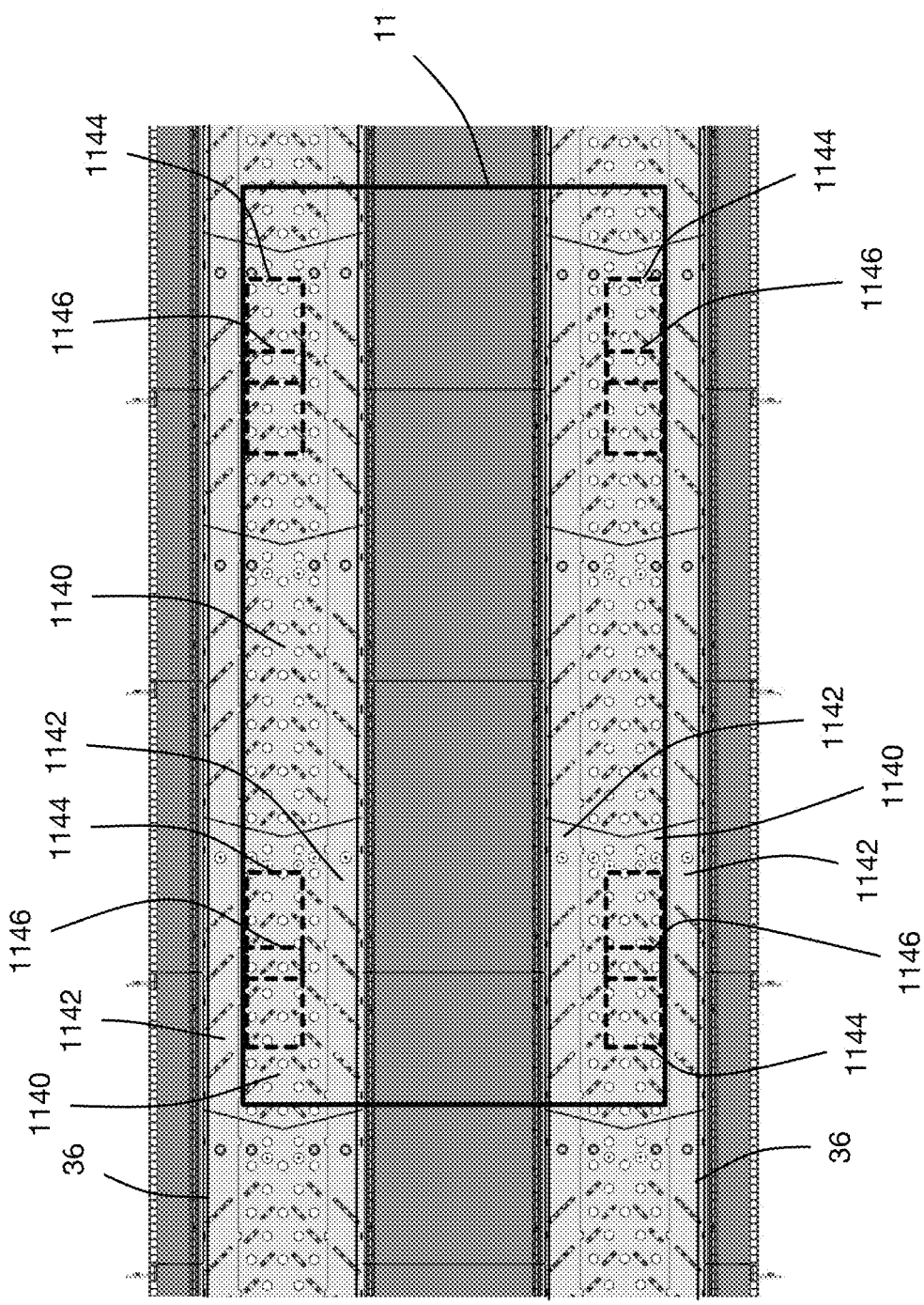

FIG. 38 is a plan view of the support deck in FIG. 37 illustrating a wheeled structure being supported thereon.

DETAILED DESCRIPTION OF THE INVENTION

For simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

It will also be noted that the use of the term "a" or "an" will be understood to denote "at least one" in all instances unless explicitly stated otherwise or unless it would be understood to be obvious that it must mean "one".

The following detailed description is merely exemplary in nature and is not intended to limit the disclosure or the application and uses of the disclosure. A person skilled in the relevant art will recognize that other configurations and arrangements can be used without departing from the scope of the disclosure. Furthermore, there is no intention to be bound by any expressed or implied theory presented in the preceding technical field, background, brief summary, or the following detailed description.

Figure 1:
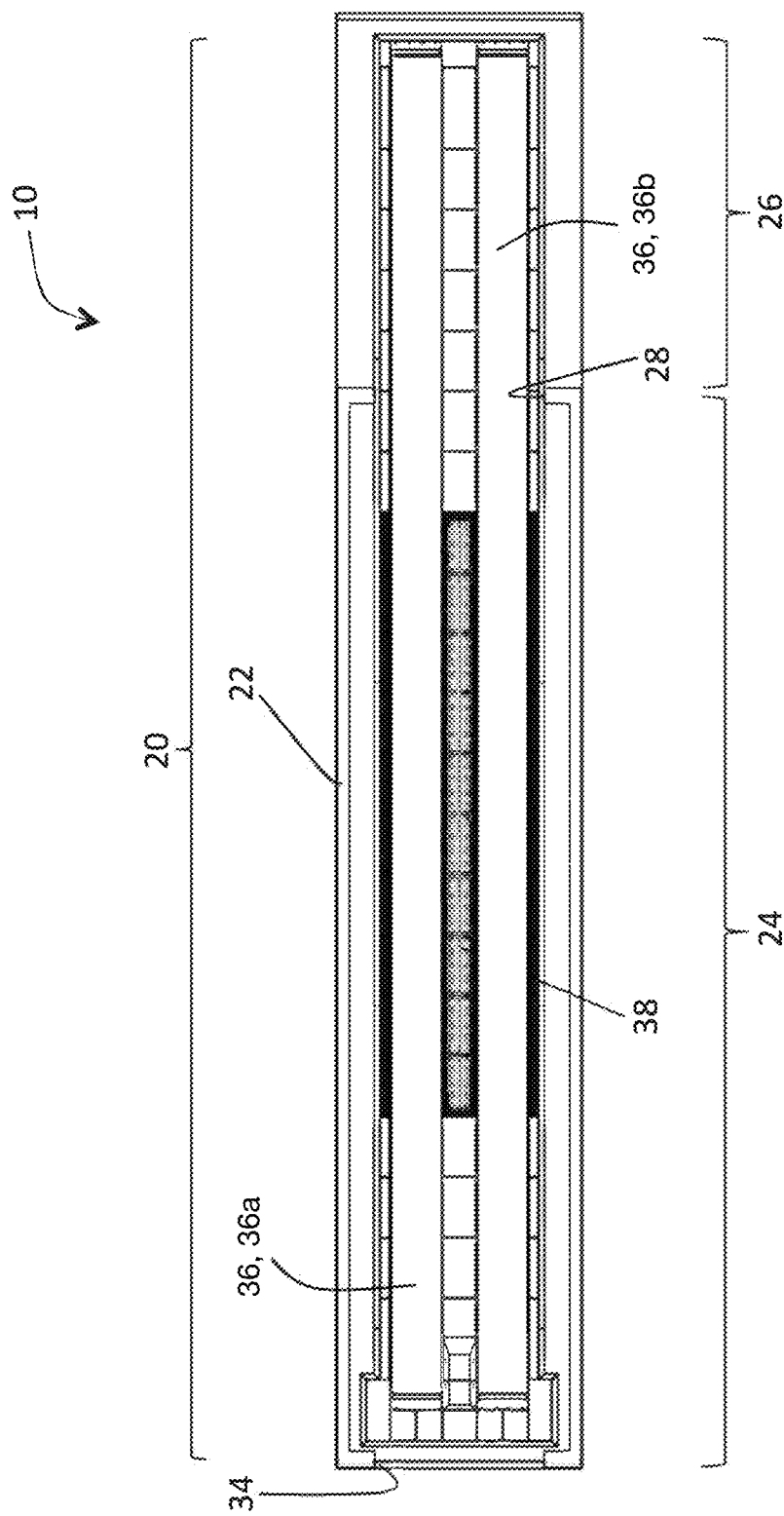
FIG. 1 is a plan view of the conveyor system according to an embodiment hereof.

Referring now to the figures of the drawings in detail and first, particularly to FIG. 1 thereof, there is shown a service line 10 having a conveyor system 20 for moving a wheeled structure 11, in accordance with an embodiment. As used herein, the term service line is not intended to be restrictive and may encompass for example an automatic vehicle wash station 19 (e.g., an automatic wash station for cars, commercial trucks, and other vehicles), a manufacturing or assembly line (e.g., for cars, trucks, non-powered mobile units, and other vehicles) as well as a repair or detailing station (e.g., for cars, trucks, and other vehicles). In addition, the term wheeled structure is not intended to be restrictive, and may encompass, for example, powered landborne vehicles (e.g., trucks, automobiles, SUVs, tractors, and recreational vehicles), non-powered landborne mobile units (e.g., recreational trailers, utility trailers, etc.), airborne vehicles (e.g., airplanes), and wheeled chasses for any of the aforementioned.

The conveyor system 20 is adapted to transport a wheeled structure along a longitudinal length of the service line 10. As presented in FIG. 1, service line 10 is shown in the form of a car wash station having a wash tunnel 22. Accordingly, the conveyor system 20 includes a service zone 24 within the region of the wash tunnel 22 through which the vehicle is transported for a wash cycle. The conveyor system 20 also may also include a loading zone 26 adjacent a tunnel entrance 28, where vehicles align and initially load onto the conveyor system 20. Additionally, the wheeled structure 11 shown in FIG. 2A is a vehicle 29 (and specifically an automobile). For readability, other parts of the description may refer to the term 'vehicle', particularly since the example shown in FIG. 1 relates to a car wash station, however it will be noted that the car wash station 19 is but an example of a service line 11, and that the vehicle 29 is but an example of a suitable wheeled structure 11 that may alternatively be conveyed on the conveyor system 20.

The conveyor system 20 is configured as a dual-belt system containing a pair of endless belts 36 (shown individually at 36a and 36b) mounted in a longitudinal direction through the service line 10. The endless belts 36a, 36b are positioned in parallel and spaced-apart relationship relative to one another through the loading and service zones 26, 24. In the region between the pair of endless belts 36a, 36b, there may be positioned a central stationary platform 38 of removable panels that permit access to regions under the pair of endless belts 36a, 36b, in particular for servicing and maintenance. It will be appreciated that, in embodiments of the conveyor system 20 that are provided with two or more endless belts to transport the wheeled structure 11 along the service line 10, the endless belts will move synchronously with respect to one another. While two endless belts 36a and 36b are shown in FIG. 1, each of which supports a portion of the, it will be noted that, in some embodiments the conveyor system 20 may be provided with a single, large endless belt 36.

The endless belts 36a, 36b are made of a plurality of plastic belt segments that are hingedly coupled via pins that are typically made of metal or plastic. The plastic of the belt segments has a hardness HBS that enables the belt segments to withstand the load of a vehicle positioned thereon.

Figure 2C:
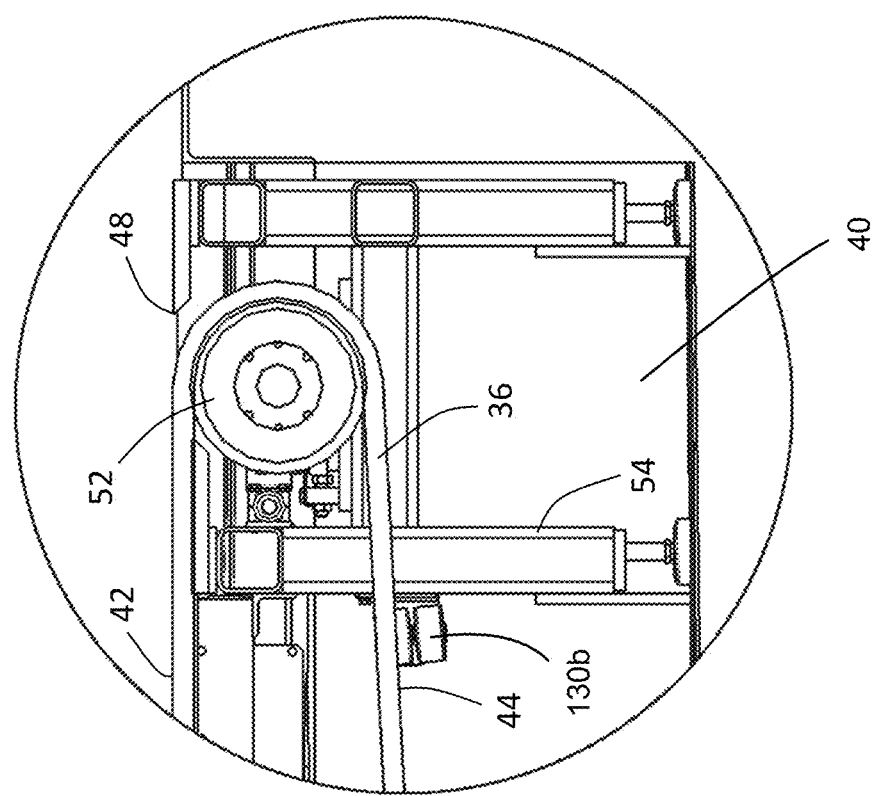
FIG. 2C is a partial side sectional view of the conveyor system with reference to line 2C-2C of FIG. 2A.

Turning now to FIGS. 2A, 2B and 2C, the conveyor system 20 is generally supported within a trench 40 having a depth suitable to house the required drive and guide mechanisms, and to permit maneuverability to service personnel. The endless belt 36 has an upper transport portion 42 and a lower return portion 44, and extends along the conveyor system 20 between a drive end 46 and an idler end 48. The drive end 46 and idler end 48 provide axially elongated rollers 50 and 52, respectively, which are rotatably supported on a conveyor frame 54, to guide the endless belt 36 around the respective drive and idler ends 46 and 48.

The drive end 46 includes a drive module 56 that is positioned to drive the endless belt around the drive and idler ends 46 and 48. The drive module 56 may be an electric motor as shown, and may include at least one drive member 58 to engage the endless belt 36 and move it around the respective drive and idler ends 46 and 48. As shown, the drive member 58 is provided in the form of at least one sprocket 60 provided with sprocket teeth 62 to engage complementary tracks (not shown) on the inward surface 64 of the endless belt 36. The conveyor system 20 will additionally include guide members 66 supported upon the conveyor frame 54 to support the lower return portion 44 of the endless belt 36 as it moves back towards the idler end 48 on the underside of the conveyor system 20. As shown, the guide members 66 are provided in the form of rollers.

In motion, the upper transport portion 42 of the endless belt 36 moves in tension from the idler end 48 towards the drive end 46 by the drive member 58, while the lower return portion 44 moves in a slackened state from the drive end 46 towards the idler end 48.

Figure 3A:
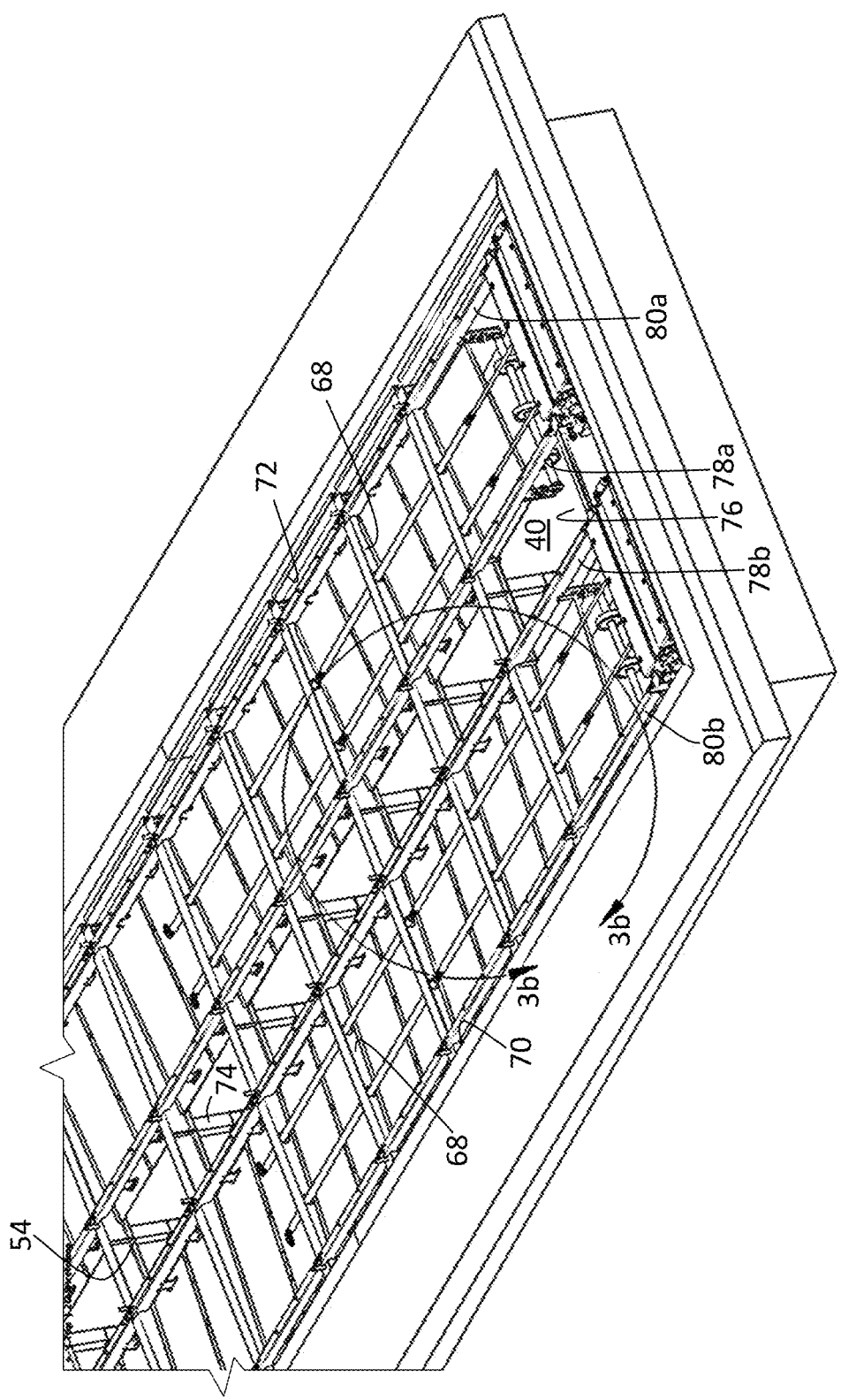
FIG. 3A is a partial isometric view of the conveyor system according to the embodiment of FIG. 1, highlighting features of the conveyor frame.
Figure 3B:
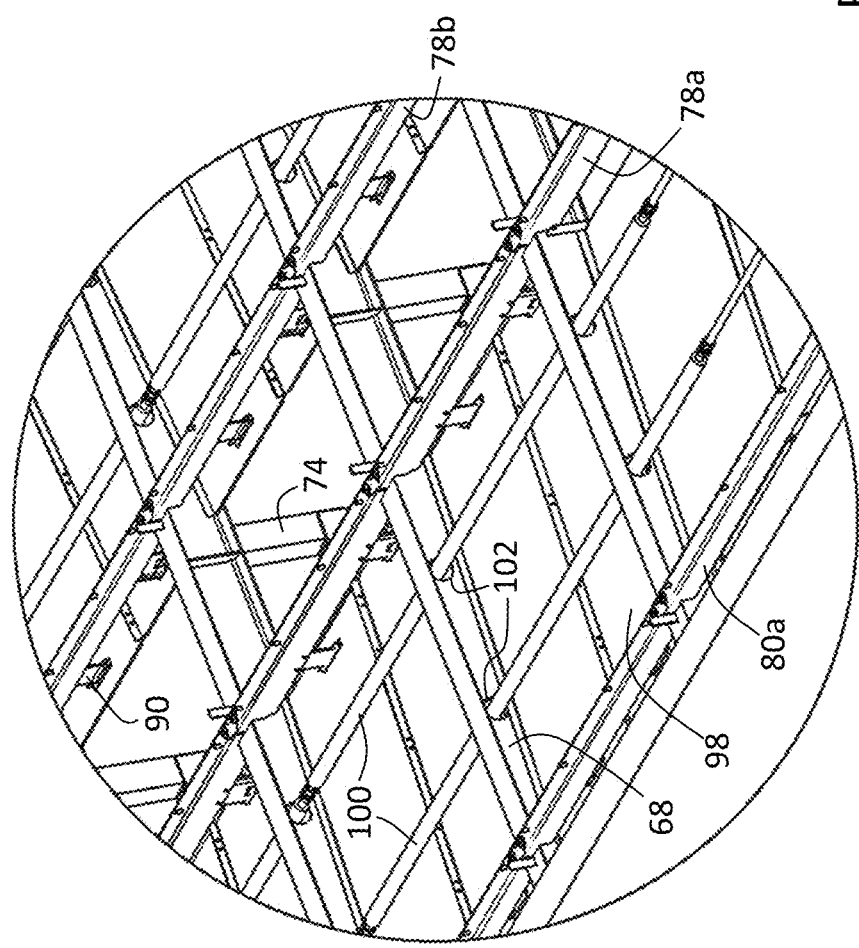
FIG. 3B is a partial isometric view of the conveyor system with reference to line 3B-3B of FIG. 3A.

Turning now to FIGS. 3A and 3B, shown is an enlarged view of the conveyor system 20 with the endless belt 36 and associated support structure removed to highlight features of the conveyor frame 54. The conveyor frame 54 includes a plurality of cross-members 68 positioned transversely relative to the longitudinal direction of the service line 10. The cross-members 68 are dimensioned to span the width of the trench 40, and are adapted to mount on opposing surfaces 70 and 72. Each cross-member 68 also provides at least one footing 74 at approximately a midpoint thereof, extending to a floor 76 of the trench 40 to provide additional load-bearing performance to the conveyor frame 54.

Arranged in the longitudinal direction, the conveyor frame 54 additionally provides a plurality of support rails that extend the longitudinal length of the service line 10, from the idler end 48 to the drive end 46. The support rails are arranged as two inner support rails 78a, 78b and two outer support rails 80a, 80b. The inner support rails 78a, 78b are generally positioned symmetrically about the longitudinal centerline of the service line 10, while the two outer support rails 80a, 80b are situated proximal to the longitudinal walls of the trench 40. The inner support rails 78a, 78b and the outer support rails 80a, 80b may be fixedly attached in place by rivets, threaded fasteners (e.g., bolts), metallurgic bonding (e.g., welded attachment), or any other suitable means to achieve a secure attachment.

Figure 4:
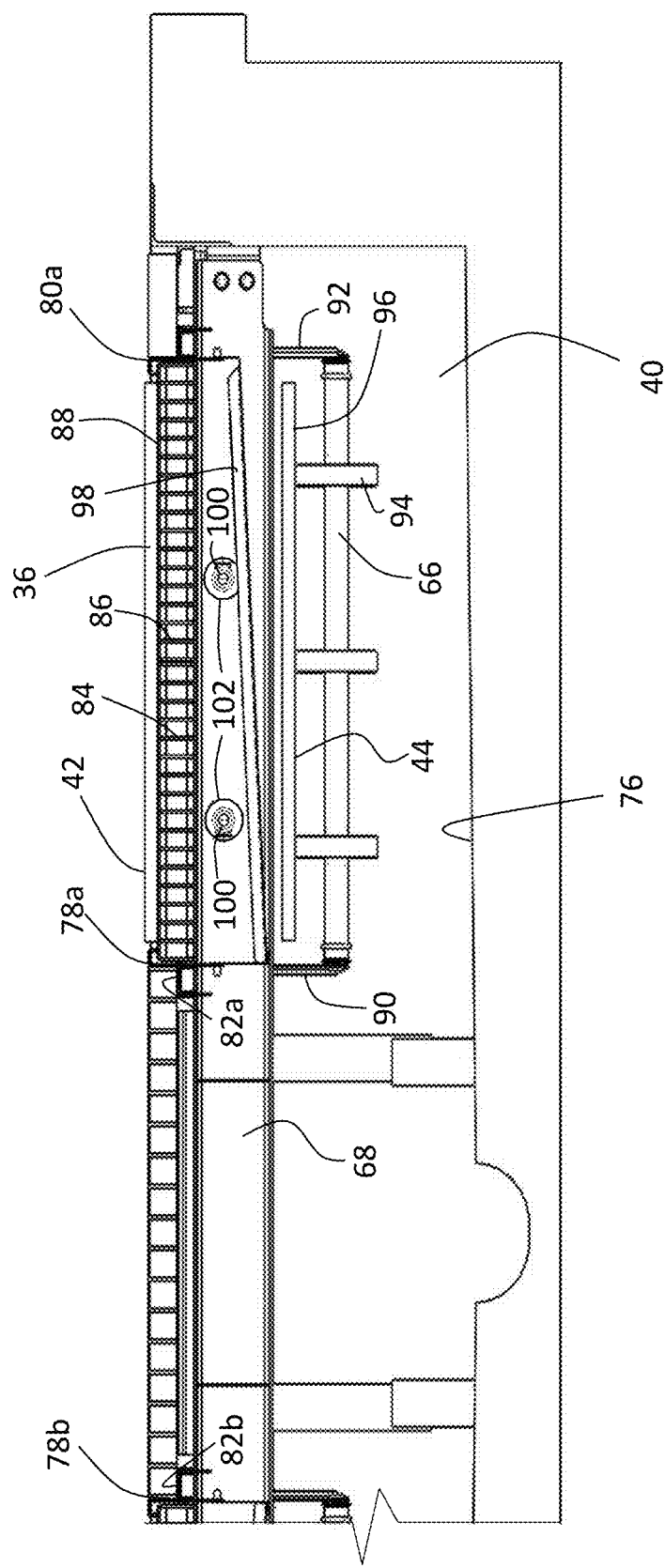
FIG. 4 is a partial transverse sectional view of the conveyor system according to FIG. 1, highlighting features in the region of the endless belt.

Having reference to FIG. 4, the inner support rails 78a, 78b cooperatively define a gap spacing for the central stationary platform 38 provided between the endless belts 36a, 36b. The inner support rails 78a, 78b each provide a respective seat 82a, 82b configured to receive and support the central stationary platform 38. In the embodiment shown, the central stationary platform 38 is provided in the form of fiberglass or thermoplastic grating. In addition, for each endless belt 36, the respective opposing inner and outer rails 78a, 80a define a gap spacing to receive a support deck 84.

The support deck 84 generally includes a lower support deck structure 85 and a plurality of wear plates 88. The lower support deck structure 85 may include a plurality of modular grid panels 86 adapted to be positioned end to end relative to one another along the longitudinal length of the service line 10. The modular grid panels 86 are provided with a length that aligns the point of contact between adjacent grid panels 86 on a transverse cross-member 68, providing weight-bearing support thereto. The support deck 84 is positioned between the upper transport portion 42 and lower return portion 44 of the endless belt 36, generally in close proximity to the upper transport portion 42. In this way, the support deck 84 provides support to the upper transport portion 42 of the endless belt 36, and thereby a load placed thereon from a wheeled structure placed upon the conveyor system 20. The plurality of wear plates 88 together form a belt contact surface that facilitates sliding of the endless belt 36 over the support deck 84. The wear plates 88 are provided between the upper transport portion 42 and the lower support deck structure 85. The belt contact surface is the surface of the support deck 84 facing the endless belt 36 during normal use. The plurality of wear plates 88 may wear during engagement with the endless belt 36, and can have a thickness selected to provide a suitably long service life.

The arrangement of the inner and outer support rails 78a, 78b, 80a, 80b may additionally be used to mount the guide member 66 supporting the lower return portion 44 of the endless belt 36. As shown, the inner and outer support rails 78a, 80a provide respective guide hangers 90, 92 that support the guide member 66 in a transverse direction relative to the longitudinal direction of the service line 10. As shown, the guide member 66 is provided with a plurality of rollers 94 that support an outward surface 96 of the endless belt 36 along the lower return portion 44.

Continuing with FIG. 4, also provided between the upper transport portion 42 and the lower return portion 44 of the endless belt 36, and in particular between the support deck 84 and the lower return portion 44 is a debris deflector 98. The debris deflector 98 provides a barrier to protect the lower return portion 44 from debris falling from the support deck 84, in particular where the support deck 84 includes the modular grid panels 86. The debris deflector 98 is generally mounted on an angle directed downwardly towards the longitudinal centerline of the service line. The debris deflector 98 may be mounted on dedicated brackets, or may be mounted on the guide hangers 90 and 92 used for supporting the guide members 66 (as shown). The debris deflector 98 is generally configured to provide a contiguous barrier between adjacent cross-members, so as to maximize the protection from falling debris. In some embodiments, the debris deflector 98 may be provided in the form of multiple panels arranged and fastened in side-by-side relationship to one another.

It will be recognized that the arrangement of the support deck 84, the debris deflector 98 and the longitudinally-spaced cross-members 68 define a partial enclosure in the region between the upper transport portion 42 and the lower return portion 44 of the endless belt 36. To assist in reducing the likelihood of freezing conditions on the conveyor system 10, in particular sections exposed to the outside environment, such as the loading zone 26 shown in FIG. 1, at least a portion of the conveyor system 20 may include a heater in these partial enclosures between adjacent cross-members 68. Referring to FIGS. 3A-3B and 4, the conveyor system 20 provides a heater 100 positioned between the support deck 84 and the debris deflector 98, extending in the longitudinal direction across one or more of the partial enclosures delimited longitudinally between adjacent cross members 68. Accordingly, the partial enclosures containing the heater 100 provide a region of higher heat concentration relative to other areas within the trench 40, in particular the area below the debris deflector 98. In this way, the support deck 84 and the endless belt 36 supported thereon, are positioned therebetween receive heat from the region of higher heat concentration, thereby reducing the likelihood of a freeze event in the conveyor system 20. It will be appreciated that freeze events in conveyor systems can result in extensive damage to the endless belt 36 and/or drive module 56.

To enable passage of the heater 100 between adjacent partial enclosures separated by the cross-members 68, the cross-members 68 are adapted with one or more pass-through apertures 102, depending on whether the heater is adapted to pass once through the desired heated portion, or in a serpentine path therethrough. In the embodiment shown in FIG. 4, two pass-through apertures are provided for each side of the conveyor system 20.

It will be appreciated that the heater 100 may take on a variety of forms. For example, the heater 100 may be configured as a convective heater, such as a convective tube heater including both smooth and finned-tube varieties. A convective tube heater will generally be part of a fluid circuit having an electric or gas-fired heater module to deliver a heated fluid therein. The heater 100 may also be configured as a radiant heater such as a gas-fired radiant tube heater, or a resistive electrical heating element.

The debris deflector 98 may be formed from any suitable material including but not limited to metal (e.g., stainless steel, galvanized steel, aluminum, etc.), thermoplastics (e.g., polypropylene, polyethylene, etc.) and composites. To promote direction of the emitted heat from heater 100 towards the support deck 84, the debris deflector 98 may be adapted with at least a selected level of thermal reflectivity. The thermal reflectivity may be achieved by constructing the debris deflector 98 in the form of a radiant barrier. Alternatively, a radiant barrier may be separately formed and applied to the debris deflector 98, for example in the form of a thin radiant barrier sheet attached thereto. Radiant barriers are typically highly reflective materials (e.g., aluminum or polished stainless-steel foil) applied to a substrate. Exemplary substrates may include kraft paper, oriented strand board, plastic films and plywood. For environments that experience high moisture levels, for example a car wash tunnel, the substrate may be of metal or thermoplastic construction. Exemplary thermoplastic substrates may include polypropylene or polyethylene foam core. In general, the material applied to the substrate should exhibit an emittance of less than 0.25, as measured by ASTM C1371. In addition to polished metallic films, low-emittance coatings such as metal oxide may be used on a suitable substrate. It will be appreciated that the side of the debris deflector 98, or separately formed sheet, facing the support deck 84 is the side adapted to receive the highly reflective material. In other words, the highly reflective material, and thus the effective side of the radiant barrier is intended to face the region of higher heat concentration between the debris deflector 98 and the support deck 84.

Figure 5:
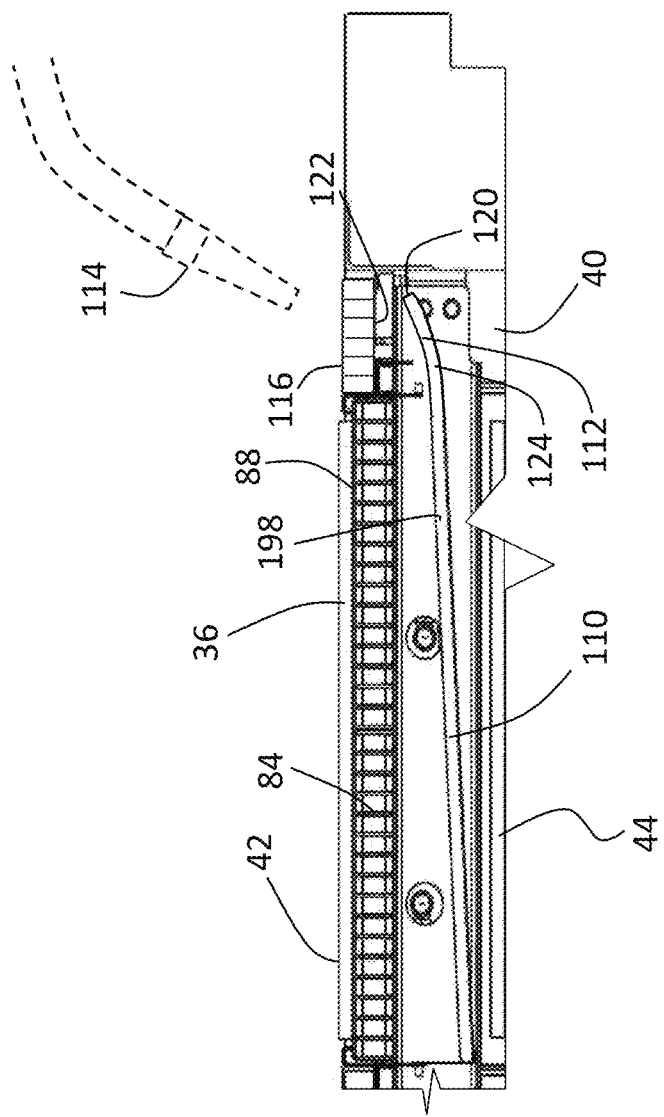
FIG. 5 is a partial transverse section view of the conveyor system according to FIG. 1, showing an alternative embodiment of the debris deflector.
Figure 6:
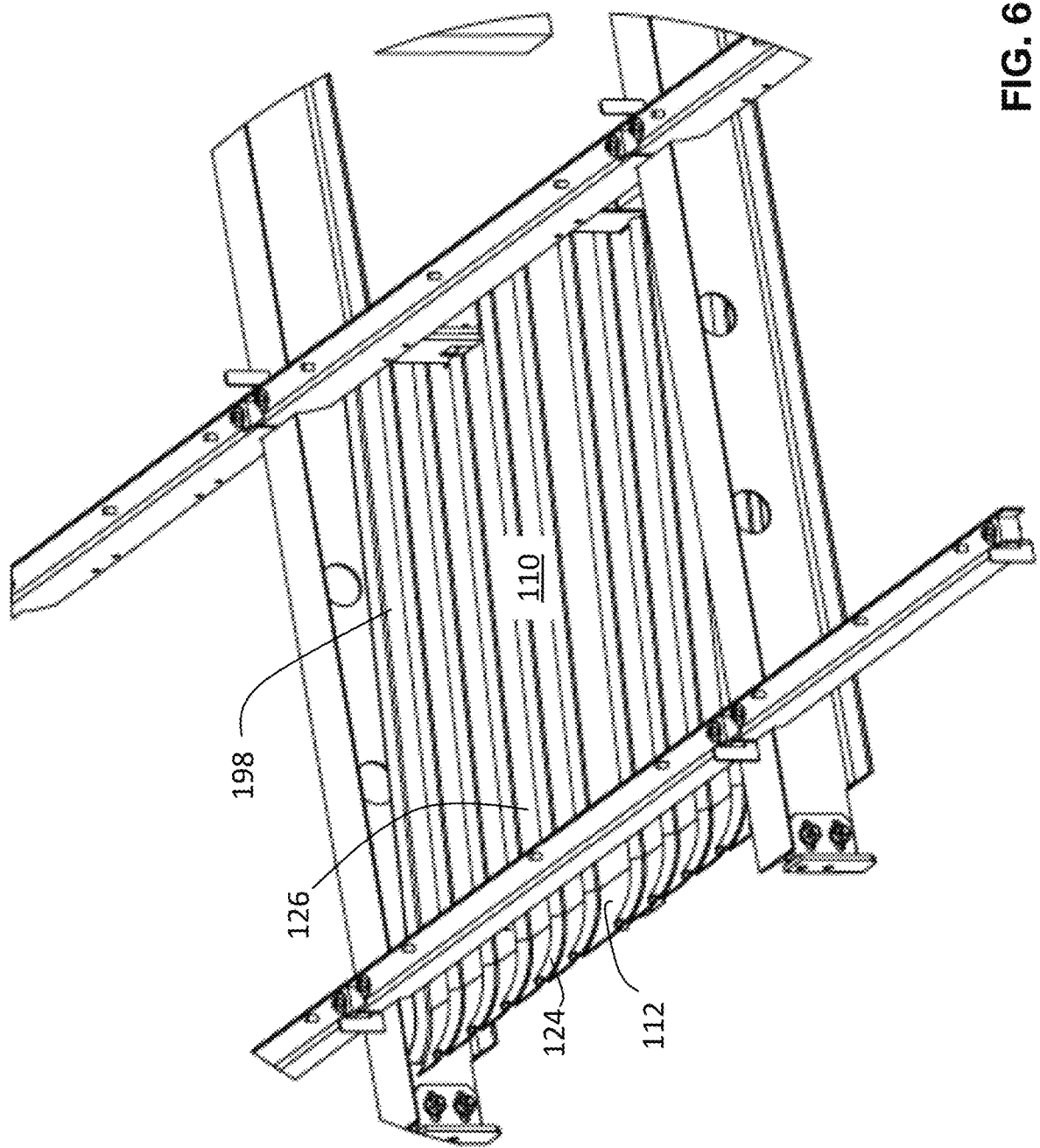
FIG. 6 is a partial isometric of the debris deflector according to the embodiment of FIG. 5.
Figure 7:
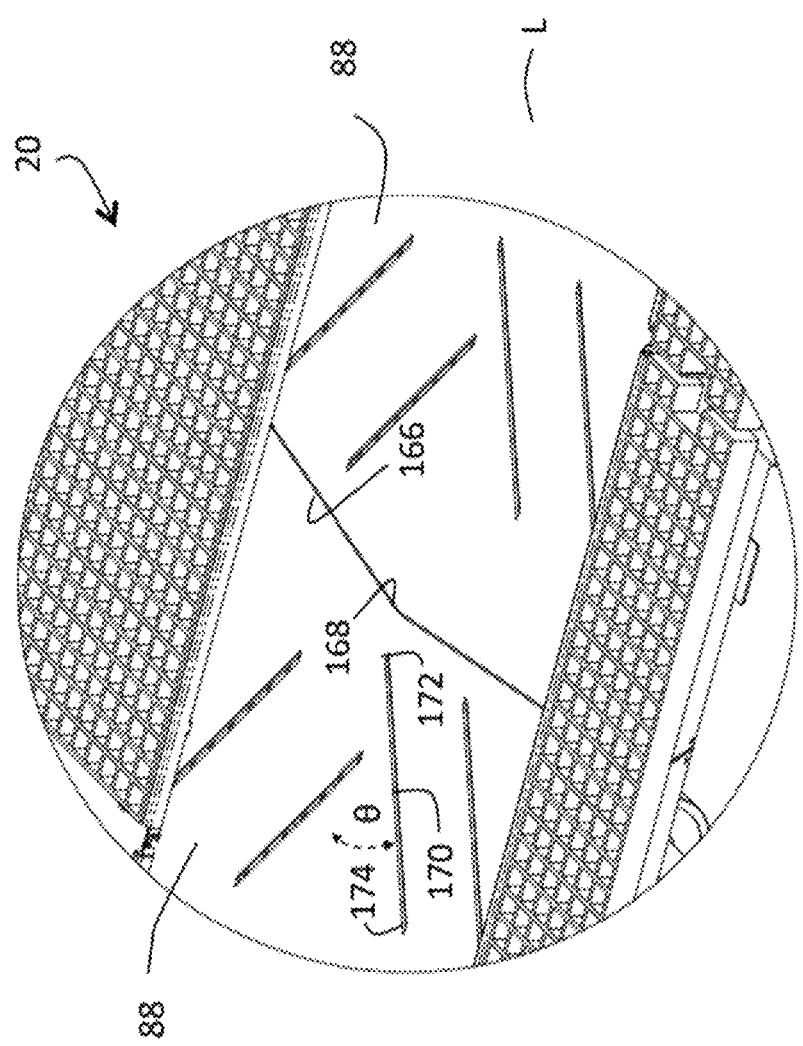
FIG. 7 is a partial isometric view of the conveyor system according to FIG. 1, detailing features of the wear plates.

Having regard to FIGS. 5 and 6, shown is a debris deflector 198 according to an alternative embodiment. As the debris deflector 198 is arranged in the conveyor system 20 in substantially the same way as debris deflector 98, only the differences associated with this alternative embodiment are discussed. The debris deflector 198 includes a debris portion 110 that is positioned under the support deck 84, and a water collection portion 112 that extends outwardly therefrom, towards a respective side wall of the trench 40. The water collection portion 112 is intended to facilitate cleaning of the debris portion 110 of the debris deflector 198, without the need for substantial disassembly and associated downtime of the conveyor system. With this arrangement, a sprayer or suitable wash nozzle 114 may be positioned as shown to deliver a stream of water directly upon the water collection portion 112 of the debris deflector 198, promoting a wash effect to remove accumulated debris from the debris portion 110. Access to the water collection portion 112 may be achieved by removing side panels 116, or where the side panels 116 are provided in the form of fiberglass or thermoplastic grating, wash water may be delivered directly therethrough. The use of grates for the side panels 116 will also permit a greater volume of wash and rinse water from the wash tunnel to be captured by the water collection portion 112, enhancing the cleaning effect of the debris deflector 198 during normal wash tunnel usage.

As shown, the water collection portion 112 of the debris deflector 198 is generally arranged at an angle relative to the debris portion 110, with its terminal lateral edge 120 being positioned proximal the underside 122 of the side panel 116. The debris deflector 198 is provided with a curved transition 124 between the water collection portion 112 and the debris portion 110 to deflect the impingement of rinse water, with reduced turbulence, therein resulting in an effective flushing of debris from the debris portion 110 of the debris deflector 198.

The debris deflector 98, 198 may be formed of stamped or formed stainless-steel, or galvanized steel to provide a rust-inhibiting effect. In an alternative embodiment, the debris deflectors 98, 198 may be formed of a thermoplastic material, for example a polyolefin, a low or high-density polyethylene, polyvinyl chloride, or an acrylonitrile butadiene styrene (ABS), and may include suitable fillers or additives to achieve the desired performance characteristics. In general, suitable materials will exhibit resistance to wear, corrosion and pitting, as well as low moisture absorption and low reactivity to chemicals. Suitable materials should also exhibit a general non-stick behavior (i.e., as achieved through improved surface smoothness and a low coefficient of friction) in relation to oil and grease, as well as dirt and salt. In one embodiment, the debris deflector 98, 198 may be formed of polypropylene or polyethylene, and may include glass fibers to improve impact performance at low temperature.

When formed of thermoplastic material, the debris deflector 98, 198 may be formed via any suitable molding process, including but not limited to vacuum forming, compression molding and thermoforming. When molded, a thermoplastic debris deflector may incorporate one or more structural ribs 126 (as seen in FIG. 6). The structural ribs 126 provide additional rigidity to the debris deflector 98, 198, and establish sluice-like channel-ways 128 that direct water flow, enhancing the wash effect.

As stated earlier, and having regard to FIG. 2A, the upper transport portion 42 of the endless belt 36 moves in tension from the idler end 48 towards the drive end 46 by drive member 56, while the lower return portion 44 moves in a slackened state from the drive end 46 towards the idler end 48. In the slackened state, the lower return portion 44 of the endless belt 36 may be subject to greater lateral movement, having the potential to create belt tracking and alignment issues. This is particularly evident at the idler end 48 where the axially elongated roller 52 is not provided with engagement teeth as found on the opposing drive member 58 at the drive end 46. Misalignment and poor tracking of the endless belt 36 can cause excessive wear on the conveyor mechanism, necessitating increased maintenance and associated downtime. Issues of misalignment of the endless belt 36 can increase upon aging of the endless belt 36, generally due to belt stretch. Accordingly, in an alternative embodiment, a least one pair of lateral guide rollers are incorporated into the conveyor system 20.

The wear plates 88 are made from a material that is at least partially thermoplastic, and, in particular, at least partially polyethylene, such as an ultra-high-molecular-weight polyethylene ("UHMWPE"), which is also known as high-modulus polyethylene ("HMPE"). UHMWPE is a thermoplastic polyethylene that has extremely long chains. The longer chains serve to transfer load more effectively to the polymer framework by reinforcing intermolecular interactions. Further, UHMWPE has low moisture absorption, a very low coefficient of friction, a high strength, and is highly resistant to abrasion as a result of the longer chains, especially in comparison to carbon steel. Further, UHMWPE is very resistant to corrosion. Some particular exemplary materials that can be used to manufacture the wear plates are virgin UHMWPE such as available from Röchling Engineering Plastics and the Garland Manufacturing Company, reprocessed UHMWPE such as available from Röchling Engineering Plastics, glass filled UHMWPE such as available from Quadrant Plastic Composites Inc., ceramic filled UHMWPE such as available from Polymer Industries Inc. and Quadrant Plastic Composites Inc., and cross-linked UHMWPE such as available from Röchling Engineering Plastics and Polymer Industries Inc.

Alternatively, in other embodiments, the wear plates can be made from a material that is at least partially high-density polyethylene ("HDPE"). HDPE is also suitable for use for construction of the wear plates 88. In another embodiment, a proprietary polyethylene, POLYSTONE™ sold by Röchling Engineering Plastics, can be used to manufacture the wear plates.

The material of the wear plates 88 can be selected to have a hardness HWP that is lesser than the hardness HBS of the material that makes up an underside of the endless belt in some embodiments.

The costs for the manufacturing of wear plates form these materials ranges from 63% to over 200% of the price using stainless steel in some cases, based on the current prices of stainless steel and these thermoplastics. Depending on the material selected and application, suitable thickness ranges are in the 3/16 inch to 3/8 inch range (5-10 mm) in some scenarios.

Traditionally, the use of such materials for belt contact surfaces was deemed unsuitable as dirt trapped between the endless belts and the belt contact surfaces caused the belt contact surfaces to wear at an unsatisfactory rate without significant improvements to the wear of the endless belts. Wearing of the endless belts and the belt contact surface occurs in the form of erosion. As the endless belts are worn down, the pins holding belt segments together are exposed and can be deformed and pop out, allowing the belt segments to separate. Erosion of the belt contact surface can accelerate endless belt wear where the endless belt is in contact with the underlying structures.

It has been found that, by using a belt-rinsing system that introduces and drains a rinsing fluid between the endless belts and the belt contact surfaces, the dirt trapped between the endless belts and the belt contact surfaces can be reduced and that the wear rate of both the endless belts and the belt contact surfaces can be reduced.

That is, by making the belt contact surface (i.e., the wear plates 88) from a softer material than stainless steel (which is the traditionally used material), and by rinsing away debris from the interface between the endless belts 36a, 36b and the support deck, the lifetime of the endless belts 36a, 36b can be increased as a result of the lower wear from contact with the wear plates 88.

Certain thermoplastics, such as UHMWPE and HDPE have been found to be suitable due to their possession of certain characteristics. These materials provide a sufficiently low coefficient of friction and are sufficiently resistant to abrasion. The wear plates 88 are inexpensive to replace relative to the replacement cost of the endless belts 36a, 36b. The replacement cost of an endless belt 36a, 36b can be high as there is a significant amount of manual labor in disassembling the belt segments to be replaced. Wear plates made from a material that is substantially UHMW have been found to have a service lifetime that ranges from 11% to 200% of the durability of wear plates made from stainless steel. Of more interest is that, due to the relative softness, higher resistance to abrasion, and lower coefficient of friction of the material compared to stainless steel traditionally employed in these applications, the wear rate of the endless belts is reduced, thus extending their service lifetime significantly, anywhere from 50% to 1700% in some cases.

Another characteristic of thermoplastics is that they generally have a hardness HWP that is lesser than the hardness HBS of the material that makes up the underside of the the endless belts 36a, 36b. As a result, the wear plates 88 are designed to improve the lifetime of the endless belt 36 by sacrificing the lifetime of the wear plates 88.

Polyethylenes and other thermoplastics are subject to thermal expansion and contraction. In the car wash environment, the range of temperatures that the wear plates 88 are subject to is significant. The wear plates 88 have a longitudinal length of approximately 44 inches and have been found to expand and contract +/−0.2 inches over a typical operational ambient temperature range. In order to compensate for these expansions and contractions, expansion gaps between the leading and trailing edges 166 and 168 of the wear plates 88 of 0.2 inches or greater are provided.

Each wear plate 88 is provided with a plurality of debris slots 170 that permit the evacuation of debris therethrough, so as to reduce the accumulation of debris between the endless belt and the wear plates 88. Each debris slot 170 includes a first slot end 172 and a second slot end 174, and is provided with a width of 10 mm, although widths of between 8 to 25 mm may be implemented. Each debris slot 170 may be linear (i.e., straight) and may be arranged at an angle θ relative a longitudinal centerline L of the wear plate 88. As shown, the debris slot 170 is outwardly angled from the longitudinal centerline L in the direction of the first slot end 172 towards the second slot end 174. The angle θ of each debris slot 170 is 35° relative to the longitudinal centerline L of the wear plate 88, although angles between 25° to 45° may be implemented. In general, angle selection is based on observed belt wear. It has been determined that angles within this range, and in particular at 35° relative to the longitudinal centerline L of the wear plate 88 result in the least amount of endless belt wear during use, therein increasing the usable lifespan of the endless belt and wear plates.

Figure 9A:
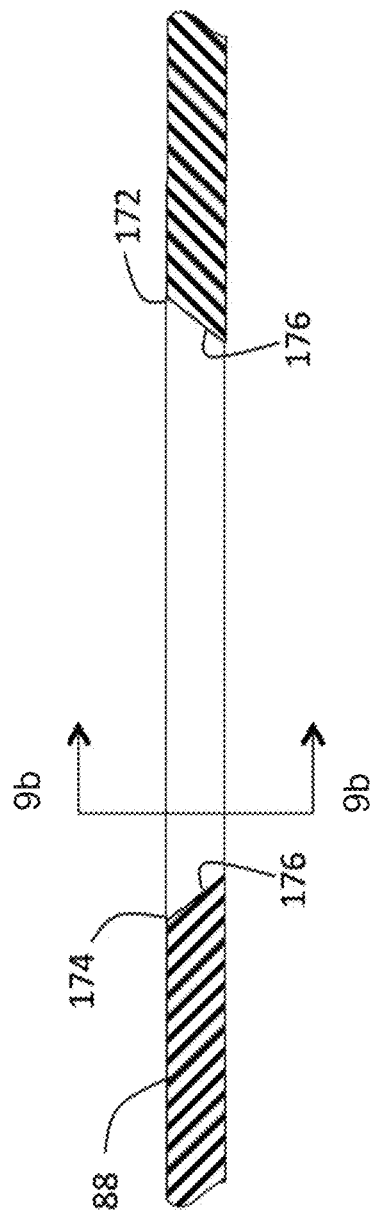
FIG. 9A is a sectional view of one of the wear plates with reference to line 9A-9A of FIG. 8, showing features of the debris slot.
Figure 9B:
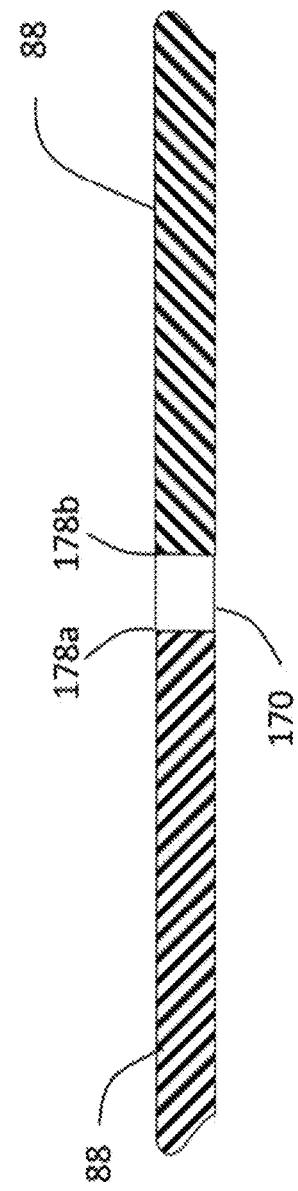
FIG. 9B is a sectional view of one of the wear plates with reference to line 9B-9B of FIG. 9A, showing features of the debris slot.

The first slot end 172 and the second slot end 174 of each debris slot 170 can be provided with an inwardly sloped bevel 176, as shown in FIG. 9A. It has been determined that maximum wear of the endless belt occurs where the endless belt passes over a sharp edge perpendicular to the direction of belt travel. Accordingly, with the first and second slot ends 172 and 174 having the inwardly sloped bevel 176, in particular at the second slot end 174, the extent of belt wear is reduced, particularly when the wear plates are constructed of stainless steel. Between the first and second slot ends 172 and 174 of the debris slot 170, the opposing edges 178a and 178b remain unbeveled, that is they remain as sharp edges, as shown in FIG. 9B. As the endless belt is passing over these sections of the debris slot 170 at an angle (i.e., 35° relative to the longitudinal centerline L of the wear plate 88), the extent of belt wear is minimal. Moreover, by maintaining these edges sharp as shown, they provide a stripping action to remove debris from the underside of the endless belt, without excessive wear thereto.

It will be appreciated that while both the first and second slot ends 172 and 174 are shown as being beveled, in some embodiments, only one of the first and second slot ends 172 and 174 is beveled. In an alternative embodiment, only the second slot end 174 is beveled.

By using certain thermoplastics that are softer than stainless steel, have a low coefficient of friction, and/or a high resistance to abrasion in constructing the wear plates, it has been found that the beveling of the debris slots 170 as shown in FIGS. 9A and 9B can be omitted without materially increasing wear on the endless belt 36. The beveling of the debris slots 170 adds to the manufacturing costs of the wear plates 88 and, thus, the ability to omit this feature without materially impacting the lifetime of the endless belt 36 is another benefit to the use of thermoplastics in the construction of the wear plates 88.

Figure 8:
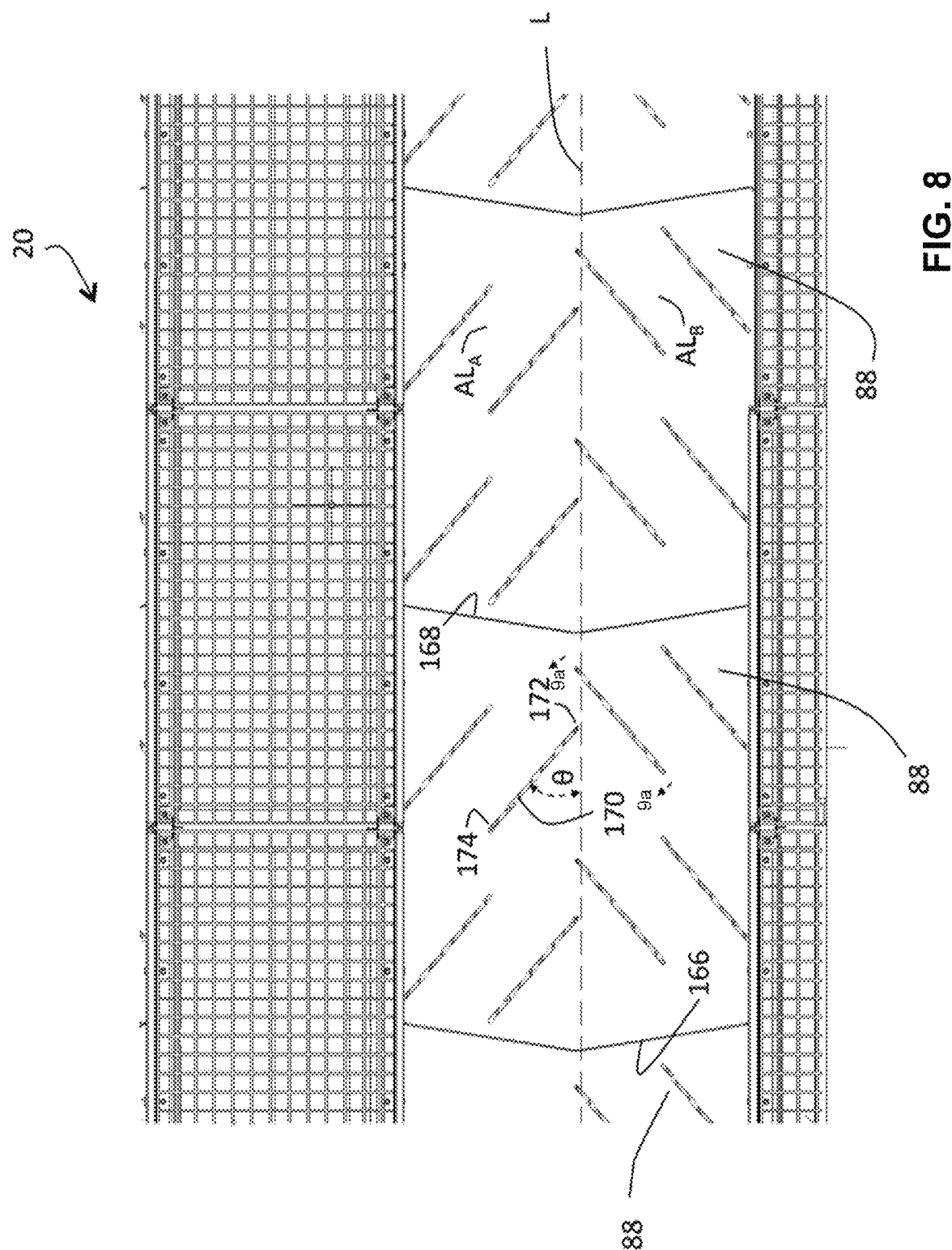
FIG. 8 is a partial plan view of the conveyor system according to FIG. 1, detailing features of the wear plates.

In the embodiment shown in FIG. 8, each wear plate 88 provides 8 debris slots 170, generally presented in two rows of 4 arranged across the wear plate 88. Within each row, the 4 debris slots are arranged in two paired sets of debris slots, with the two paired sets of debris slots being longitudinally offset relative to one another. The arrangement of the debris slots 170 is such that the leading and trailing ends 172 and 174 of successive debris slots 170 align, so as to reduce the number of locations having increased potential for belt wear. As shown, alignment between successive debris slots occurs along longitudinal centerline L, as well as alignment line ALA and alignment line ALB.

It will be appreciated that while each wear plate 88 is shown as having 8 debris slots 170, in other embodiments, the number of debris slots 170 may be fewer or greater, depending on the extend of debris removal required. While the leading and trailing ends 172 and 174 of all debris slots 170 may be machined with the aforementioned inwardly sloped bevel, in some embodiments, only the debris slots 170 arranged proximal the longitudinal centerline L of the wear plate 88 may be beveled. In other preferred embodiments, the debris slots 170 are not beveled.

Figure 10A:
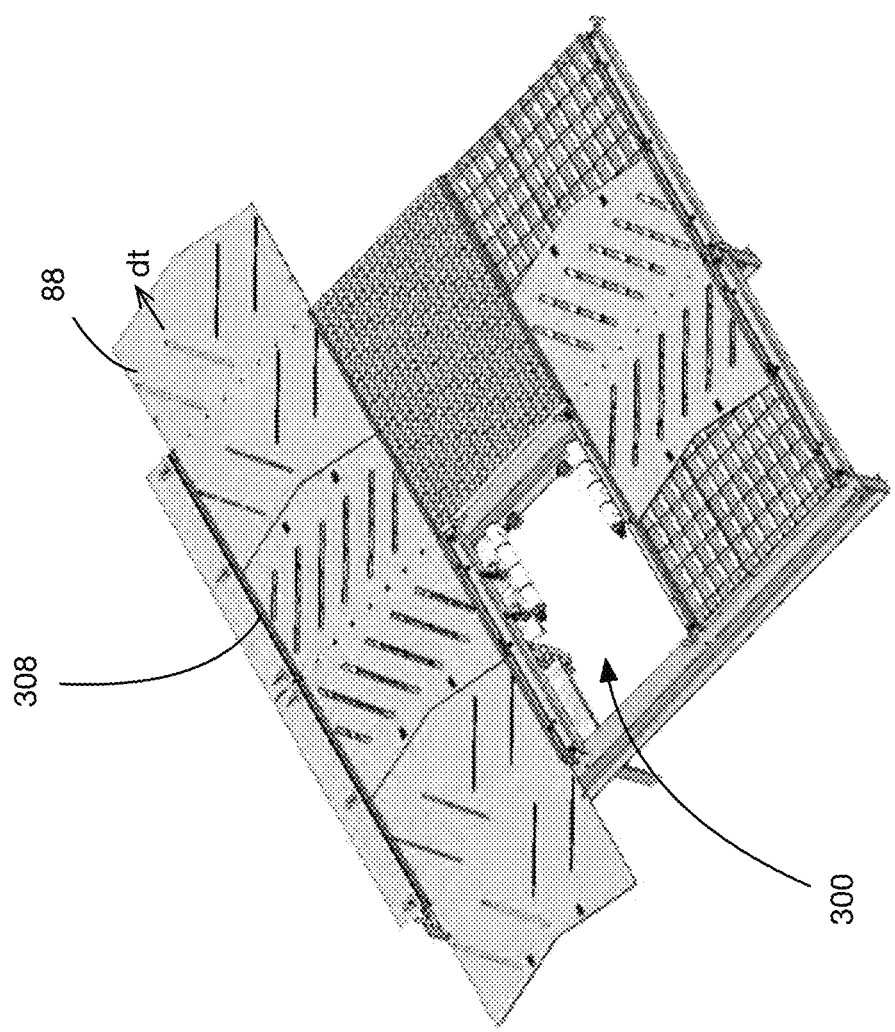
FIGS. 10A-13 show a rinsing system for the conveyor system.

Reference is made to FIGS. 10A-13, which shows the conveyor system 20 with an optional rinsing system 300. The rinsing system 300 includes a rinsing system conduit arrangement 302 (a portion of which is shown in FIGS. 10A and 10B), which is connectable to a source of rinsing system liquid (e.g., a city water supply). The rinsing system 300 further includes at least one belt rinsing arrangement 304. In the present example, the rinsing system 300 includes a plurality of belt rinsing arrangements 304 spaced longitudinally apart for rinsing the upper transport portion 42 of the endless belt 36.

Each belt rinsing arrangement 304 includes a rinsing system dirt pass-through aperture 306 in the support deck 84, over which the upper transport portion 42 of the endless belt 36 travels during operation. As can be seen, in the embodiment shown in FIG. 10A, the rinsing system dirt pass-through aperture 306 is provided in a rinsing system wear plate 308. The rinsing system dirt pass-through aperture 306 may be similar to the debris slots 170 in the wear plates 88, but may be wider in the direction of travel (shown at Dt) of the endless belt 36 for reasons provided below.

Each belt rinsing arrangement 304 further includes at least one rinsing system outlet 310 from the rinsing system conduit arrangement 302 positioned proximate to the rinsing system dirt pass-through aperture 306a and positioned to eject rinsing system liquid (shown at 312 in FIGS. 11 and 12) onto the endless belt 36 upstream from a downstream edge 314 of the rinsing system dirt pass-through aperture 306a in order to capture at least some of the ejected liquid 312 through the rinsing system dirt pass-through aperture 306a. The terms 'upstream' and 'downstream' are both in relation to the direction of travel Dt of the upper transport portion 42 of the endless belt 36. The upstream edge of the rinsing system dirt pass-through aperture 306a is shown at 315. Additional rinsing system dirt pass-through apertures 306b enables the flushing of ejected liquid 312 downstream of the rinsing system dirt pass-through apertures 306a.

Put another way, the rinsing system 70 can rinse off dirt from the endless belt 36 so as to prevent that dirt from causing wear on the belt 36 as the belt 36 moves along during operation. The dirt may be present directly at the sliding interface between the belt 36 and the wear plates 88 and 308. Additionally, the dirt may be present at the pins (shown at 316) that pivotally connect belt segments (shown at 318) that make up the belt 36.

Pockets (shown at 320) are present in the endless belt 36 and some portions of the pins 316 are exposed in the pockets 320. It is therefore beneficial for the rinsing system 300 to be able to eject rinsing system liquid into the pockets 320 to rinse dirt from the pins 316. This inhibits dirt from migrating into the interface between the pins 316 and the associated surfaces of the belt segments 318, which reduces the wear that can occur on the belt segments 318 at that interface. Such wear contributes to ovalizing of the apertures in the belt segments 318 in which the pins 316 reside, causing the belt 36 to lengthen and contributing to accelerated wear and failure of the belt 36.

Thus it may be said that the endless belt includes a plurality of belt segments 318 that are pivotally connected to one another via at least one pin 316 that extends laterally. The endless belt 36 includes at least one pocket 320 that exposes the at least one pin 316. The at least one rinsing system outlet 310 is positioned to eject rinsing system liquid into the at least one pocket 320 onto the at least one pin 316 to remove dirt from the at least one pin 316.

The rinsing system outlet 310 may be any suitable type of outlet that is capable of ejecting rinsing system liquid the distance needed to remove dirt from the endless belt 36. In some examples, the pressure of the rinsing system liquid at the rinsing system outlet 310 may be about 20 psi or higher. In some examples, it may be 40 psi or higher. The rinsing system outlet 310 may, for example, be a nozzle.

Figure 13:
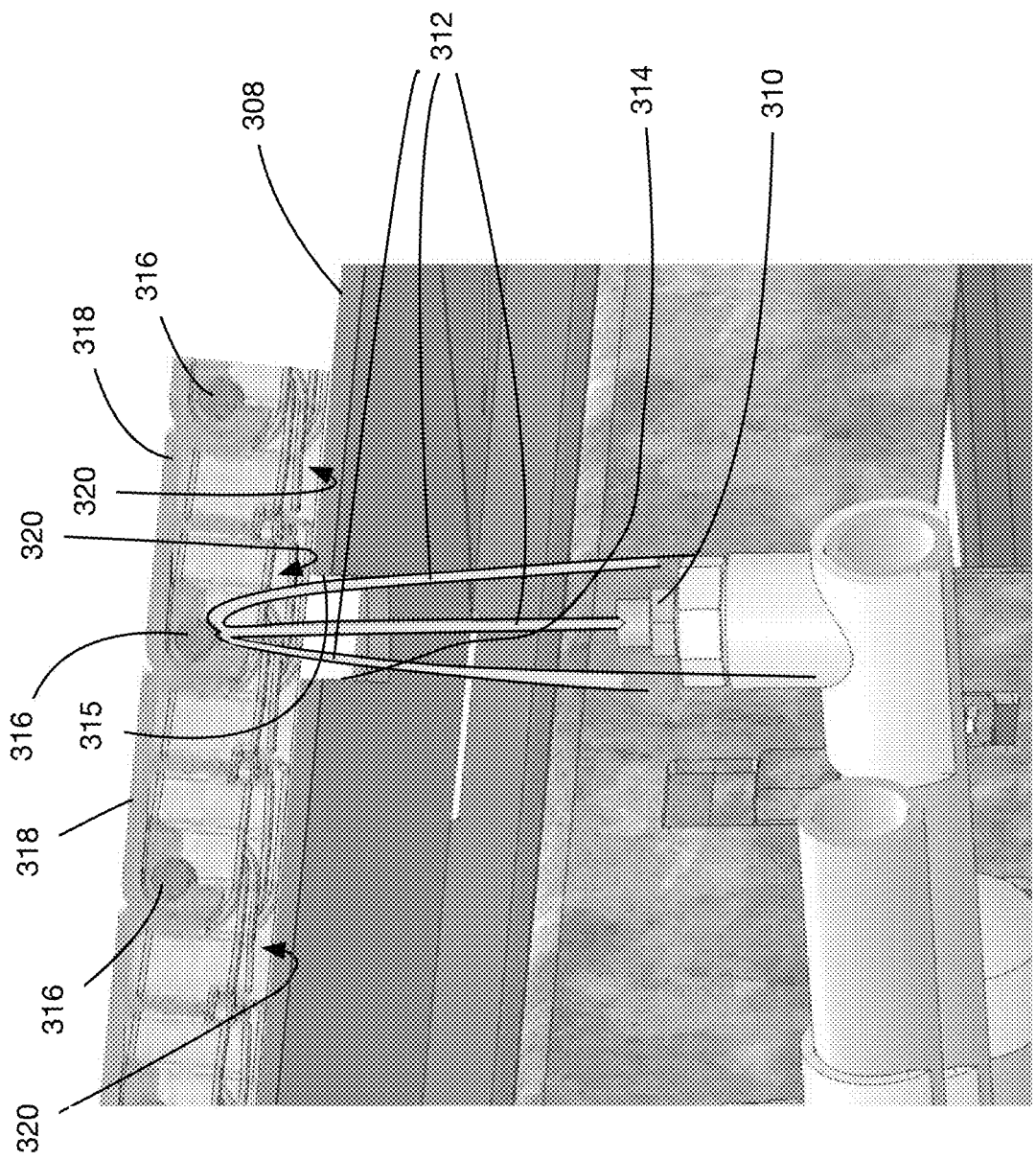

Reference is made to FIG. 13. As can be seen, the rinsing system outlets 310 are positioned below the wear plates 308 and are positioned to eject the rinsing system liquid up through the rinsing system dirt pass-through aperture 306 into the belt 36. The rinsing system dirt pass-through aperture 306 has an elongate cross-sectional shape and is sized to permit the ejecta 312 (i.e., the rinsing system liquid ejected therefrom) to leave upwardly from the rinsing system dirt pass-through aperture 306, to hit the endless belt 36 and to fall through the rinsing system dirt pass-through aperture 306 after hitting the endless belt, bringing dirt with it, as shown in FIG. 13. For example, in the embodiment shown, the outlet 310 is well below the wear plate 308 and so the ejecta 312 pass upwardly through the rinsing system dirt pass-through aperture 306, hit the belt 36 and then fall back down through the aperture 306.

The apertures 306 are shown as being angled, similarly to the apertures (slots) 170 in the wear plates 88, for the purpose of ensuring that segments of the belt 36 are always supported and do not impact against an aperture edge. This is the same reason described for the angle of the slots 170. Similar angular ranges may be used for the orientation (i.e., the angle) of the apertures 306.

As can be seen, each rinsing system outlet 310 is in the form of a fan jet nozzle configured for ejecting rinsing system liquid 312 in the form of ejecta 312 having an elongate cross-sectional shape (e.g., a flat spray pattern).

Figure 11:
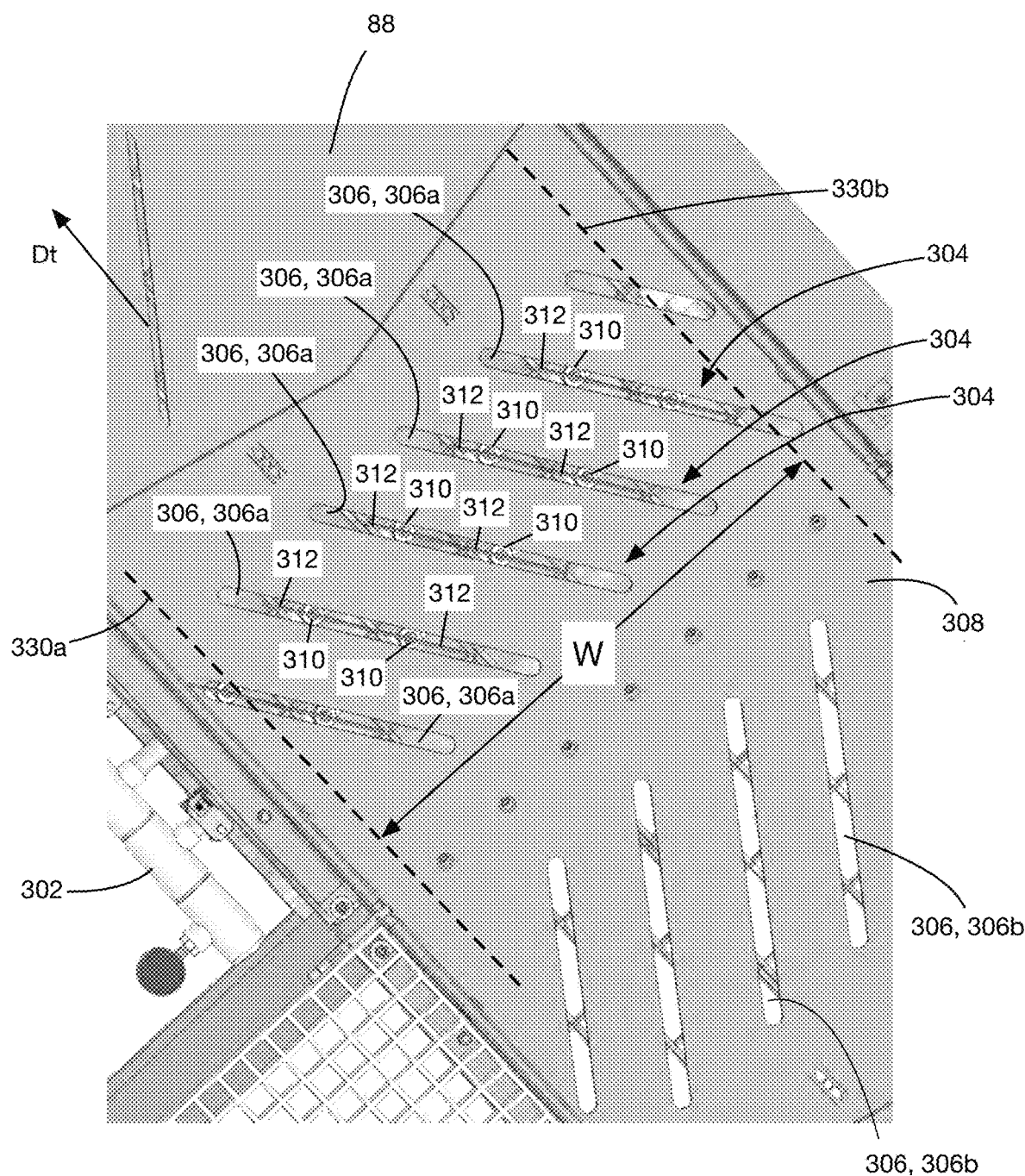

Referring to FIG. 11, dashed lines shown at 330a and 330b represent the side edges of the endless belt 36. The belt 36 has a width W. As can be seen, the at least one belt rinsing arrangement 302 includes enough of the rinsing system outlets 306 to eject rinsing system liquid 312 (i.e., ejecta 312) on the entire width of the belt 36. There is some offset between the apparent position of the ejecta 312 and the position of the side edges 330a and 330b of the belt 36 in the view shown in FIG. 11 however, it will be understood that this is merely a result of the difference in elevation of the outlets 310 and the belt 36.

Figure 12:
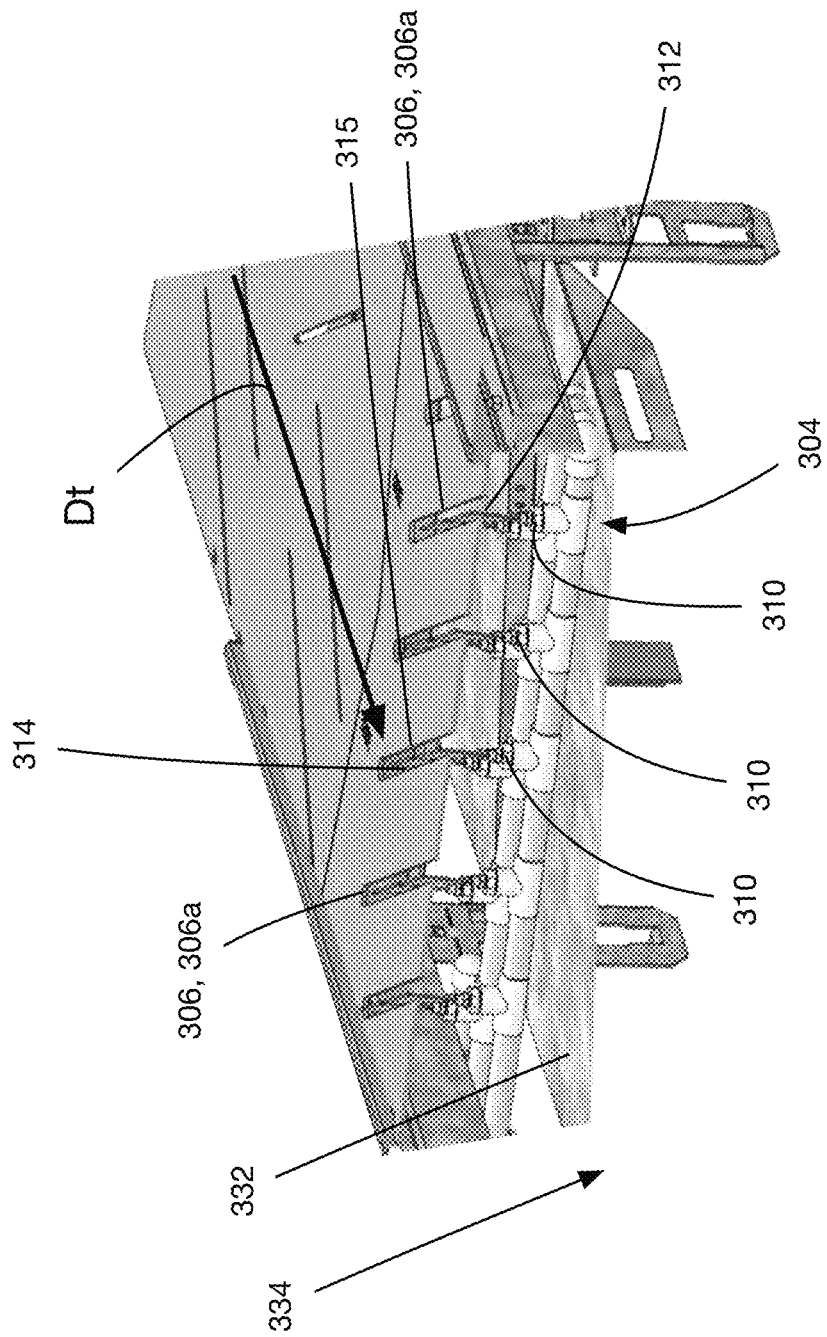

In FIG. 12, a debris deflector 332 is provided and may be similar to any of the debris deflectors shown and described herein. The debris deflector 332 is positioned underneath the rinsing system dirt pass-through aperture 306 to collect dirt falling through the rinsing system dirt pass-through aperture 306, and sloped downwardly away from the rinsing system dirt pass-through aperture 306 in order to transport collected dirt towards a dirt collection area shown at 334.

Figure 14:
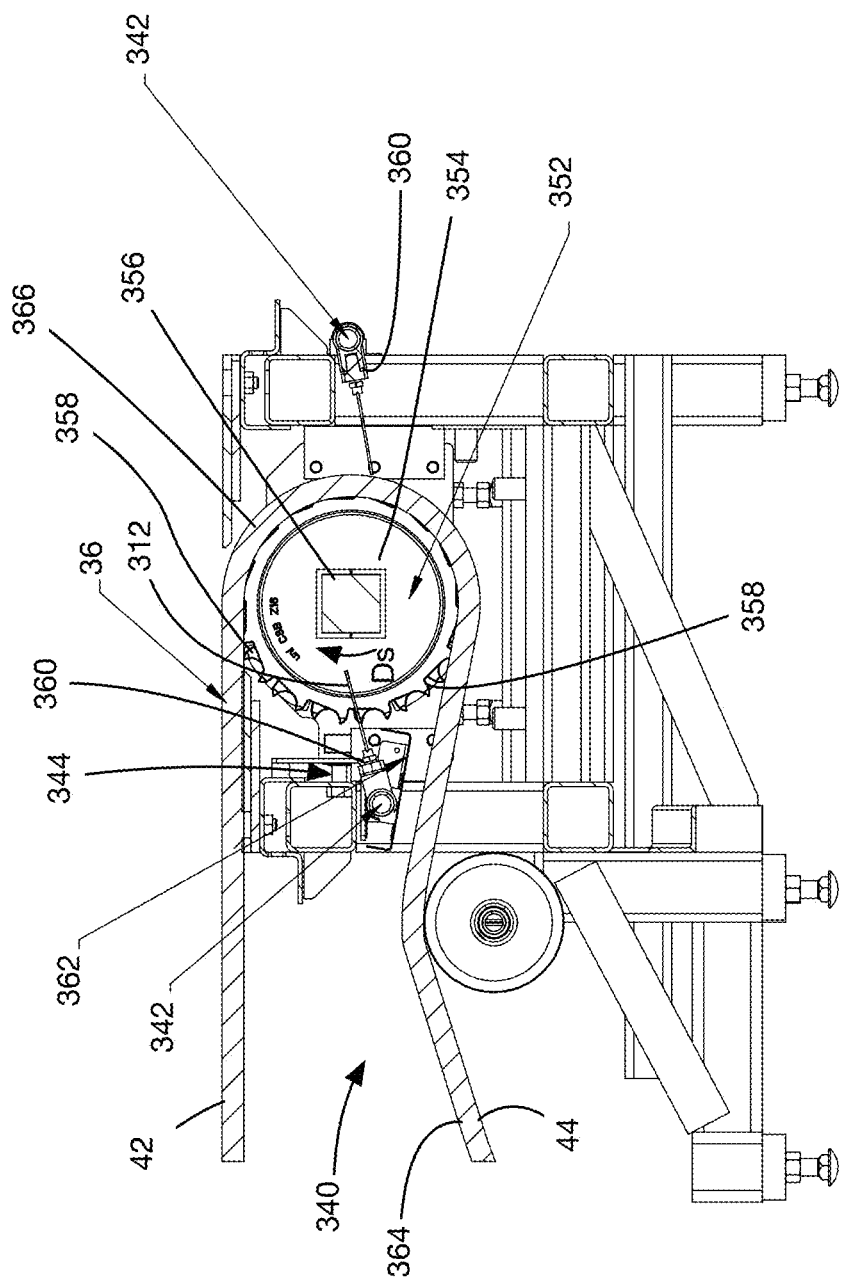
FIGS. 14-18 show a flooding system for the conveyor system.
Figure 15:
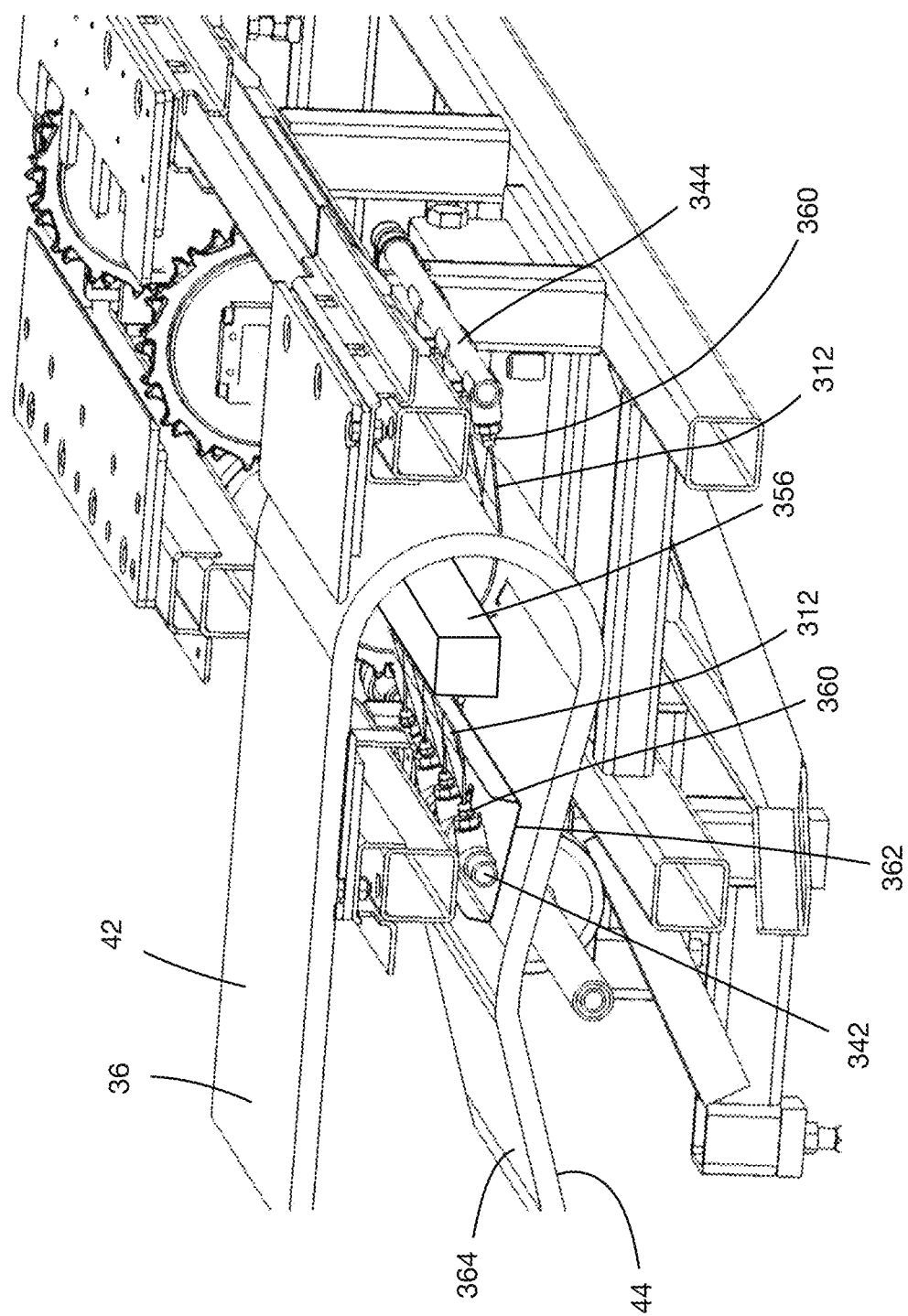

Reference is made to FIGS. 14 and 15, which show another rinsing system 340, which includes a rinsing system conduit arrangement 342 which is connectable to a source of rinsing system liquid (e.g., a city water supply or a reclaim water system). The rinsing system 340 further includes at least one sprocket rinsing arrangement 344 configured to rinse and remove dirt from a sprocket arrangement 352 that is used to drive the belt 36. The sprocket arrangement 352 in the present example includes a plurality of sprockets 354 that are mounted on a drive shaft 356. Alternatively, the sprocket arrangement 352 could include a single sprocket 354.

The drive shaft 356 in the present example is square and passes through square apertures in the sprockets 354, however it will be understood that other shapes for the drive shaft 356 and apertures are possible. The sprocket arrangement 352 has sprocket teeth 358 that engage the belt 36 to drive the belt 36. The direction of rotation of the sprocket arrangement 352 is shown at Ds in FIG. 14.

Each belt rinsing arrangement 344 further includes at least one rinsing system outlet 360 from the rinsing system conduit arrangement 342. The at least one rinsing system outlet 360 is positioned proximate to the sprocket arrangement 352 and is positioned to eject rinsing system liquid 312 onto the sprocket arrangement 352.

As rinsing system liquid 312 is ejected onto the sprocket arrangement 352, it rinses some dirt off a portion of the surface of the sprocket arrangement 352 prior to engagement between that portion of the surface of the sprocket arrangement 352 and the belt 36. As a result, there is less dirt that would cause wear of the belt 36 during engagement with the sprocket arrangement 352. Such wear on the belt 36 can reduce the efficacy of the engagement with the teeth 358 on the sprocket arrangement 352. Additionally, the presence of the dirt itself can inhibit good engagement between the teeth 358 and the belt 36 which can result in increases stresses on certain areas of the belt 36 during such engagement.

A debris collection guide 362 is provided underneath the at least one rinsing system outlet 360 to collect at least some of the liquid that has hit the sprocket arrangement 352 and reflected or dripped off the sprocket arrangement 352 thereafter along with any dislodged dirt or any dirt entrained in the reflected liquid or the liquid that has dripped off the sprocket arrangement 352. The debris collection guide 362 guides collected debris to a debris collection area (not shown).

Some rinsing system liquid 312 may wind up on the lower return portion 44 of the belt 36 instead of in the debris collection guide 362. This is not considered problematic, since the inner surface of the lower return portion (shown in FIG. 14 at 364) does not engage any surfaces with significant force until reaching the idler drum at the other end of the conveyor system 20. Some of the dirt and liquid collected on the inner surface 364 of the lower return portion 44 of the belt 36 will have fallen off the belt 36 by the time it reaches the other end. As noted above, the rinsing system 300 can be provided at the upstream end of the upper transport portion 42 of the conveyor system 10, so as to rinse off dirt thereon prior to a lot of sliding engagement with the wear plates 88.

FIG. 15 is a perspective view of the rinsing system 340, but with the sprocket arrangement 352 removed. As shown in FIG. 15, the rinsing system outlets 360 may be in the form of fan (flat spray) jet nozzles, and may be configured to eject rinsing system liquid 312 in flow patterns that overlap with one another and which are configured to cover the width of the sprocket arrangement 352.

As can be seen in FIGS. 14 and 15, optionally, the rinsing system 340 further includes at least one belt rinsing arrangement including at least one rinsing system outlet 360 positioned to spray rinsing system liquid 312 on the outer face (shown at 366) of the belt 36, to further clean the belt 36 while the belt 36 is engaged with the sprocket arrangement 352.

Figure 16:
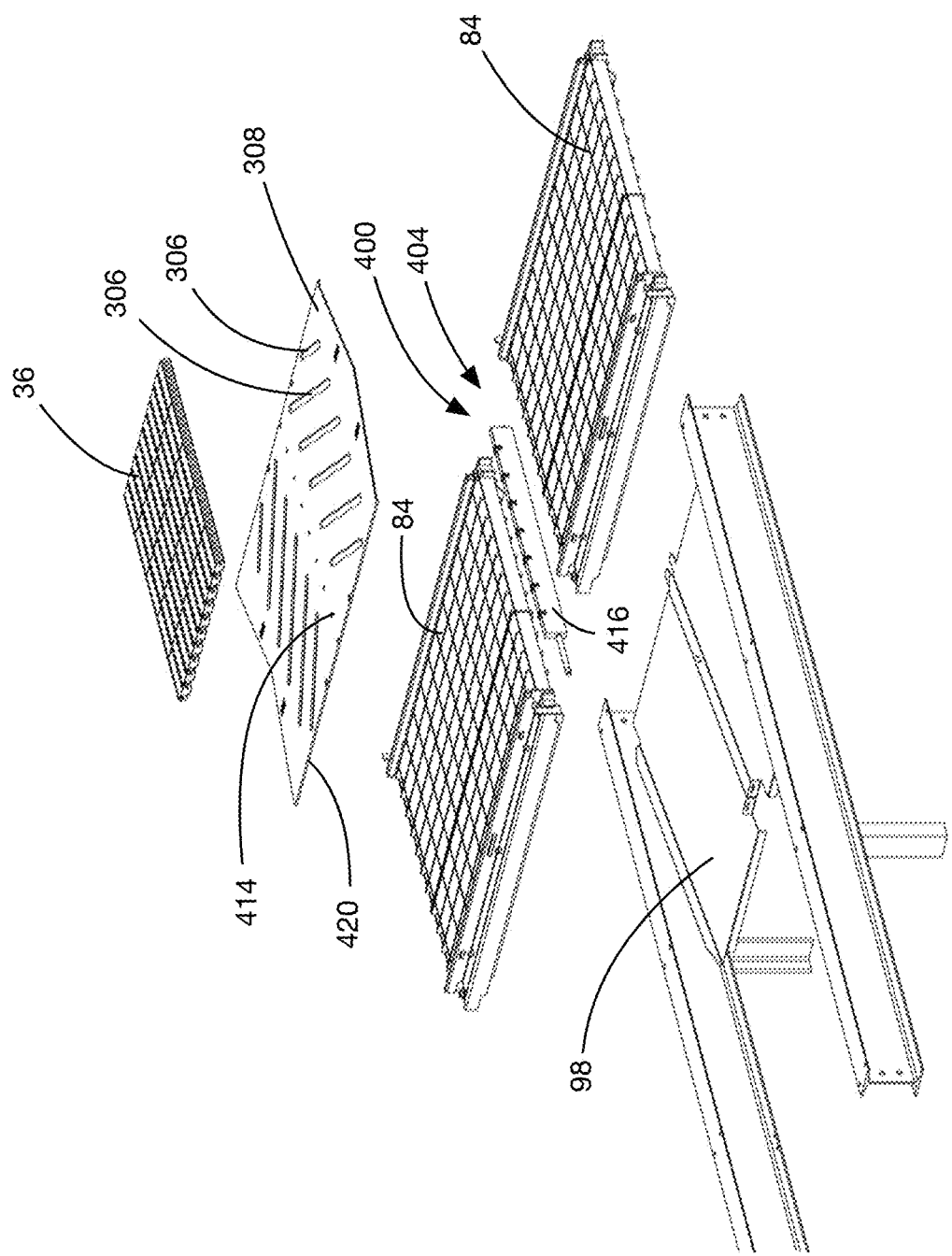
Figure 17:
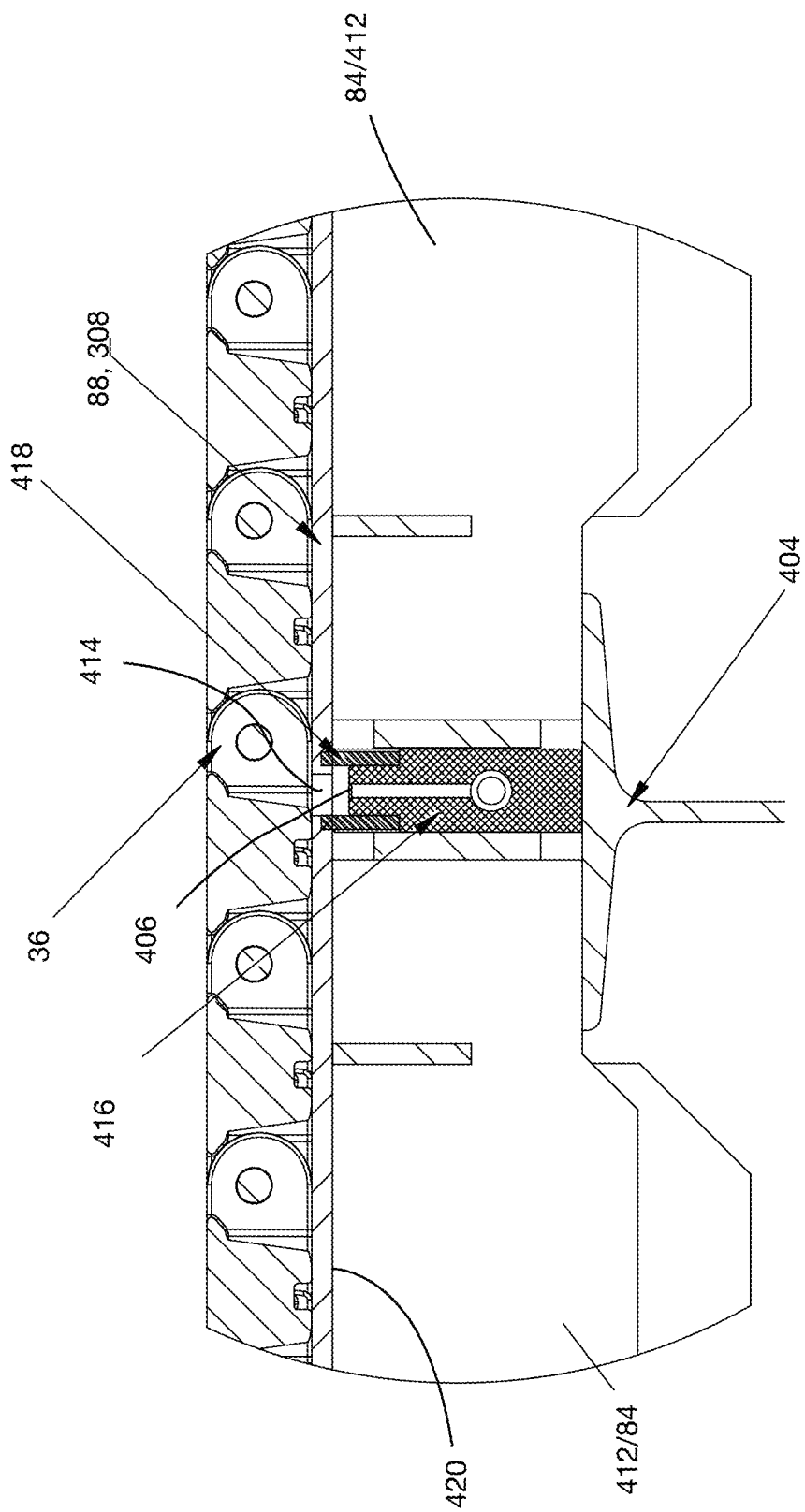

Reference is made to FIGS. 16 and 17, which show a flooder system 400 for the conveyor system 20. The flooder system 400 is used to introduce liquid between the endless belt 36 and the wear plate (e.g., wear plate 88 or wear plate 308). The flooder system 400 includes a flooder system conduit arrangement 402 connectable to a source of flooder system liquid (such as city water, or a source of city water mixed with soap, wax or some other lubricant), and at least one belt flooding member 404. Each belt flooding member 404 includes at least one flooding system outlet 406 (and optionally a plurality of outlets 406 which are spaced apart laterally) from the flooding system conduit arrangement 402. The outlet or outlets 406 are positioned underneath the endless belt 36 and are positioned to introduce flooding system liquid 408 between the endless belt 36 and the wear plate. The liquid 408 introduced helps to reduce friction between the belt 36 and the wear plate 88 or 308 in part by entraining dirt that may be present therebetween.

The liquid pressure at the outlets 406 may be relatively low, lower than the pressure at the outlets 310. For example, the pressure may be about 2 psi, but is preferably higher, such as in the range of 5-10 psi or even higher.

The support deck (e.g., the wear plates 88 and 308) includes a plurality of dirt pass-through apertures as described above. These apertures will permit the dirt and liquid from the flooding system to fall through, thereby removing dirt from the interface between the belt 36 and the wear plates 88 and 308. The flooding system 400 may include a plurality of belt flooding members 404 positioned at selected distances longitudinally from one another, such as, for example, about every 20 to 30 feet from one another. Optionally, each belt flooding member 404 is positioned between gratings 412 that support the wear plate 88 or 308 and thus may act as a spacer between these gratings 412. The gratings 412 need not be gratings and may also be identified more broadly as wear plate support members 412. The wear plate 88 or 308 has flooding system apertures 414. Each flooding member 404 may include a bar 416 that acts as a manifold and that has a plurality of outlets 406 thereon. The flooding member 404 may further include seal members 418 (e.g., rubber bushings) that are positioned between the outlets 406 and the underside (shown at 420) of the wear plate 88 or 308 to form a seal therebetween.

Figure 19A:
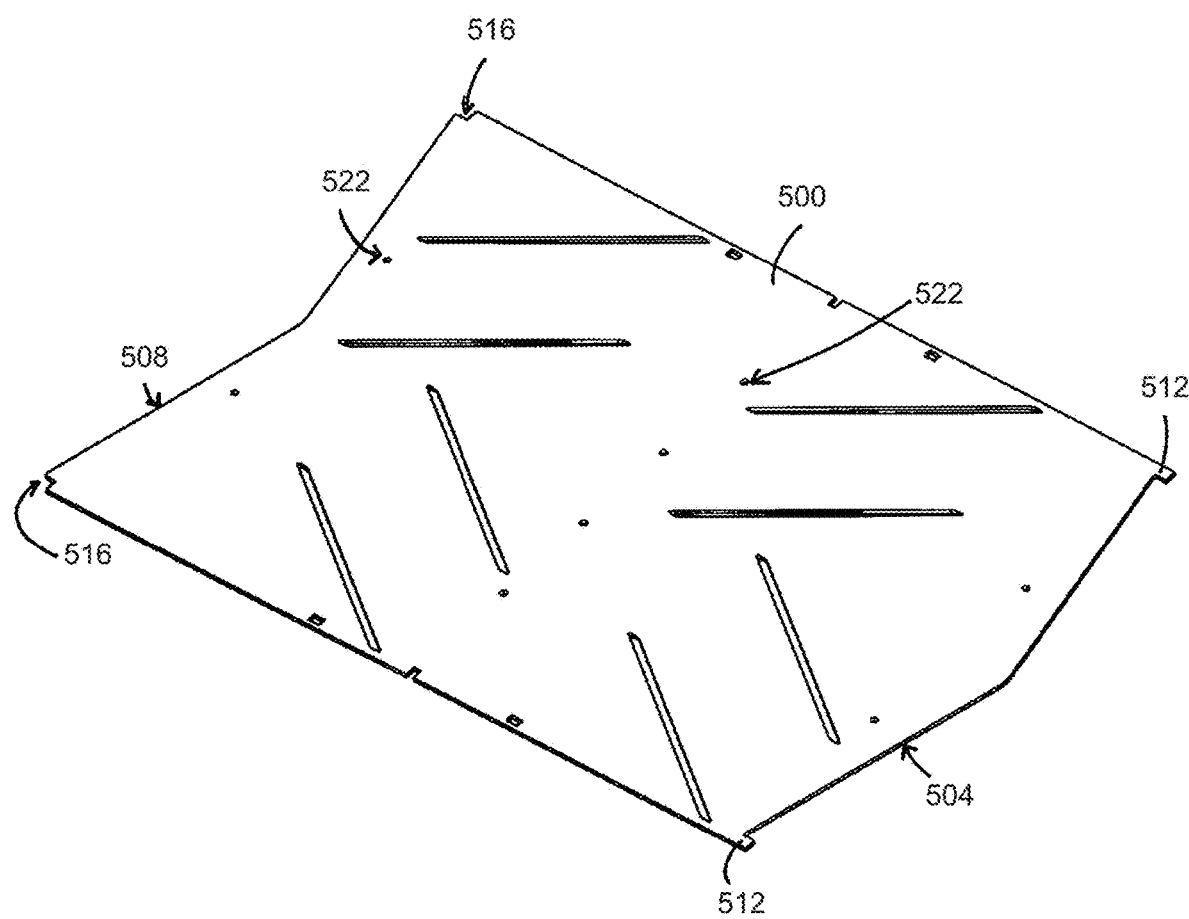
FIGS. 19A-19C show wear plates according to an alternative embodiment.
Figure 19B:
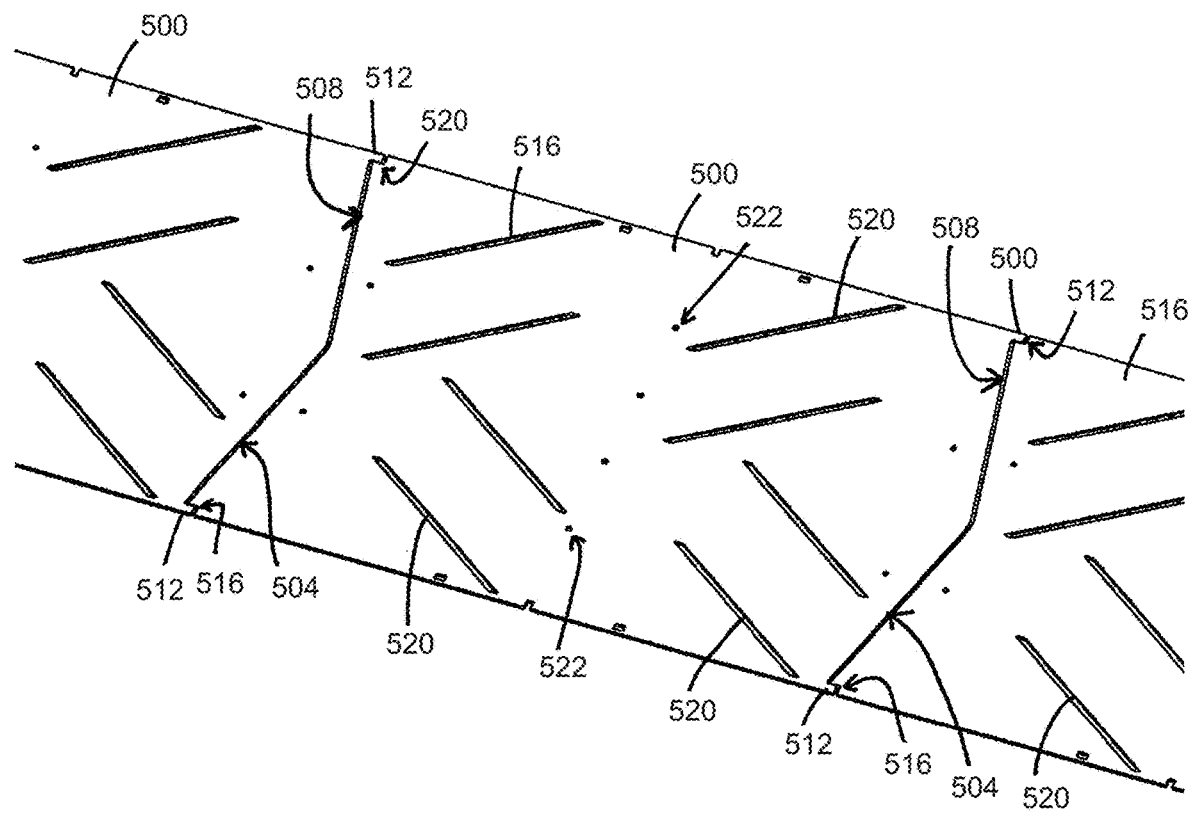
Figure 19C:
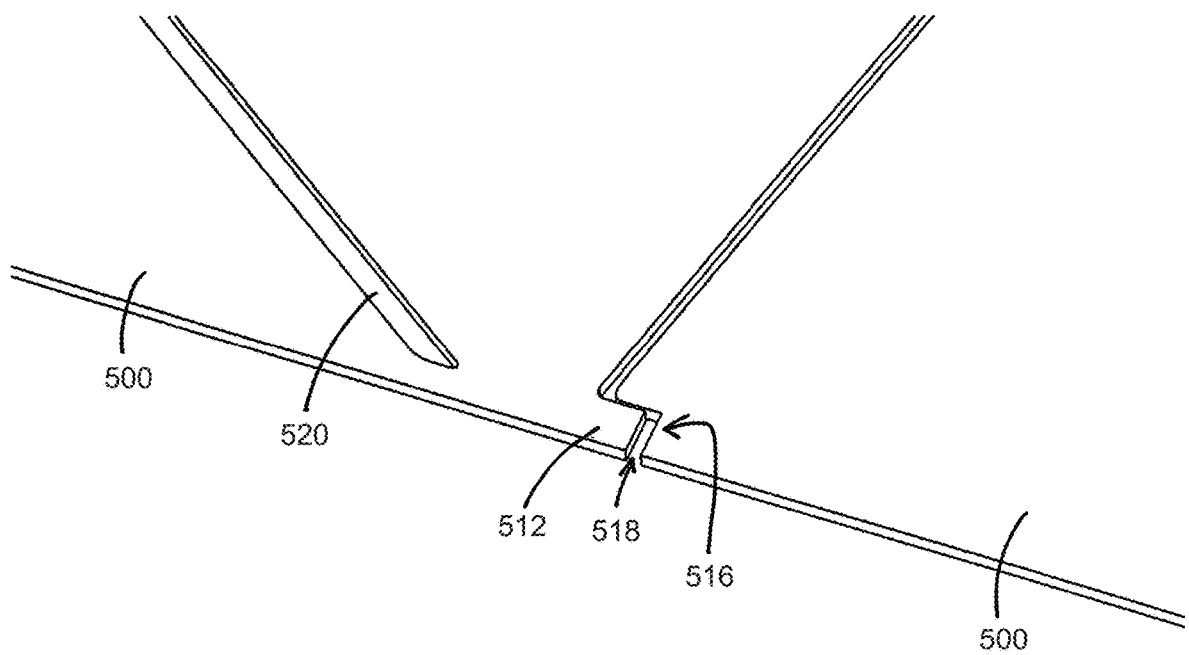

FIGS. 19A, 19B and 19C show wear plates 500 in accordance with another embodiment. The wear plates 500 are similar in size and construction to wear plates 88 shown in FIGS. 7, 8, 11a, and 11b. In particular, each of the wear plates 500 includes a leading edge 504 and a trailing edge 508, wherein the leading and trailing edges 504 and 508 are provided with complementary profiles to facilitate fit and alignment between adjacently positioned wear plates 500. In the embodiment shown, the complementary profile is provided generally in the form of a chevron aligned to the direction of travel of the vehicle through the wash tunnel. At least one of the leading and trailing edges 504 and 508 of the wear plates 500 may be chamfered to reduce the likelihood of wear upon the endless belt.

Like the wear plates 88, the wear plates 500 expand and contract with temperature changes. To allow for this expansion and contraction, the wear plates 500 are secured via fasteners inserted through fastener holes 522 that fit within slotted holes of the modular grid panels of the support deck. This arrangement allows a degree of freedom of movement (or, more to the point, expansion) of the wear plates 500. It can also be desirable to maintain the leading and trailing edges 504 and 508 in lateral alignment to avoid changes in the lateral profile of the belt contact surface (i.e., the wear plates 500) in the longitudinal direction that can serve to more quickly wear and/or damage the endless belt.

To this end, the wear plates 500 have mating features inhibiting lateral shifting of the wear plates 500 relative to one another in the form of fingers 512 that extend longitudinally (i.e., generally along the direction of travel of the endless belt) forward from lateral ends of the leading edges 504, and corresponding finger recesses 516 that extend longitudinally from lateral ends of the trailing edges 508. The fingers 512 mate with the finger recesses of adjacent wear plates 500 to maintain the wear plates 500 in lateral alignment while the wear plates 500 expand to reduce an expansion gap 518 between the wear plates 500, and contract.

In other embodiments, the fingers can extend longitudinally from the trailing edge and mate with corresponding finger recesses of the leading edge of an adjacent wear plate. Alternatively, a finger and a recess can be located on opposite lateral ends of each leading and trailing edge and mate with the corresponding features of adjacent wear plates. Other types of mating features that inhibit lateral shifting of the wear plates will occur to those skilled in the art.

The wear plates 500 also have debris slots 520 that permit the evacuation of debris therethrough, so as to reduce the accumulation of debris between the endless belt and the wear plates 500.

Figure 20A:
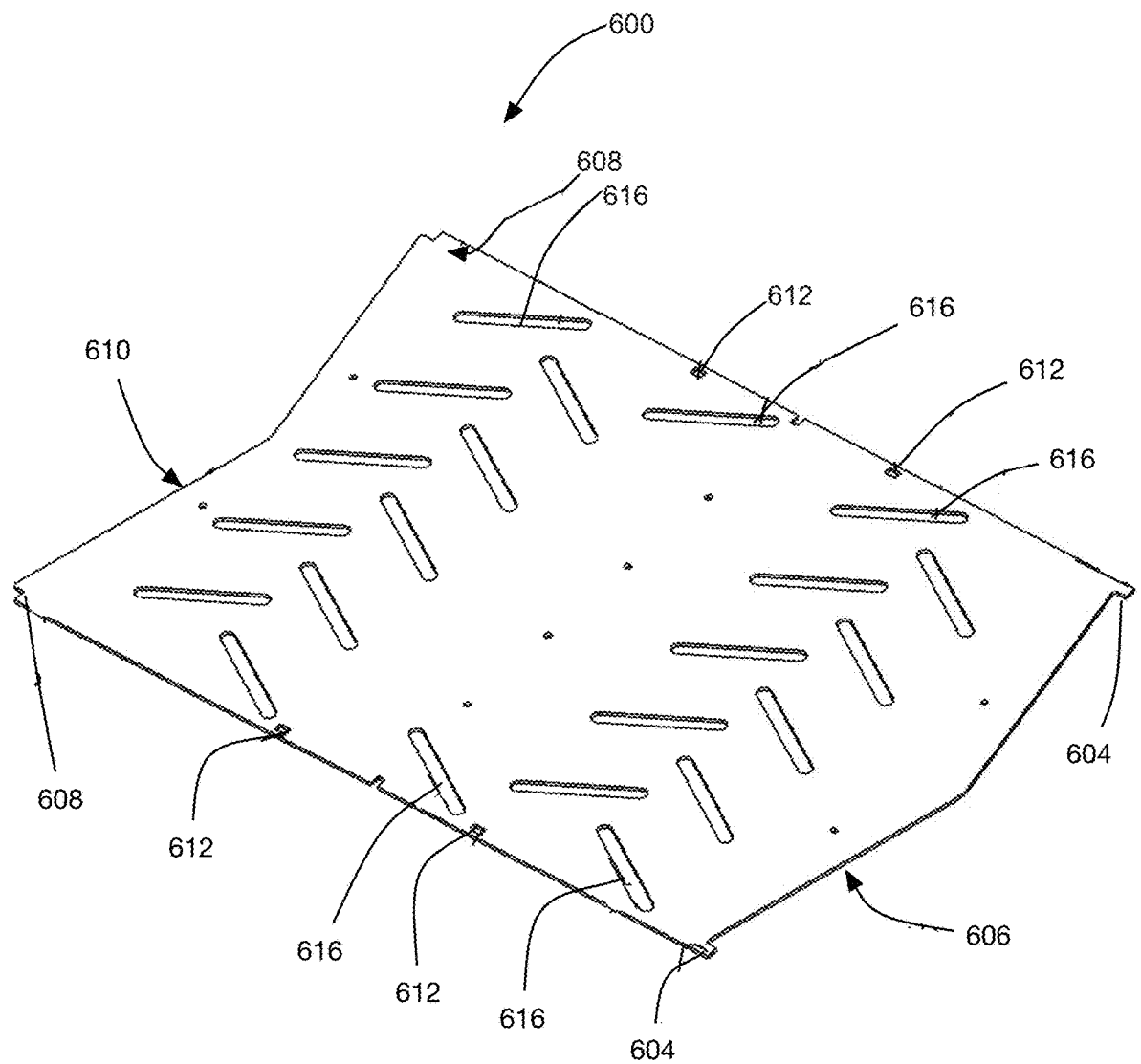
FIGS. 20A and 20B show wear plates according to other alternative embodiments.
Figure 20B:
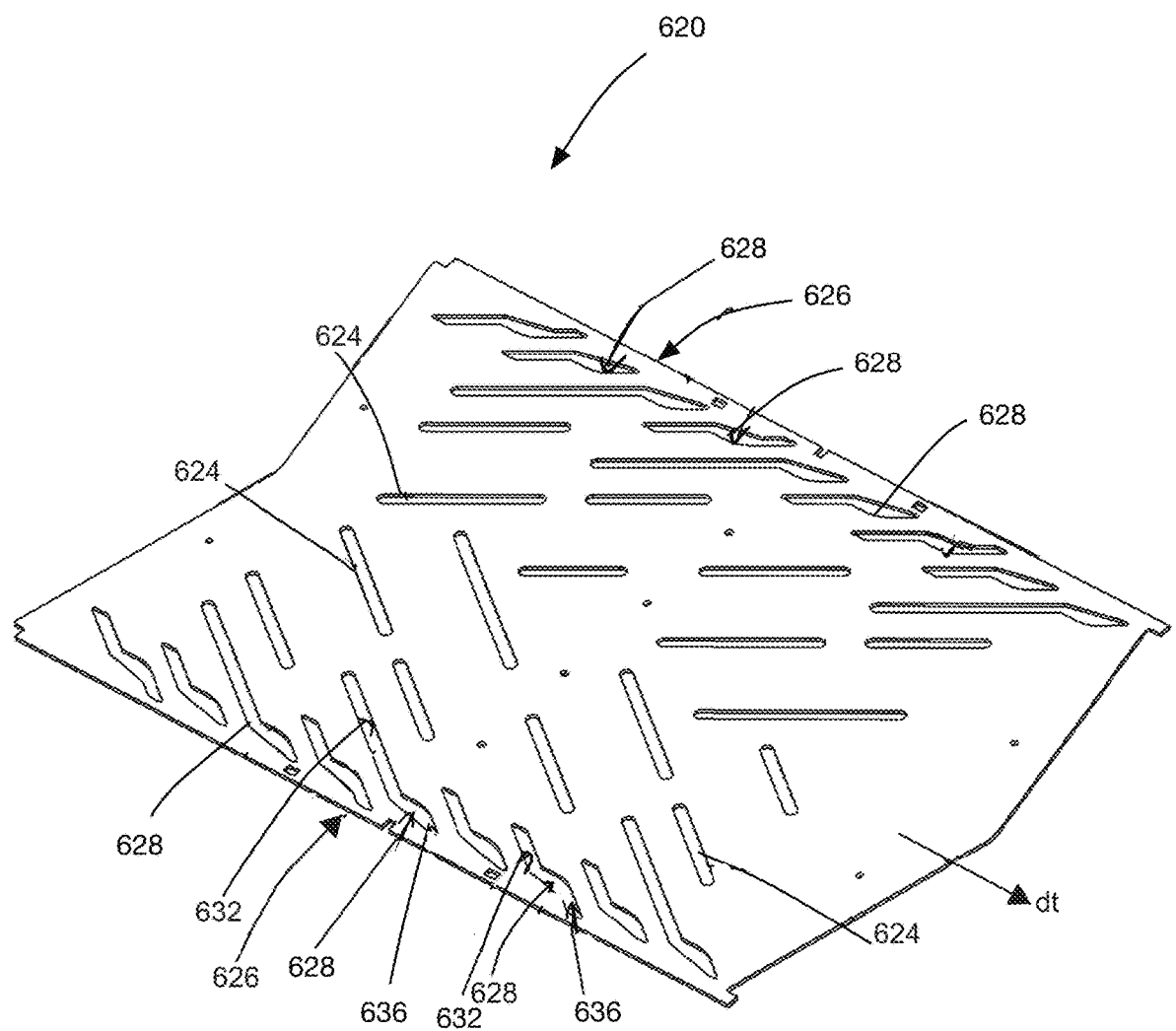

FIGS. 20A and 20B show two variants of the design of the wear plates. A wear plate 600 shown in FIG. 20A has fingers 604 that extend longitudinally (i.e., generally along the direction of travel of the endless belt) forward from lateral ends of the leading edge 606, and corresponding finger recesses 608 that extend longitudinally from lateral ends of the trailing edge 610. The fingers 604 mate with the finger recesses of adjacent wear plates 600 to maintain the wear plates 600 in lateral alignment while the wear plates 600 expand to reduce an expansion gap between the wear plates 600, and contract. A set of four locating slots 612 are positioned two along each lateral side of the wear plate 600. The wear plate 600 has a pattern of debris slots 616 that differs from those shown in the previous figures. In particular, the debris slots 616 are wider and shorter, enabling ample drainage without significantly affecting the structural integrity of the wear plate 600. That is, there are no portions of the wear plate 600 that are connected to the remainder of the wear plate 600 only by narrow sections.

A wear plate 620 shown in FIG. 20B has similar features to the wear plate 600 of FIG. 20A, but has different pattern of varying dimensioned debris slots. A first set of longitudinal debris slots 624 are generally rectangular with rounded corners, similar to the debris slots described and illustrated above, and are located centrally between the lateral sides 626 of the wear plate 620. A second set of peripheral debris slots 628 extend adjacent to the lateral sides 626 of the wear plate 620. Each of the peripheral debris slots 628 has a longitudinal portion 632 extending along a similar direction as the longitudinal debris slots 624, and a lateral portion 636 that deviates from the longitudinal portion 632 and extends along the travel direction dt of the belt. It has been found that, in some cases, debris travels down the lateral sides of the endless belts and gets underneath between the endless belt and the wear plates. The peripheral debris slots 628, and their lateral portions 636 in particular, assist in quickly flushing away this debris to reduce its chances of lingering between the endless belt and the wear plate 600.

Figure 21:
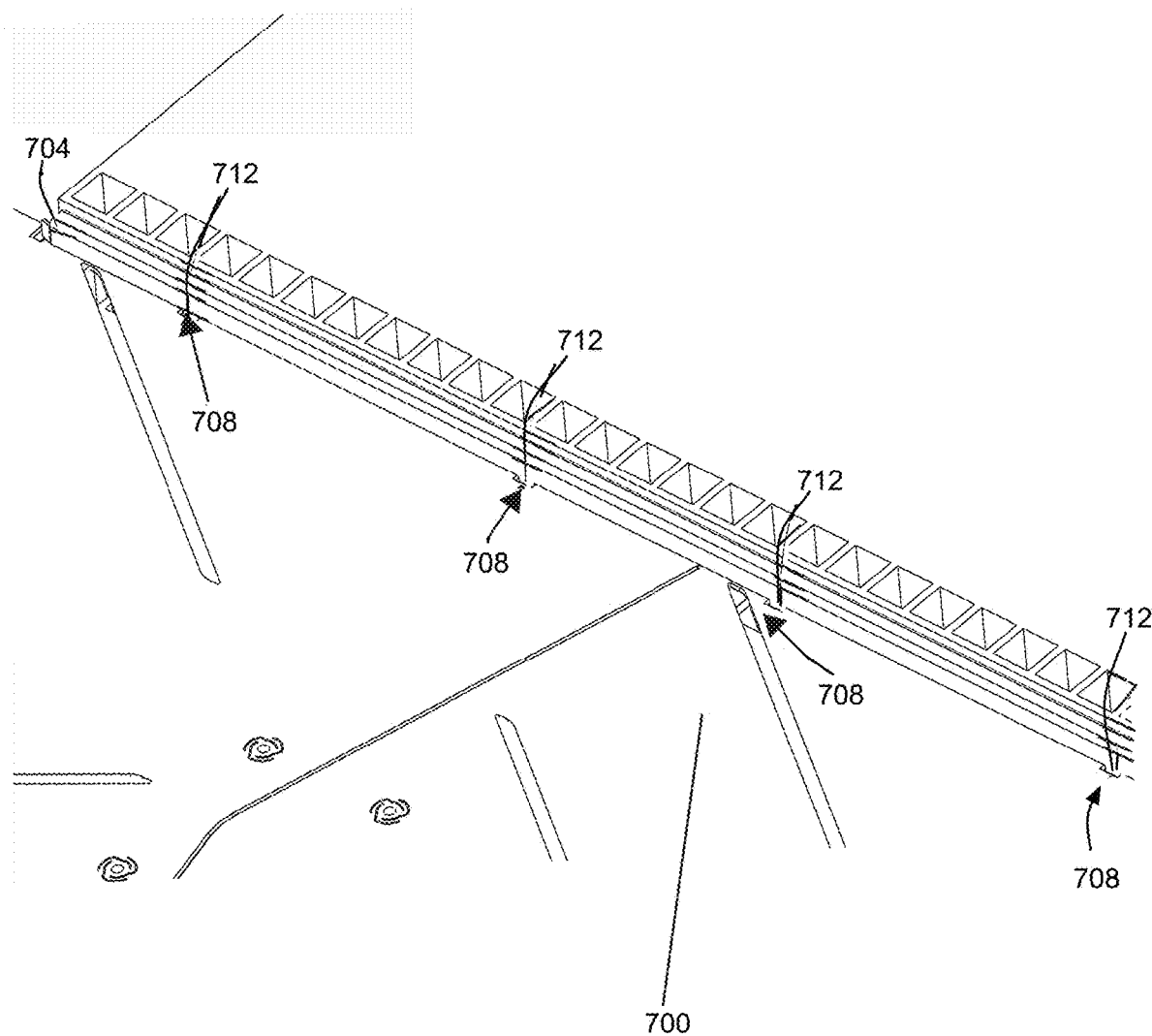
FIG. 21 shows the mating features of edge guides and wear plates according to an alternative embodiment.

FIG. 21 shows locating features of a wear plate 700 and an edge guide 704 that assist with maintaining the correct alignment of the wear plates 700 while enabling them to expand and contract as a result of fluctuations in the operating temperature. The wear plates 700 have locating slots 708 along their lateral edges. The edge guide 704 is made of 14 gauge stainless steel that has a curved profile, enabling it to be deflected as the wear plates 700 are being positioned. Locating tabs 712 of the edge guide 704 mate with the locating slots 708 of the wear plates 700. The size of the locating tabs 712 and the locating slots 708 are selected to enable the wear plates 700 to expand and contract.

FIGS. 22 to 26 show a wear plate 800 and a set of the wear plates 800 in use in a conveyor system in accordance with another embodiment. The conveyor system is similar to those shown in FIGS. 1 to 18.

A set of the wear plates 800 are shown deployed as part of a support deck 804 for an endless belt 808, a portion of which is shown. The support deck 804 is similar to the support deck 84 shown in FIGS. 4 to 8, 10A to 13 except that support deck 804 includes a lower support deck structure 811 and the wear plates 800. The lower support deck structure 811 generally includes a plurality of modular grid panels 812 adapted to be positioned end to end relative to one another along the longitudinal length of the service line. The modular grid panels 812 are made of fibre-reinforced plastic (hereinafter "FRP") or another material that is suitably hard. FRP is more economical than stainless steel for grid panels, but does not possess the same resistance to bending that stainless steel has. Accordingly, the modular grid panels 812 are positioned atop of three inner support rails 813, with the central inner support rail 813 supporting the center of the modular grid panels 812 that generally bears the most load when a vehicle is being transported by the conveyor system. A pair of carryway channels 814 extend along either side of the support deck 804 and are bolted to transverse I-beams, such as those shown in FIG. 16.

Figure 25:
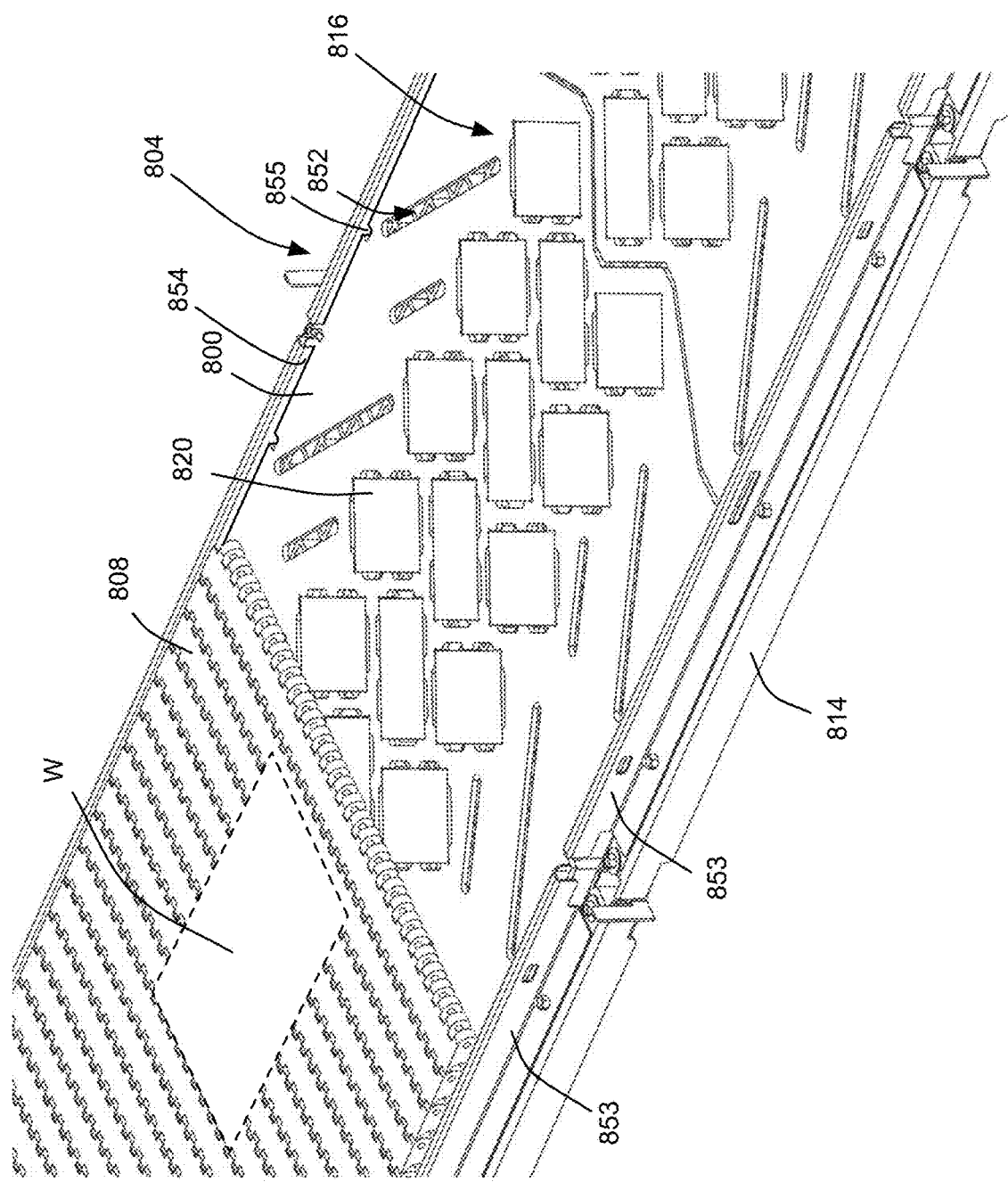
FIG. 25 is a perspective view of the support deck of FIG. 23 having a portion of an endless belt deployed thereon.
Figure 26:
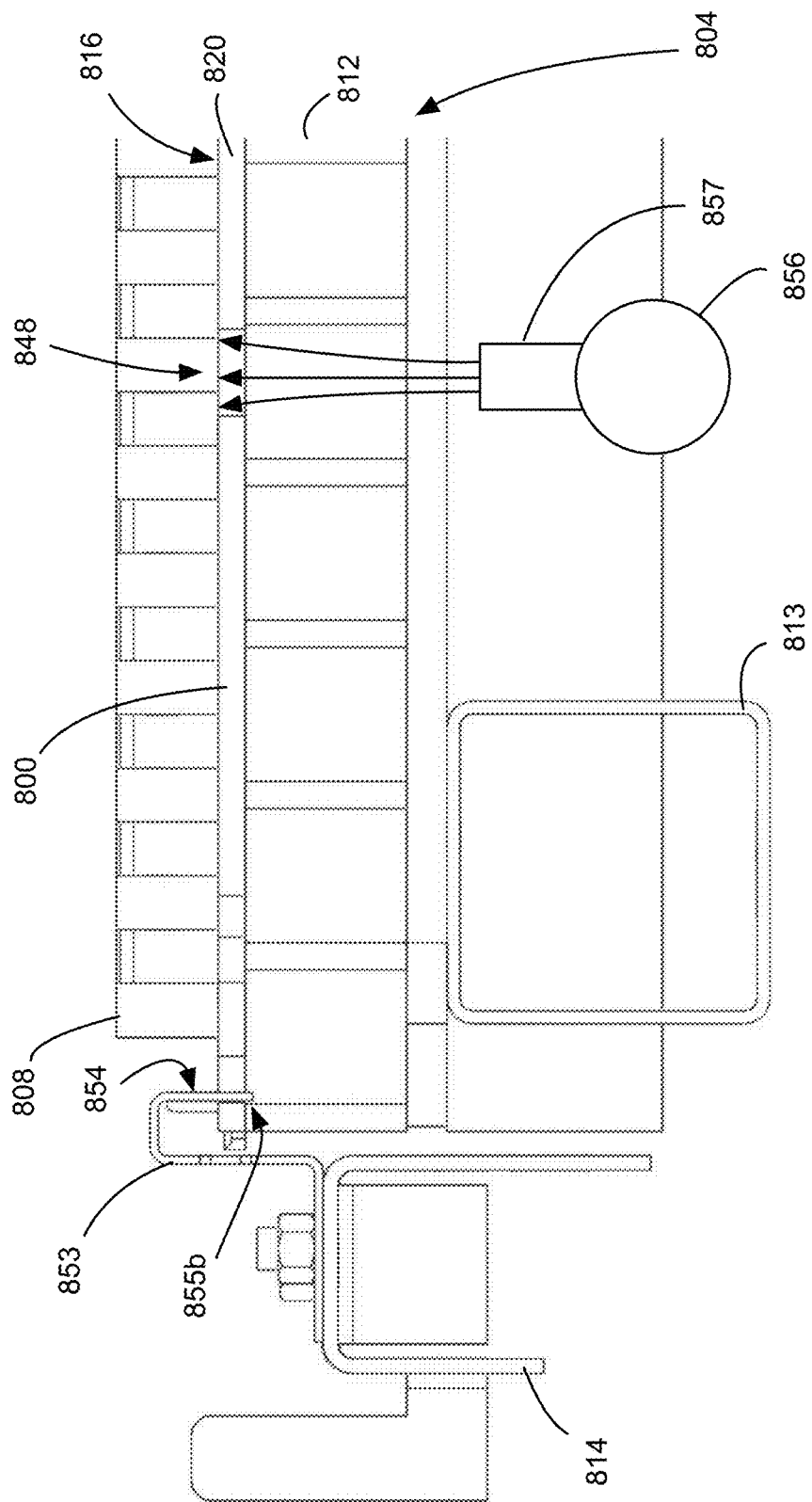
FIG. 26 is a cross-sectional elevation view of the support deck of FIGS. 24 and 25.

The support deck 804 is positioned between an upper transport portion of the endless deck 808, shown in FIG. 25, and a lower return portion of the endless belt 808. In this way, the support deck 804 provides support to the upper transport portion of the endless belt 808, and thereby a load placed thereon from a wheeled structure placed upon the conveyor system.

To facilitate sliding of the upper transport portion of the endless belt 808 over the support deck 804, the wear plates 800 form a belt contact surface 816. The belt contact surface 816 is the surface of the wear plates 800 facing the upper transport portion of the endless belt 808 during normal use. The conveyor system includes a set of the wear plates 800 as well as a set of wear inserts 820 positioned within openings 824 of the wear plates 800.

The wear plates 800 are similar in size and construction to the wear plates of FIGS. 19A to 21, and are made from a material that is at least partially from a polymer. The polymer can be a thermoplastic, such as a polyethylene, in some implementations. Preferably, the material is an ultra-high-molecular-weight polyethylene or a high-density polyethylene.

Each of the wear plates 800 includes a leading edge 828, a trailing edge 832, and two parallel lateral edges 836 that are generally straight. A pair of securement apertures 839 are positioned adjacent to each of the lateral edges 836. The leading edge 828 and the trailing edge 832 are designed so that the trailing edge 832 of the wear plate 800 mates with the leading edge 828 of an adjacent wear plate 800.

A set of clamping edge guides 853 are secured to the carryway channels 814 via a set of bolts or any other suitable means after positioning of the wear plates 80 on the modular grid panels 812. Each of the clamping edge guides 853 has a clamping portion 854 that clamps one or more wear plates 800 (depending on the sizing, but two halves in the illustrated embodiment) towards the modular grid panels 812 close to the lateral edges 836. Retaining tabs 855 of the clamping portion 854 fit within the securement apertures 839. The clamping edge guides 853 restrict lateral movement of the endless belt 808 as it travels over the belt contact surface 816.

The wear plates 800 expand and contract with temperature changes. To allow for this expansion and contraction, the wear plates 800 are secured via the clamping edge guides 853 so that their general longitudinal position along the modular grid panels 812 is fixed via the retaining tabs 855 inserted into the securement apertures 839. The securement apertures 839 of the wear panels 800 extend further longitudinally than the retaining tabs 855 of the clamping edge guides 853, thus enabling expansion of the wear plates 800 longitudinally. The wear plates 800 have mating features inhibiting lateral shifting of the wear plates 800 relative to one another in the form of fingers 864 that extend longitudinally (i.e., generally along the direction of travel of the endless belt) forward from lateral ends of the leading edges 828, and corresponding finger recesses 868 that extend longitudinally from lateral ends of the trailing edges 832. The fingers 864 mate with the finger recesses 868 of adjacent wear plates 800 to maintain the wear plates 800 in lateral alignment while the wear plates 800 expand to reduce an expansion gap 872 between the wear plates 800, and contract.

In other embodiments, the fingers can extend longitudinally from the trailing edge and mate with corresponding finger recesses of the leading edge of an adjacent wear plate. Alternatively, a finger and a recess can be located on opposite lateral ends of each leading and trailing edge and mate with the corresponding features of adjacent wear plates. Other types of mating features that inhibit lateral shifting of the wear plates will occur to those skilled in the art.

Each of the wear inserts 820 is rectangular, having four lateral sides 840 that meet at right angles. The wear inserts 820 may be commercially available ceramic tiles or may be custom-made. In particular, the wear inserts 820 may be ceramic tiles produced for lining chutes in mining operations that are made of approximately 92 percent aluminum oxide, and other agents, such as a bonding agent or agents.

In the illustrated embodiment shown in FIG. 23, the wear insert 820 is bonded to a compressible layer in the form of a compressible backing 844 that enables slight downward depression of the wear insert 820 when positioned in one of the openings 824. In particular, the compressible backing 844 is made at least partially of a neoprene rubber of suitable durometer and thickness, but, in other embodiments, any other suitably resilient and compressible material can be employed. It has been found that, by using the compressible backing 844 with the wear inserts 820, the incidence of fracturing of the wear inserts 820 as a result of slight variations in the thickness of the wear plates 800 or the flatness of a support surface upon which the wear plates 800 and the wear inserts 820 are positioned is significantly less frequent. In this manner, the compressible backing 844 is positioned under the wear inserts 820 to facilitate depression of the wear inserts 820 relative to the wear plate 800.

In other embodiments, however, the compressible layer can be omitted or can be deployed under both the wear plates 800 and the wear inserts 820 with corresponding cut-outs for rinsing system dirt pass-through apertures and flooder apertures.

Further, it can be advantageous to ensure that the top of the modular grid panels 812 are generally level to reduce uneven load on the wear inserts 820 as the wheels of a vehicle positioned on the endless belt 808 travel thereover. It has been found that a gritty side of the modular grid panels 812 is more level than the non-gritty side as the gritty substance applied to the gritty side forms a more uniformly level surface.

The wear plates 800 are manufactured via molding to have a thickness $t_{wp}$. A thickness to of the wear inserts 820 and the compressible backing 844, if present, corresponds generally to the thickness $t_{wp}$ of the wear plates 800. The thickness $t_{wp}$ of the wear plates 800 may be selected to be slightly greater than the thickness to of the wear inserts 820 so that any acceptable variances in the thickness $t_{ci}$ of the wear inserts 820 won't exceed the thickness $t_{wp}$ of the wear plates 824 to thereby avoid fracturing of the wear inserts 820. Where compressible backing is not deployed with the wear inserts 820, it may be more desirable to select a thickness $t_{wp}$ for the wear plates 800 that is marginally greater than in scenarios where the compressible backing 844 is deployed, as the compressible backing 844 provides tolerance to slight projection of a wear insert 820 over the wear plate 800.

The wear inserts 820 are oriented in a pattern along a central band $B_c$ of the wear plate 800. In particular, the wear inserts 820 are oriented so that the lateral sides 840 of the wear inserts 820 are at angles between 40 degrees and 50 degrees, and preferably at 45 degrees, to a longitudinal direction of travel dt of an endless belt traveling thereover. The orientation of the lateral sides 840 of the wear inserts 820 at 45 degrees has been found to reduce wear on an endless belt in comparison to other orientations, particularly where the lateral sides 840 of the wear inserts 820 are oriented perpendicular to the direction of travel dt of the endless belt.

Segments of the leading edge 828 and the trailing edge 832 of the wear plate 800 that are adjacent to wear inserts 820 are generally parallel to a closest one of the lateral sides 840 of the adjacent wear insert 820. Traditional wear plates typically have leading and trailing edges that are transverse to the longitudinal direction of travel dt of the endless belt 804. If such transverse edges were employed with the wear plate 800 with the obliquely oriented wear inserts 820, the gap between the wear inserts 820 would be significant. By jagging the leading and trailing edges 828, 832 of the wear plates 800, the gap between the pattern of obliquely oriented wear inserts 820 on adjacent wear plates 800 can be significantly reduced, and, thus, wear on the central band $B_c$ around the leading and trailing edges 828 and 832 can be reduced.

The position of a wheel atop of the endless belt 808 is shown generally at W. It has been found with conventional wear plates that, as wheels of a vehicle are generally more likely to be centrally positioned on an endless belt traveling over the wear plates, the greatest wear occurs along a central region of the belt contact surface 816 extending longitudinally. By employing the wear inserts 820, which have a relatively high resistance to abrasion, along the central band $B_c$, along which wheels such as wheel W are most likely to be positioned, the wear plates 800 wear more evenly, thus extending the lifetime of the wear plates 800 and the overall maintenance cost of the conveyor system.

The openings 824 within the wear plate 800 in which the wear inserts 820 are received are formed via any suitable known means such as milling, water jet cutting, etc. Each opening 824 is dimensioned so that is at least partially unobstructed when one of the wear inserts 820 is positioned therein. In particular, when the wear inserts 820 are inserted into the openings 824, one or more gaps 848 are present between the wear plate 800 and each of the wear inerts 820. The gaps 848 extend through the wear plate 800.

The openings 824 are sufficiently spaced from one another so that the strength of the wear plate 800 is not significantly compromised. A minimum spacing between openings 824 factors in the presence of the gaps 848. The pattern of the wear inserts 820 along the central band $B_c$ is selected based on a number of factors. Increasing the surface area of the central band $B_c$ of the wear plate 800 covered by wear inserts 820 increases the resistance to abrasion of the belt contact surface 816 provided by the wear plates 800 and the wear inserts 820. Increases in the size of the wear inserts 820 can lead to a greater chance of fracturing of the wear inserts 820. Increasing the spacing between wear inserts 820 improves the strength of the wear plates 800, but decreases the resistance to abrasion of the belt contact surface 816. It has been found that, by using rectangular wear inserts 820 and arranging the openings 824 for the wear inserts 820 as closely as possible without significantly deteriorating the strength of the wear plate 800 so that the lateral sides 840 of the wear inserts 820 are positioned at 45 degree angles relative to the direction of travel dt, various advantages can be realized. Currently produced ceramic tiles can be used as wear inserts 820, thereby reducing the cost of production. Further, the strength of the wear plate 800 is maintained at a desirable level. Still further, degradation of the endless belt traveling thereacross is improved relative to conventional belt contact surfaces.

The central band $B_c$ is spaced from the lateral edges 836 of the wear plate 800 by peripheral bands $B_p$. A number of rinsing system dirt pass-through apertures 852 are situated along the peripheral bands $B_p$ to facilitate rinsing of debris from between an endless belt positioned thereon and the belt contact surface 816 provided by the wear plate 800 and the wear inserts 820. Each of the rinsing system dirt pass-through apertures 852 is aligned with at least one rinsing system outlet from a rinsing system conduit arrangement positioned proximate to the rinsing system dirt pass-through aperture 852 and positioned to eject rinsing system liquid onto an endless belt upstream from a downstream edge of the rinsing system dirt pass-through aperture 852 in order to capture at least some of the ejected liquid through the rinsing system dirt pass-through aperture 852.

Figure 18:
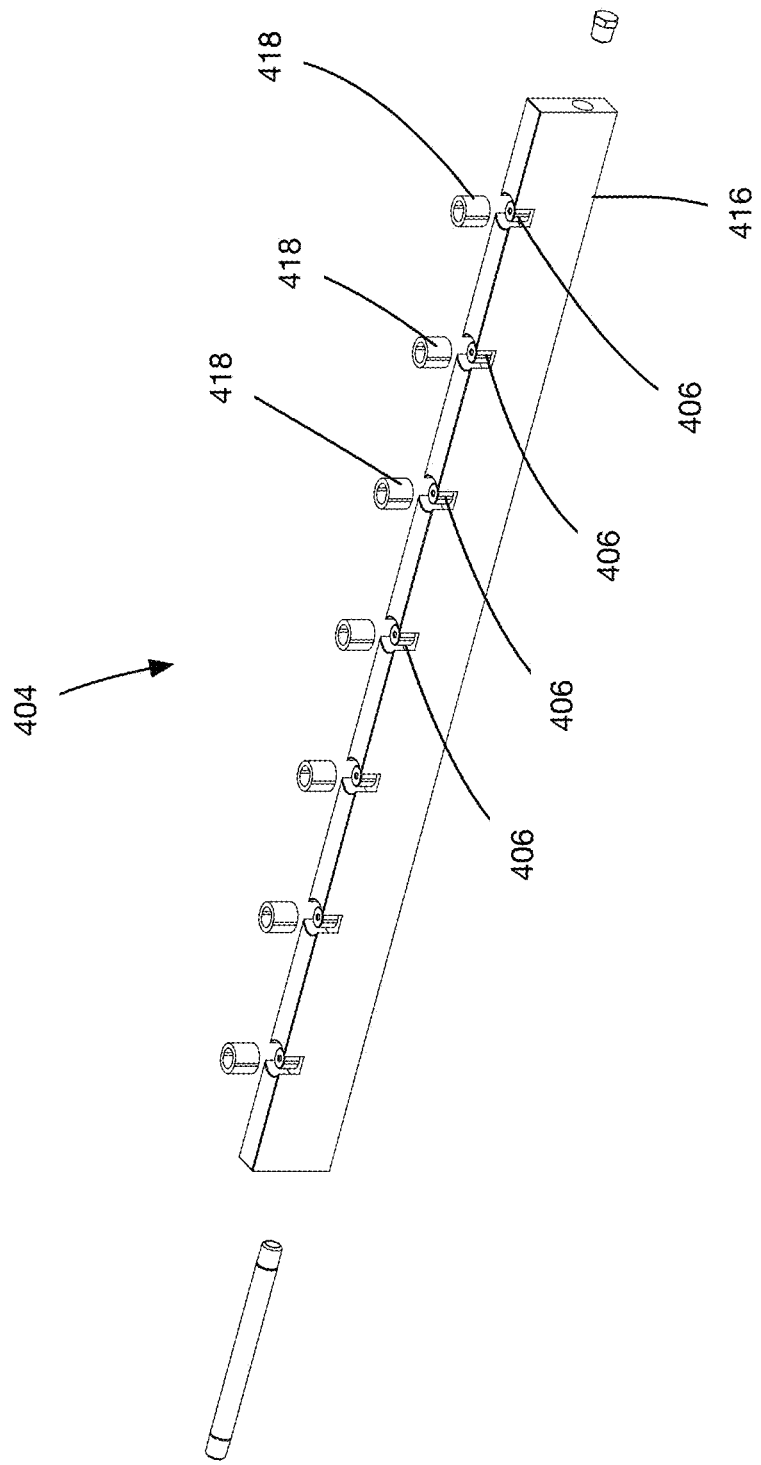

A belt-rinsing system is provided in the conveyor system and includes a rinsing system conduit arrangement 856 that is connected to a source of rinsing system liquid and at least one belt rinsing arrangement. Each belt rinsing arrangement includes at least one rinsing system outlet 857 that is positioned proximate to one of the rinsing system dirt pass-through aperture 852 and the gaps 848 (which acts as a rinsing system dirt pass-through aperture) to eject rinsing system liquid onto the endless belt 808 upstream from a downstream edge of the rinsing system dirt pass-through aperture in order to capture at least some of the ejected liquid through the rinsing system dirt pass-through aperture. The rinsing system liquid rinses away debris from between the belt contact surface 816 and the endless belt 808 positioned thereon. Still further, a flooder system 860 similar to that illustrated in FIG. 18 is employed to introduce liquid between the endless belt 808 and the belt contact surface 816 via the gaps 848 and the rinsing system dirt pass-through apertures 852. The rinsing system and the flooder system 860 induce the clearing of debris from between the belt contact surface 816 and the endless belt 808 and introduce water therebetween to facilitate travel of the endless belt 808 over the belt contact surface 816.

In a preferred embodiment, the width of the central band $B_c$ is between 30% and 80% of the entire width of the wear plate 800, and in particular, between 60% and 75%. In other embodiments, where a mass being transported on an endless belt atop of a belt contact surface is distributed more uniformly across a lateral width of the belt contact surface, it may be desirable to have the central band $B_c$ cover more or all of the lateral width of the belt contact surface.

When wear plates are manufactured at least partially from a polymer such as UHMWPE or HDPE, and especially when the wear plates are like the wear plates 800 that have the wear inserts 820 inserted in openings thereof along the central band $B_c$, the belt contact surface 816 is more highly resistant to wear from travel of the endless belt 808 thereover than without the wear inserts 820, thereby enabling the central band $B_c$ to wear at roughly the same rate as the peripheral bands $B_p$.

As will be appreciated, the size and shape of the wear inserts can be varied. FIG. 27 shows a wear insert 876 that is circular in form. Ceramic inserts that lack corners or have corners of less acute angles, such as the circular wear insert 876, or hexagonal or octagonal wear inserts, for example, may be more resistant to fracturing in some scenarios. Further, it can be desirable to use wear inserts of a smaller size in some circumstances. While the number of joints in the belt contact surface encountered by an endless belt may increase, the probability of fracturing of the wear inserts can decrease.

The dimensions of the cells of the support structure under the belt contact surface can be varied to more evenly distribute the load on the wear inserts as vehicles positioned in an endless belt pass thereover.

FIG. 28 shows a cross-section of a portion of a wear plate 900 and a wear insert 904 in accordance with an alternative embodiment. A horizontal profile of the wear insert 904 and an opening in the wear plate 900 in which the wear insert 904 is received decreases in size towards a top surface 904 of the wear plate 900 and the wear insert 904. Thus, the dimensions of the opening in the wear plate 900 and the wear insert 904 inhibit upward escape of the wear insert 904 from the opening when the wear plate 900 is positioned at the top of the support structure. As will be appreciated, the opening in the wear plate 900 can be dimensioned to define one or more gaps adjacent the wear insert 904 when the wear insert 904 is inserted into the opening. These gaps can serve as rinsing system dirt pass-through apertures and/or flooder system apertures.

While, in the above-described embodiments, the inserts are at least partially ceramic, in other embodiments, the inserts are made of any material having a higher resistance to abrasion than the wear plates. As such materials can be more brittle or expensive, it may not be desirable to construct wear plates entirely out of them. By using the materials in a sparing manner, in the form of inserts, the overall effective lifetime of the wear plate can be increased by using the inserts at least where wear otherwise occurs the most in a uniform polymer wear plate. Further, the cost of producing the belt contact surface can be reduced by reducing the amount of the more abrasion-resistant material. Exemplary materials for the inserts can include, for example, stainless steel, aluminum, high-performance plastic, titanium, and ceramic bonded to steel.

FIG. 29 shows a holddown 1000 for a wear plate in accordance with another embodiment. The holddown 1000 is formed by water jet cutting a set of apertures in a polymer wear plate 1002. In particular, a central bolt aperture 1004 is formed, as well as a set of surrounding apertures 1008. The surrounding apertures 1008, with the bolt aperture 1004, define a bolt support ring 1012 that is supported by four bolt support stays 1016. While four bolt support stays 1016 are used in this embodiment, it will be appreciated that fewer or more bolt support stays can be employed. The bolt support stays 1016 are non-radial so that depression of the bolt support ring 1012 relative to a plane of the wear plate 1002 is possible via tensioning and torqueing of the bolt support stays 1016. In other embodiments, the apertures 1004, 1008 can be formed via any other suitable cutting, routing, or molding means.

FIG. 30 shows a toggle anchor 1020 that is used in conjunction with the holddown 1000 of FIG. 29. The toggle anchor 1020 has a pair of plastic rails 1024, a first end of each of which is pivotally secured a toggle 1028. The toggle 1028 has a central threaded through hole 1030. The rails 1024 have a set of teeth on their outer surface. When the rails 1024 are aligned longitudinally, the toggle 1028 is oriented perpendicularly to a longitudinal axis of the rails 1024. A finger grip 1032 is secured to a second end of each of the rails 1024. The finger grips 1032 have a shape or surface features to enable sliding longitudinal displacement relative to one the other. The rails 1024 pass through an interior aperture of a retention plate 1036. Longitudinal axial displacement of the finger grips 1032 causes a longitudinal axis of the toggle 1028 to pivot towards the longitudinal axis of the rails 1024 to enable the fitting of the toggle 1028 and the rails 1024 through the aperture 1004 of the wear plate 1002 when the wear plate 1002 is positioned atop of the set of modular grid panels 812. Once the toggle 1028 is fitted through the aperture 1004 and positioned through a cell of one of the modular grid panels 812, the finger grips 1032 can be realigned axially to cause the toggle 1028 to pivot towards a perpendicular orientation relative to the longitudinal axis of the rails 1024. The toggle anchor 1020 can then be pulled upward to cause the toggle 1028 to engage a bottom surface of the modular grid panel 812. The retention plate 1036 can then be slid down the rails 1024 towards the bolt support ring 1012 with some force to pass over the teeth of the rails 1024 until the retention plate 1036 abuts against the bolt support ring 1012 and is held from movement along the longitudinal axis of the rails 1024 to retain the toggle 1028 firmly against the modular grid panel 812. The upper portion of the rails 1024 extending above the retention plate 1036 can then be snapped off.

FIGS. 31A and 31B show the wear plate 1002 secured to a modular grid panel 812 via the toggle anchor 1020. The wear plate 1002, when positioned atop of the modular grid panel 812, has its holddown 1000 positioned generally centrally over an open cell 1044 of the modular grid panel 812. A bolt 1048 is inserted into the bolt aperture 1004 and threaded into the threaded through hole 1030 of the toggle 1028 to secure the toggle against the modular grid panel 812. As the bolt 1048 is turned, the holddown 1000 is deformed, with the bolt support ring 1012 being pulled towards the toggle 1028, thereby deforming the bolt support stays 1016 and securing the wear plate 1002 to the modular grid panel 812. The head of the bolt 1048 becomes recessed below the top plane of the wear plate 1002. Rotation of the bolt 1044 is terminated once the head of the bolt 1044 sits at least below a maximum wear level 1050 of the wear plate 1002. As the wear plate 1002 is scheduled to be replaced on or before wearing down of the surface of the wear plate 1002 to the maximum wear level 1050, an endless belt travelling over the wear plate 1002 should not contact the bolt 1048.

Figure 22:
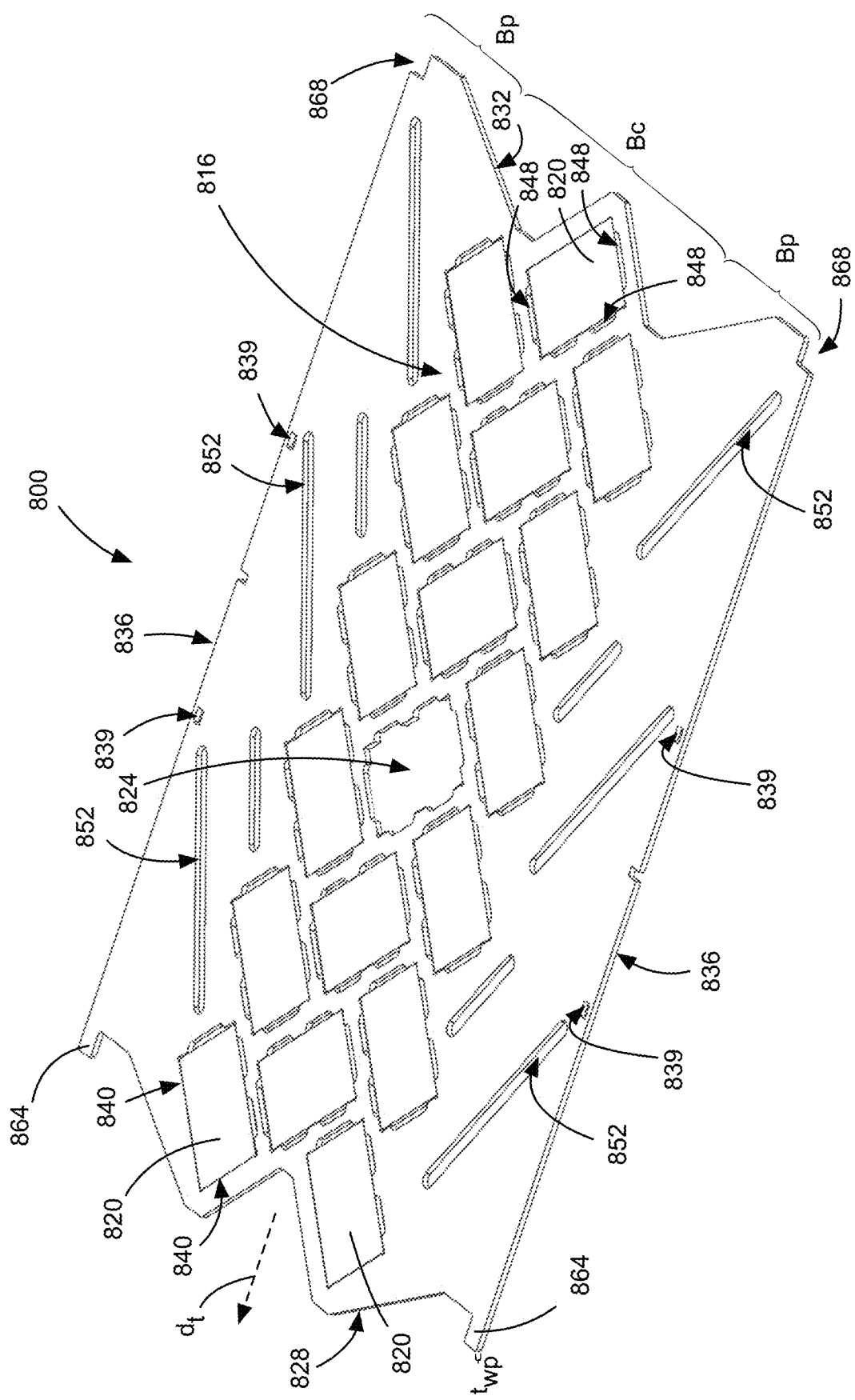
FIG. 22 shows a wear plate having wear inserts in accordance with another embodiment.
Figure 24:
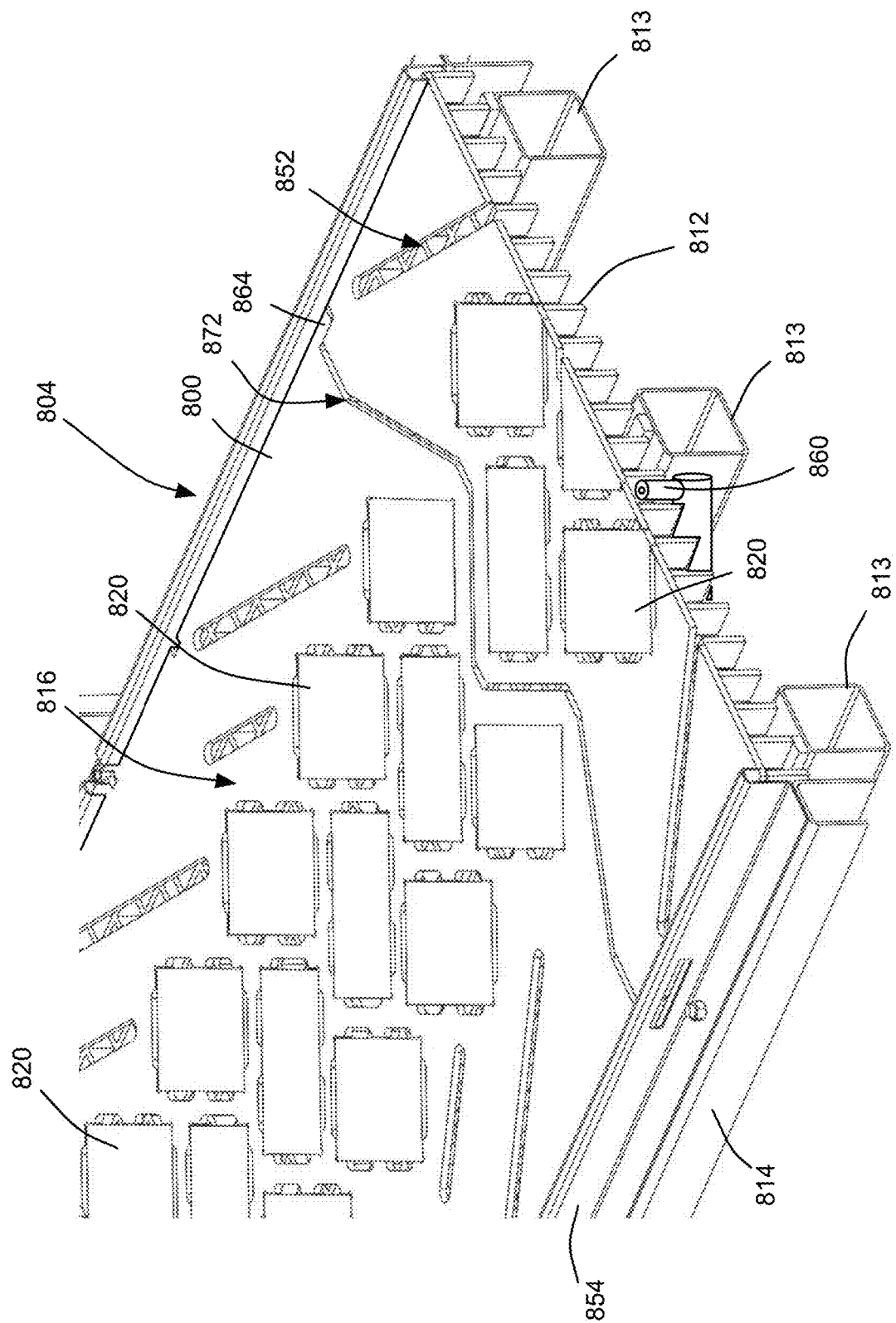
FIG. 24 is a perspective section view of a set of wear plates of FIG. 22 deployed as part of a support deck for an endless belt.
Figure 32:
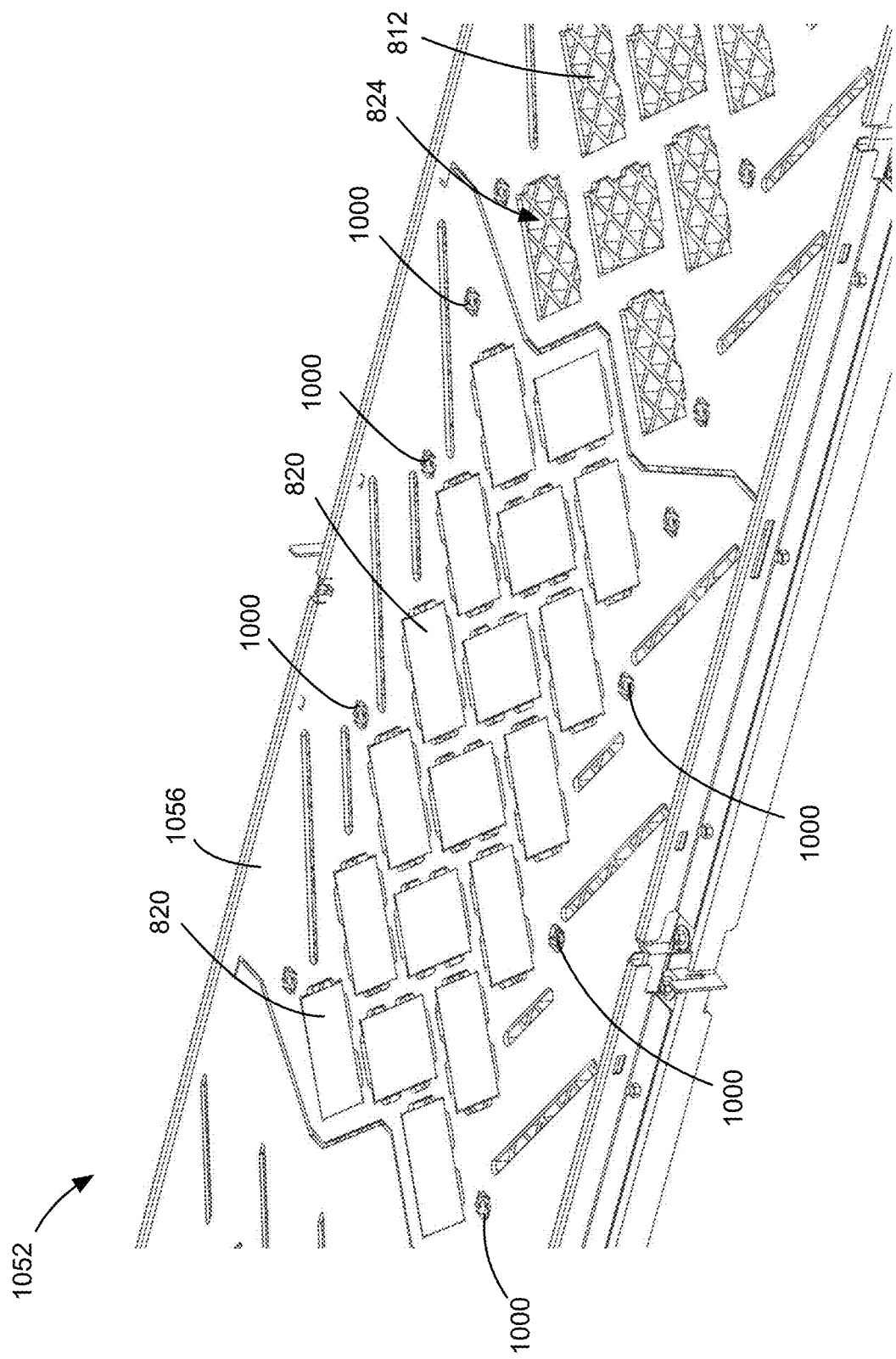
FIG. 32 is a perspective view of a support deck similar to that of FIG. 25 employing a set of wear plates including holddowns as shown in FIGS. 29 to 31B.

FIG. 32 shows a support deck 1052 similar to that of FIG. 25, wherein a set of wear plates 1056 similar to those of FIGS. 22, 24, and 25 have been produced with the holddowns 100 of FIGS. 29 to 31B. The holddowns 1000 when secured to the modular grid panels 812, exposed in a region where the wear inserts 820 have not yet been placed in the openings 824 of the wear plates 1056. The holddown arrangement of FIGS. 29 to 31 is particularly useful where it is desired to secure the wear plate 1056 to the modular grid panels 812 between lateral sides of the wear plates 1056 to avoid shifting and warping thereof. As the bolt support stays 1016 of the holddowns 1000 enable some degree of deformation, and as the cells of the modular grid panels 812 are somewhat large, expansion of the wear plates 1056 is permitted.

In other embodiments where the wear plates do not fully span the distance between the edge guides, holddowns like those of FIGS. 29 to 32 can be used to hold down the wear plates at least where they are not held down by the edge guides to the modular grid panels or other support structure.

Reference is made to FIG. 33, which illustrates another embodiment of the support deck, shown at 1100 and the belt-rinsing system shown at 1102. The support deck 1100 is, as in other embodiments, positioned to support the upper transport portion 42 of the endless belt 36. The support deck 1100 includes a lower support deck structure 1104, which may be similar to the lower support deck structure shown at 812 shown, for example, in FIG. 24 and other figures, and described above, and which may therefore include a plurality of grid plates 1105.

Figure 10B:
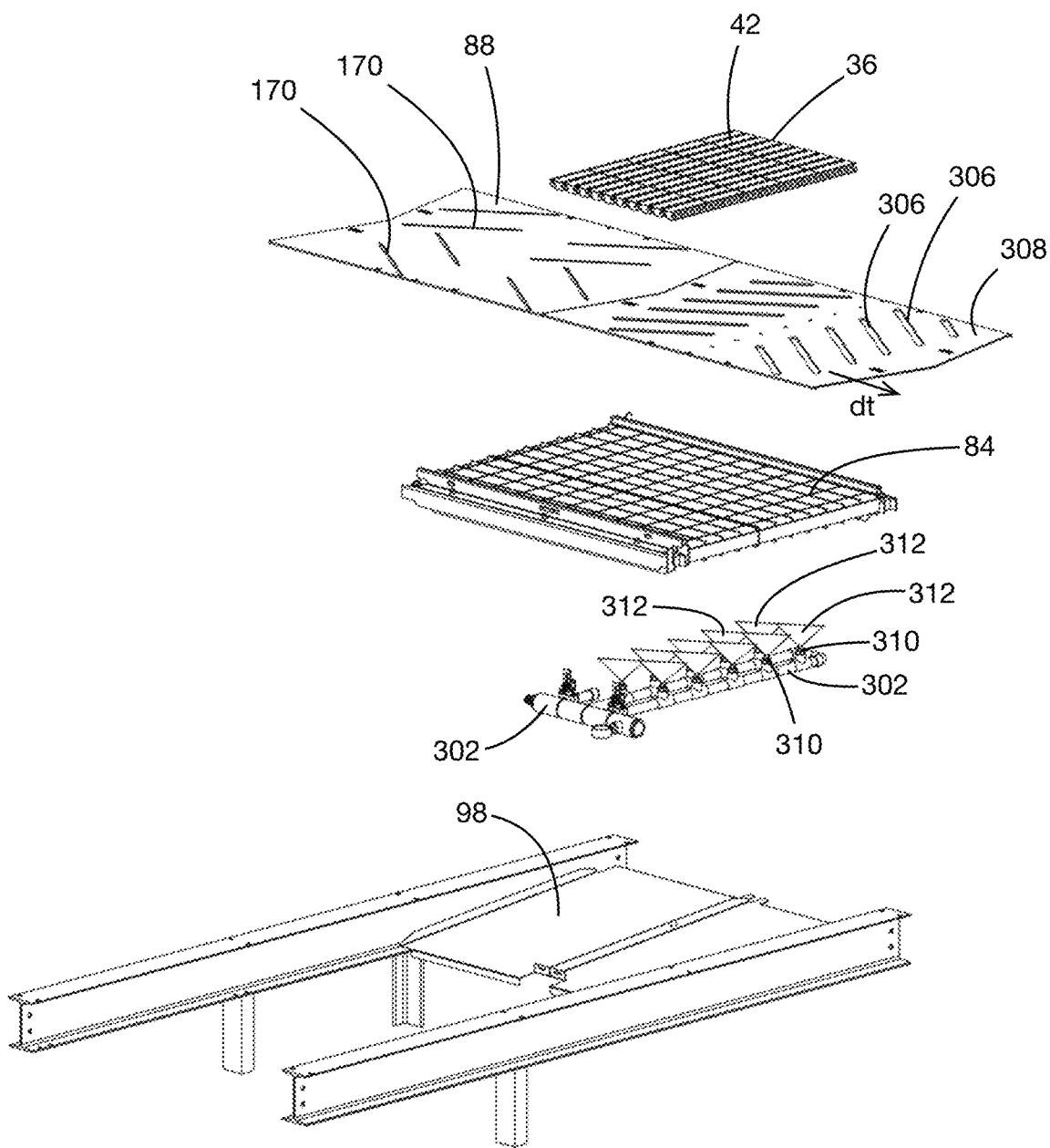

The support deck 1100, further includes a plurality of wear plates 1106, which may be similar to any of the wear plates shown in other embodiments, such as, for example, the wear plates 800, 620, 600, 500, 308 and 88. The wear plates 1106 are supported on the lower support deck structure 1104 and are engageable with the upper transport portion 42 of the endless belt 36. In FIG. 33, only a small portion of the upper support portion 42 is shown, and it is represented by a simple rectangular segment. It will be noted that this is simply to facilitate representation of the upper transport portion 42, and that the upper support portion 42 may be as shown in FIG. 10B or any of the other figures.

The support deck 1100 includes a plurality of alignment aperture pairs 1108 (FIG. 34), one of which is shown in greater magnification in FIG. 35. Each alignment aperture pair 1108 includes a first alignment aperture 1110 through the lower support deck structure 1104, and a second alignment aperture 1112 through one of the plurality of wear plates 1106. In embodiments wherein the lower support deck structure 1104 includes a plurality of grid plates 1105 (as shown in the present embodiment), the first alignment aperture 1110 may simply be any of the apertures of the grid plates 1105.

The belt-rinsing system 1102 includes a plurality of rinsing system outlet bodies 1114. Each of the plurality of rinsing system outlet bodies 1114 extends into one of the first alignment apertures 1110 of the lower support deck structure 1104 and into one of the second alignment apertures 1112 of one of the plurality of wear plates 1106, so as to inhibit movement of said one of the plurality of wear plates 1106 relative to the lower support deck structure 1104. In other words, the rinsing system outlet bodies 1114 serve to act as outlets for the belt-rinsing system 1102, while at the same time, also helping to align the wear plates 1106 so as to inhibit the wear plates from shifting during operation of the conveyor system 20.

Figure 34:
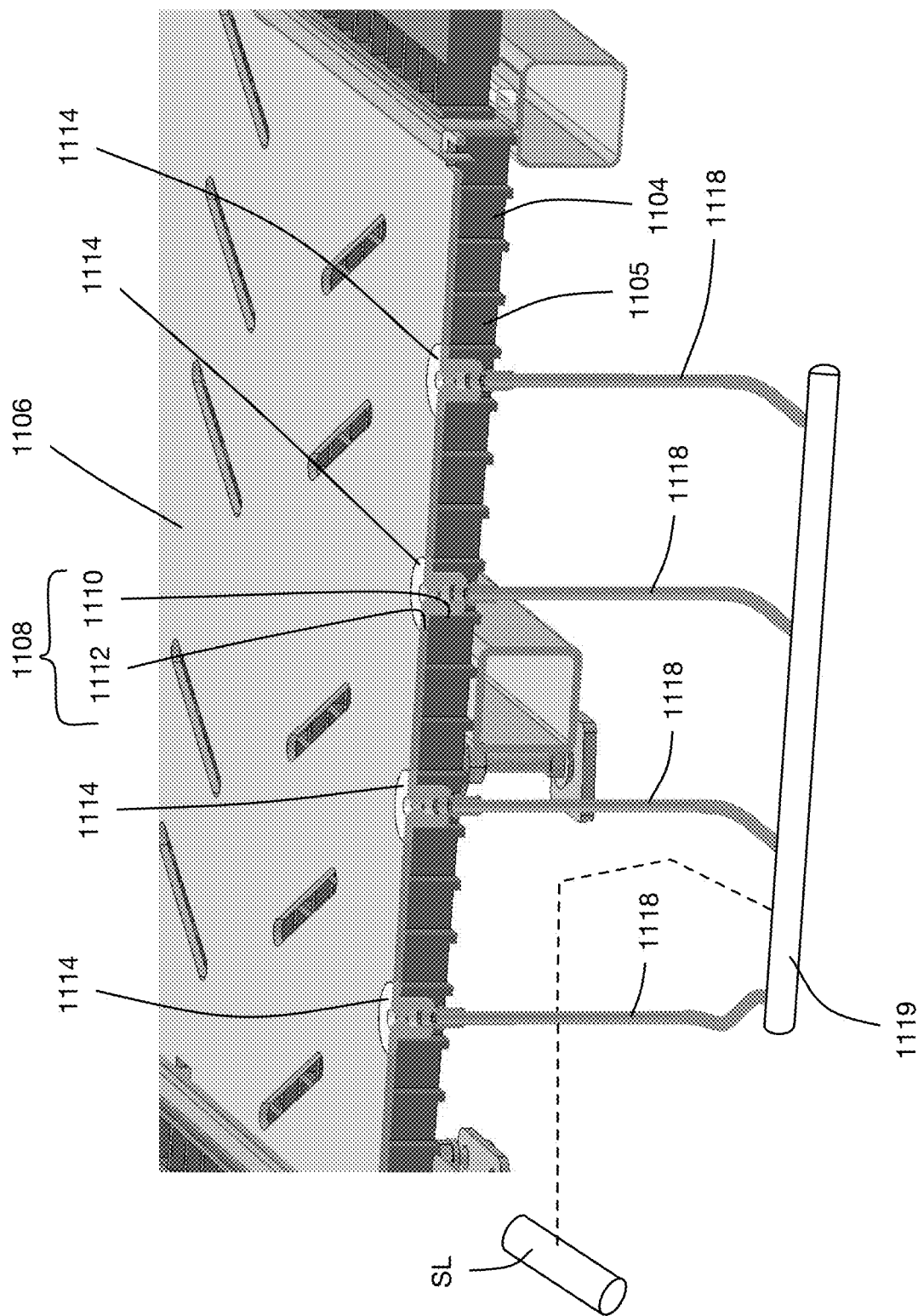
FIG. 34 is a sectional perspective view of the support deck shown in FIG. 33 along with the rinsing system.

As best seen in FIG. 35, each of the plurality of rinsing system outlet bodies 1114 has an outlet body rinsing liquid passage 1115 therethrough with an outlet body inlet 1116 that is connectable to a source of rinsing system liquid (shown symbolically as a section of pipe and identified as SL in FIG. 34), and which could be, for example a connection to a city water supply, and an outlet body outlet 1117 that faces the upper transport portion 42 of the endless belt 36 so as to eject the rinsing system liquid on the upper transport portion 42 of the endless belt 36. A rinsing system liquid transport conduit 1118 may connect to the source SL of the rinsing system liquid in any suitable way, such as by connecting to one or more header conduits, which in turn connects to the source SL of the rinsing system liquid. A header conduit is shown at 1119, and is shown schematically as being connected to the source SL by a simple dashed line for convenience, but it will be understood that any arrangement of conduits may be provided for that function. Any of the conduits 1118, 1119 or otherwise, may be fixed conduits such as pipe or tube, or may be flexible conduits, such as hose or the like, or may be any other suitable type of conduits. Advantageously, the conduits 1118 may be made from a length of hose, for reasons described further below. Additionally, advantageously the rinsing system liquid transport conduit 1118 connects to the outlet body inlet 1116 via a releasable press-fit connection. In the example shown, the inlet 1116 may include a threaded water fitting that is threaded into the outlet body rinsing liquid passage 1115, and the threaded water fitting itself may have a push lock fitting at its free end.

The arrangement as shown increases the likelihood that the rinsing system outlet bodies 1114 maintain a consistent orientation and position relative to the wear plates 1106, even in the event that there is some movement of the lower support deck structure 1104 relative to other components due to vibration or the like.

Each of the plurality of rinsing system outlet bodies 1114 may optionally have a first outlet body portion 1120 (FIG. 35A) having a first width W1 that is sized to fit into the first alignment aperture 1110, and a second outlet body portion 1122 having a second width W2 that is larger than the first width W1, and which is sized to fit into the second alignment aperture 1112. Each of the plurality of rinsing system outlet bodies 1114 may further have an outlet body shoulder 1124 between the first and second outlet body portions 1120 and 1122, that is supported on an outlet body support surface 1126 between the first alignment aperture 1110 and the second alignment aperture 1112 of each of the alignment aperture pairs 1108.

In the embodiment shown, the outlet body support surface 1126 is an upper surface of the lower support deck structure 1104.

The rinsing system outlet bodies 1114 may be made from any suitable material such as, for example a thermoplastic material such as UHMW polyethylene. Since it was described that the wear plates 1106 may be similar to any of the wear plates 800, 620, 600, 500, 308 and 88, it will be noted that, in some embodiments the wear plates 1106 may be made from a thermoplastic material such as UHMW polyethylene. Accordingly, the rinsing system outlet bodies 1114 will wear at the same rate as the wear plates 1106 around them. This would be true in embodiments in which the material from which the wear plates 1106 is the same as the material of the alignment bodies 1130, even if the material is not UHMW polyethethylene (e.g. some other thermoplastic material).

It will be noted that the arrangement shown provides relatively easier access to the rinsing system outlet bodies 1114 in the event that one or more of them needs to be replaced for any reason. There may be a small amount of clearance (e.g. 0.5 mm) between the rinsing system outlet bodies 1114 and the second alignment apertures 1110 in the wear plates 1106, which permits a user to insert a tool, such as the tip of a flat head screwdriver therebetween to wedge the rinsing system outlet bodies 1114 out of the associated alignment aperture pairs 1108 aperture pair 1108. If a hose section is included in the rinsing system liquid transport conduit 1118 and has some extra length (i.e. is sufficiently long), the user can easily pull a rinsing system outlet body 1114 up from the wear plate 1106, and can then remove it from the associated rinsing system liquid transport conduit 1118 (by pulling end of the rinsing system liquid transport conduit 1118 from the push lock fitting) for replacement with another rinsing system outlet body 1114. For example, if a rinsing system outlet body 1114 becomes irreparably clogged with debris, or somehow damaged, it can be replaced easily in this way.

The rinsing system outlet bodies 1114 may generally sit flush with the upper surface of the wear plates 1106. Alternatively, in some embodiments, the rinsing system outlet bodies 1114 may not sit flush with the upper surface of the wear plates 1106. For example, the rinsing system outlet bodies 1114 may be recessed from the upper surface of the wear plates 1106.

Reference is made to FIG. 36. It will be noted that the conveyor system 20 may include a plurality of alignment bodies shown at 1130 that may be similar to the rinsing system outlet bodies 1114 but which do not include passages for the flow of rinsing system liquid. Thus, the alignment bodies 1130 each have a first alignment body portion 1132 having a first width WA1, and which is sized to fit into the first alignment apertures 1110 and a second alignment body portion 1134 having a second width WA2 that is larger than the first width WA1, and which is sized to fit into the second alignment apertures 1112. The alignment bodies 1130 may be used instead of the rinsing system outlet bodies 1114 in regions of the conveyor system 20 where it is not needed to eject rinsing system liquid against the underside of the endless belt 36.

In the embodiment shown, the first and second widths WA1 and WA2 may be the same as the widths W1 and W2 of the rinsing system outlet bodies 1114 so that there is interchangeability between the alignment bodies 1130 and the rinsing system outlet bodies 1114.

The alignment bodies 1130 may be made from any suitable material, such as a thermoplastic material, such as, UHMW polyethylene. Since it was described that the wear plates 1106 may be similar to any of the wear plates 800, 620, 600, 500, 308 and 88, it will be noted that, in some embodiments the wear plates 1106 may be made from a thermoplastic material such as UHMW polyethylene. Accordingly, the alignment bodies 1130 will wear at the same rate as the wear plates 1106 around them. This would be true in embodiments in which the material from which the wear plates 1106 is the same as the material of the alignment bodies 1130, even if the material is not UHMW polyethethylene (e.g. some other thermoplastic material).

While the alignment bodies 1130 and the rinsing system outlet bodies 1114 are shown to be made up of one or more generally cylindrical segments, it will be noted that they need not be cylindrical, they could have any other suitable outer shape, such as a generally polygonal (e.g. square) outer shape, and could thus be formed from one or more rectangular prism-shaped segments.

Reference is made to FIG. 37. In some embodiments, the plurality of wear plates 1106 includes a plurality of insert apertures 1136, one of which is shown in FIG. 37. A plurality of wear inserts 1138 are positioned in the plurality of insert apertures 1136. One of the wear inserts 1138 in FIG. 37 is shown exploded from the associated wear plate 1106 so as to show the insert aperture 1136 into which it fits. Each of the plurality of insert apertures 1136 has a bottom for supporting the associated one of the wear inserts 1138 that is positioned in the insert aperture 1136. The plurality of wear inserts 1138 may be similar to the wear inserts 820 described above. A difference in the embodiment shown in FIG. 37 is that the wear inserts 1138 are hexagonal. However, it will be noted that the wear inserts 1138 may alternatively have any other shape such as a rectangular shape, similar to the wear inserts 820, a circular shape, or any other suitable shape.

The wear plates 1106 are made from a wear plate material, which may be any suitable material as described above, such as a polymeric material, such as, for example, a thermoplastic, such as, for example, a UHMW polyethylene. The wear inserts 1138 are made from a wear insert material and that is different than the wear plate material. In some embodiments, the wear insert material has a wear insert material hardness and the wear plate material has a wear plate material hardness, and the wear insert material hardness is greater than the wear plate material hardness. In some embodiments, the wear insert material includes, as noted above, a ceramic material.

The plurality of wear plates 1106 include a plurality of wheel support wear plates shown at 1140, and a plurality of peripheral wear plates shown at 1142. The plurality of wheel support wear plates 1140 are positioned to directly support regions of the endless belt 36 that directly support wheels of the wheeled structure 11, as illustrated in FIG. 38. The wheeled structure 11 in FIG. 38 is shown as a simple rectangular outline, for simplicity, and the wheels of the wheeled structure 11 are shown at 1144 as dashed rectangular outlines, for simplicity. The regions of each endless belt 36 that directly support wheels 1144 of the wheeled structure 11 are shown at 1146 in FIG. 38 and are represented themselves as smaller dashed rectangles. These regions 1146 correspond to the contact patch of the wheels 1144 on the endless belt 36. The endless belts 36 in FIG. 38 are themselves shown as simple outlines so as not to obscure the wear plates 1140 and 1142. The plurality of peripheral wear plates 1142 are adjacent the plurality of wheel support wear plates 1140. These peripheral wear plates 1142 are not expected to routinely support the regions 1146 of each endless belt 36 that directly support wheels 1144 of the wheeled structure 11. In other words, during operation of the conveyor system shown in FIGS. 37 and 38, the wheeled structure 11 is expected to be routinely positioned on the endless belts 36 with its wheels 1144 positioned on regions of the endless belts 36 that are directly over the wheel support wear plates 1140, and are not expected to be routinely positioned on the endless belts 36 with its wheels 1144 positioned on regions of the endless belts 36 that are directly over the peripheral wear plates 1142. For this reason, at least a majority of the plurality of wear inserts 1138 are positioned on the wheel support wear plates 1140, in order to help resist wear on those wear plates 1106 that incur the highest loads. In the example shown, the entirety of the plurality of wear inserts 1138 are positioned in the wheel support wear plates 1140. By providing a plurality of wheel support wear plates 1140 and a plurality of peripheral wear plates 1142, the support deck 1100 can easily be made to different widths so as to accommodate different widths of endless belts 36, for different applications. The wheel support wear plates 1140, which are more complex and therefore more expensive to manufacture, may be standardized and manufactured in high volume in order to reduce their cost of manufacture, and the peripheral wear plates 1142 may be manufactured as needed in order to meet the needs of each particular application. To give some non-limiting examples, the wheel support wear plates 1140 may have a width of about 16 inches. In order to provide a conveying system that includes two endless belts 36 that are 30 inches wide, one could provide the 16-inch wheel support wear plates 1140 and then 7-inch wide peripheral wear plates 1142 on either side of the wheel support wear plates 1140. In another application where there are two endless belts 36 that are 40 inches wide, the 16-inch wheel support wear plates 1140 can be provided, along with 12-inch wide peripheral wear plates 1142 on either side of the wheel support wear plates 1140. It will further be noted that the peripheral wear plates 1142 that are laterally outboard of the wheel support wear plates 1140 need not have the same width as the peripheral wear plates 1142 that are laterally inboard of the wheel support wear plates 1140.

In some embodiments, both the peripheral wear plates 1142 and the wheel support wear plates 1140 have rinsing system outlet bodies 1114 thereon, for controlling the positions of the peripheral wear plates 1142 and the wheel support wear plates 1140. In some embodiments, the rinsing system outlet bodies 1114 on the peripheral wear plates 1142 may instead be alignment bodies 1130, since there may be less of a wear issue in regions of the endless belts 36 that do not directly support wheels 1144 of the wheeled structure 11.

Additionally or alternatively, the peripheral wear plates 1142 may be directly positionally locked to the wheel support wear plates 1140. For example, a projection and recess connection shown at 1150 may be provided between the peripheral wear plates 1142 and the wheel support wear plates 1140. The projection and recess connection 1150 may include a locating projection 1152 on at least one of the peripheral wear plate 1142 and the wheel support wear plate 1140, which engages a locating recess 1154 in at least the other of the peripheral wear plate 1142 and the wheel support wear plate 1140. In the example shown, the locating projections 1152 are all on the peripheral wear plates 1142 and the locating recesses are all on the wheel support wear plates 1140, although any other suitable arrangement may be used.

Persons skilled in the art will appreciate that there are yet more alternative implementations and modifications possible, and that the above examples are only illustrations of one or more implementations. The scope, therefore, is only to be limited by the claims appended hereto and any amendments made thereto.

The invention claimed is:

1. A conveyor system, comprising:
an endless belt mounted in a longitudinal direction through a service line, said endless belt having an upper transport portion for supporting a wheeled structure through the service line, and a lower return portion;
a support deck positioned to support said upper transport portion of said endless belt, said support deck including a lower support deck structure, and a plurality of wear plates supported on said lower support deck structure and being engageable with said upper transport portion of said endless belt, said support deck further having a plurality of alignment aperture pairs, wherein each of said alignment aperture pairs includes a first alignment aperture extending through said lower support deck structure, and a second alignment aperture extending through one of said plurality of wear plates;
a belt-rinsing system including a plurality of rinsing system outlet bodies, wherein each of said plurality of rinsing system outlet bodies extends into one said first alignment aperture of said lower support deck structure and into one said second alignment aperture of one of said plurality of wear plates, so as to inhibit movement of said one of said plurality of wear plates relative to said lower support deck structure; and
wherein each of said plurality of rinsing system outlet bodies has an outlet body inlet that is connectable to a source of rinsing system liquid, and an outlet body outlet that faces said upper transport portion of said endless belt so as to eject said rinsing system liquid onto said upper transport portion of said endless belt.

2. The conveyor system according to claim 1, wherein:
said lower support deck structure has an outlet body support surface; and
each of said plurality of rinsing system outlet bodies has:
a first outlet body portion having a first width being sized to fit into said first alignment aperture;
a second outlet body portion having a second width that is larger than the first width, and which is sized to fit into said second alignment aperture; and
an outlet body shoulder between said first and second outlet body portions that is supported on said outlet body support surface between said first alignment aperture and said second alignment aperture of each of said alignment aperture pairs.

3. The conveyor system according to claim 2, wherein said outlet body support surface is an upper surface of said lower support deck structure.

4. The conveyor system according to claim 1, wherein said plurality of rinsing system outlet bodies are made from a polymeric material and said plurality of wear plates is made from the polymeric material.

5. The conveyor system according to claim 4, wherein said plurality of rinsing system outlet bodies and said plurality of wear plates are made from a thermoplastic material.

6. The conveyor system according to claim 5, wherein said plurality of rinsing system outlet bodies and said plurality of wear plates are made from an ultra-high-molecular-weight (UHMVV) polyethylene.

7. The conveyor system according to claim 1, wherein:
said plurality of wear plates include a plurality of wheel support wear plates, and a plurality of peripheral wear plates, wherein said plurality of wear plates has a plurality of insert apertures formed therein, and a plurality of wear inserts positioned in said plurality of insert apertures, wherein said wear plates are made from a wear plate material and said wear inserts are made from a wear insert material and that is different than said wear plate material;
said plurality of wheel support wear plates are positioned to directly support regions of said endless belt that directly support wheels of the wheeled structure;
said plurality of peripheral wear plates are adjacent said plurality of wheel support wear plates; and
at least a majority of said plurality of wear inserts are positioned on said wheel support wear plates.

8. The conveyor system according to claim 1, further comprising a drive module that is positioned to drive said endless belt.

9. The conveyor system according to claim 1, further comprising a rinsing system liquid transport conduit, said outlet body inlet is connectable to the source of the rinsing system liquid by means of said rinsing system liquid transport conduit that includes a length of hose that is sufficiently long so as to permit lifting up of said rinsing system outlet body from said alignment aperture pair, and wherein said rinsing system liquid transport conduit is releasably connected to said outlet body inlet.

10. A conveyor system, comprising:
an endless belt mounted in a longitudinal direction through a service line, said endless belt having an upper transport portion being sized to support a wheeled structure through the service line, and a lower return portion;
a support deck positioned to support said upper transport portion of said endless belt, said support deck including a lower support deck structure, and a plurality of wear plates supported on said lower support deck structure and being engageable with said upper transport portion of said endless belt, wherein said support deck includes a plurality of alignment aperture pairs, wherein each of said alignment aperture pairs includes a first alignment aperture extending through said lower support deck structure, and a second alignment aperture extending through one of said plurality of wear plates;

a belt-rinsing system including a plurality of rinsing system outlet bodies;

a plurality of alignment bodies, wherein each of said plurality of alignment bodies extends into one said first alignment aperture of said lower support deck structure and into one said second alignment aperture of one of said plurality of wear plates, so as to inhibit movement of one of said plurality of wear plates relative to said lower support deck structure;

wherein each of said plurality of alignment bodies has:
  a first alignment body portion having a first width, and which is sized to fit into said first alignment apertures;
  a second alignment body portion having a second width that is larger than the first width, and which is sized to fit into said second alignment apertures; and
  an alignment body shoulder between said first and second alignment body portions that is supported on an alignment body support surface between said first alignment aperture and said second alignment aperture of each of said alignment aperture pairs.

11. The conveyor system according to claim 10, wherein said alignment body support surface is an upper surface of said lower support deck structure.

12. The conveyor system according to claim 10, wherein said plurality of alignment bodies is made from a polymeric material and said plurality of wear plates is made from said polymeric material.

13. The conveyor system according to claim 12, wherein said plurality of alignment bodies and said plurality of wear plates are made from a thermoplastic material.

14. The conveyor system according to claim 13, wherein said plurality of alignment bodies and said plurality of wear plates are made from an ultra-high-molecular-weight (UHMVV) polyethylene.

15. The conveyor system according to claim 10, further comprising a drive module that is positioned to drive said endless belt.

16. A conveyor system, comprising:
an endless belt mounted in a longitudinal direction through a service line, said endless belt having an upper transport portion sized to support a wheeled structure through the service line, and a lower return portion;
a support deck positioned to support said upper transport portion of said endless belt, said support deck including a lower support deck structure, and a plurality of wear plates supported on said lower support deck structure and being engageable with said upper transport portion of said endless belt, wherein said plurality of wear plates include a plurality of wheel support wear plates, and a plurality of peripheral wear plates, wherein said plurality of wear plates include a plurality of insert apertures formed therein, and a plurality of wear inserts positioned in said plurality of insert apertures, wherein said wear plates are made from a wear plate material and said wear inserts are made from a wear insert material and that is different than said wear plate material;
wherein said plurality of wheel support wear plates are positioned to directly support regions of said endless belt that directly support wheels of the wheeled structure;
wherein said plurality of peripheral wear plates are adjacent said plurality of wheel support wear plates; and
wherein at least a majority of said plurality of wear inserts are positioned on said wheel support wear plates.

17. The conveyor system according to claim 16, wherein an entirety of said plurality of wear inserts are positioned in said wheel support wear plates.

18. The conveyor system according to claim 16, wherein said wear insert material includes a ceramic material and said wear plate material is a polymeric material.

19. The conveyor system according to claim 16, wherein said plurality of peripheral wear plates is positionally locked to said plurality of wheel support wear plates.

20. The conveyor system according to claim 16, further comprising a drive module that is positioned to drive said endless belt.

* * * * *